(12) United States Patent
Lawin et al.

(10) Patent No.: US 11,787,952 B2
(45) Date of Patent: Oct. 17, 2023

(54) ZWITTERIONIC MONOMERS, POLYZWITTERIONIC POLYMERS FORMED THEREFROM, SURFACE FUNCTIONALIZATION AND SURFACE MODIFICATION

(71) Applicant: ABF TECHNOLOGIES, LLC, Minneapolis, MN (US)

(72) Inventors: Laurie Lawin, New Brighton, MN (US); Anthony Gerten, South Saint Paul, MN (US); Logan Sanow, Crystal, MN (US)

(73) Assignee: ABF Technologies, LLC, Plymouth, MN (US)

( * ) Notice: Subject to any disclaimer, the term of this patent is extended or adjusted under 35 U.S.C. 154(b) by 901 days.

(21) Appl. No.: 16/613,901

(22) PCT Filed: May 17, 2018

(86) PCT No.: PCT/US2018/033260
§ 371 (c)(1),
(2) Date: Nov. 15, 2019

(87) PCT Pub. No.: WO2018/213627
PCT Pub. Date: Nov. 22, 2018

(65) Prior Publication Data
US 2021/0002493 A1  Jan. 7, 2021

Related U.S. Application Data

(60) Provisional application No. 62/507,248, filed on May 17, 2017.

(51) Int. Cl.
*C08C 19/28* (2006.01)
*C09D 5/16* (2006.01)
(Continued)

(52) U.S. Cl.
CPC ............ *C09D 5/1637* (2013.01); *C08C 19/28* (2013.01); *C08C 19/44* (2013.01); *C08F 8/34* (2013.01);
(Continued)

(58) Field of Classification Search
None
See application file for complete search history.

(56) References Cited

U.S. PATENT DOCUMENTS

| 2,483,739 A | 10/1949 | Roach et al. |
| 3,428,693 A | 2/1969 | Prosser |

(Continued)

FOREIGN PATENT DOCUMENTS

| EP | 2604332 B1 | 7/2015 |
| WO | WO 2003096016 A1 | 11/2003 |

(Continued)

OTHER PUBLICATIONS

Shivapooja et al. "Modification of silicone elastomer surfaces with zwitterionic polymers: short-term fouling resistance and triggered biofouling release." ACS Applied Materials & Interfaces 7, No. 46 (2015): 25586-25591. (Year: 2015).*

(Continued)

*Primary Examiner* — Robert S Loewe

(57) ABSTRACT

Disclosed herein are zwitterionic monomers, non-zwitterionic monomers, polyzwitterionic polymers formed therefrom; surface functionalization; surface modification; and articles containing any such compositions or surfaces formed therefrom.

15 Claims, 3 Drawing Sheets

(51) Int. Cl.
  *C08C 19/44*  (2006.01)
  *C08F 8/34*  (2006.01)
  *C08F 120/60*  (2006.01)
  *C08K 5/37*  (2006.01)
  *C09D 115/00*  (2006.01)

(52) U.S. Cl.
  CPC .............. *C08F 120/60* (2013.01); *C08K 5/37* (2013.01); *C09D 115/00* (2013.01)

(56) References Cited

U.S. PATENT DOCUMENTS

| | | | | |
|---|---|---|---|---|
| 6,368,587 | B1* | 4/2002 | Anders | B01D 67/0093 427/508 |
| 2010/0072642 | A1 | 3/2010 | Broad et al. | |
| 2015/0073109 | A1 | 3/2015 | Benicewicz et al. | |

FOREIGN PATENT DOCUMENTS

| | | |
|---|---|---|
| WO | WO 2014152453 A2 | 9/2014 |
| WO | WO 2015082656 A1 | 6/2015 |

OTHER PUBLICATIONS

Li et al. "Surface modification of silicone for biomedical applications requiring long-term antibacterial, antifouling, and hemocompatible properties." Langmuir 28, No. 47 (2012): 16408-16422. (Year: 2012).*

Li et al. "Surface modification of silicone with covalently immobilized and crosslinked agarose for potential application in the inhibition of infection and omental wrapping." Advanced Functional Materials 24, No. 11 (2014): 1631-1643. (Year: 2014).*

Levering et al. "Soft Robotic Concepts in Catheter Design: an On-Demand Fouling-Release Urinary Catheter." Advanced healthcare materials 3, No. 10 (2014): 1588-1596. (Year: 2014).*

Wu et al. "Reactive polymer coatings: a general route to thiol-ene and thiol-yne click reactions." Macromolecular rapid communications 33, No. 10 (2012): 922-927. (Year: 2012).*

Greene et al., *Protective Groups in Organic Synthesis, $3^{rd}$ edition*, 1999, John Wiley and Sons, Inc., New York, New York, Title page, publishing information, table of contents. 10 pages.

Han et al., "A Spectrophotometric Method for Quantitative Determination of Bromine Using Tris(2-carboxyethyl)phosphine," Jul. 1999, *J. Chem. Ed.* 76(7):976-977.

International Preliminary Report on Patentability for PCT/US2018/033260, dated Nov. 19, 2019, 8 pages.

International Search Report and Written Opinion for PCT/US2018/033260, dated Sep. 11, 2018, 12 pages.

Kawai, "Polymerizations of Some Diene Monomers. Preparations and Polymerizations of Vinyl Methacrylate, Allyl Methacrylate, N-Allylacryl amide, and N-Allylmethacrylamide," May 1966, *J. Polym. Sci. Part A: Polym. Chem.* 4(5):1191-1201.

Xiang et al., "Covalent Deposition of Zwitterionic Polymer and Citric Acid by Click Chemistry-Enabled Layer-by-Layer Assembly for Improving the Blood Compatibility of Polysulfone Membrane," *Langmuir*, 2014, 30(18):5115-5125.

Willcock et al., "End group removal and modification of RAFT polymers," 2010, *Polymer Chemistry*, 1(2):149-157.

Yu et al., "Grafting Polyzwitterions onto Polyamide by Click Chemistry and Nucleophilic Substitution on Nitrogen: A Novel Approach to Enhance Membrane Fouling Resistance," Jan. 2014, *Journal of Membrane Science*, 449:50-57.

* cited by examiner

ZWITTERIONIC MONOMERS, POLYZWITTERIONIC POLYMERS FORMED THEREFROM, SURFACE FUNCTIONALIZATION AND SURFACE MODIFICATION

This application is the § 371 U.S. National Stage of International Application No. PCT/US2018/033260, filed May 17, 2018, which claims the benefit of U.S. Provisional Application No. 62/507,248, filed May 17, 2017, the disclosures of which are incorporated by reference herein in their entireties.

Many commercial devices include polymeric materials with surface properties that are not optimal for the intended use. A specific example of such a material is rubber which can also be referred to as an elastomer. Rubber has advantageous resilience, elongation, tensile strength and modulus, as well as other properties. However, rubber often lacks desirable surface properties such as hydrophilicity, lubricity, low coefficient of friction, hemocompatibility, antithrombogenicity, and anti-fouling for example. In many other polymeric materials, for example, the bulk and surface properties are also at odds.

Biofilms are ubiquitous since they are found on nearly all non-sterile hydrated surfaces. A biofilm is defined as a multicellular structure of microorganisms attached to biotic or abiotic surfaces that exist within a self-produced matrix of hydrated extracellular polymer substance (EPS). The microorganism types include bacteria, archaea, fungi, algae, and even viruses, and they can exist in single or mixed type communities. The EPS is mainly composed of nucleic acids, proteins, polysaccharides, minerals, and lipids, and the EPS provides a dense outer protection layer, and interconnects the biofilm cells to form a cohesive three-dimensional matrix. Biofilms harbor pathogenic microorganisms and serve as reservoirs for antibiotic-resistant bacteria with natural shedding release. Fouling resistant surfaces that reduce or prevent bacterial and protein adhesion, marine fouling and biofilm growth are needed in many different fields of use. The purification, filtration, storage and distribution of high quality biostable drinking water for potable, ingredient, process and industrial use is of vital global importance. Biofilms negatively impact all of the aforementioned water application areas in terms of health, safety and economic cost. Biofilm is the predominant microbial growth mode and therefore it is a source of bacterial contamination in plumbing, oil wells, building heating, ventilation, air conditioning, filters, water purification and storage systems, dairy processing, beverage dispensing machines, dishwashers, and washing machines. A specific application is for water storage devices. The ability of rubber to be easily molded into many shapes, along with its tensile strength, resistance to abrasion, and elongation characteristics make it uniquely suited for water storage vessels. Water is continuously retained in the vessels, making the surface vulnerable to biofilm formation and increasing the potential for taste, odor and waterborne illness issues. A surface resistant to biofouling is desirable for this application.

Another specific application where the bulk and surface properties are most at odds is in the medical field. For example, medical devices used in vascular interventional procedures employ hydrophilic coatings to reduce the procedure time and impart a high degree of lubricity which lowers the frictional force during insertion and manipulation of the device through the circulatory system, thus avoiding puncture damage and abrasion between the medical device surface and vessel walls. Medical devices that could benefit from having low fouling, low coefficient of friction, protein adhesion resistant, antithrombogenic and hemocompatible properties include but are not limited to seals including plunger seals, implantable devices, implantable and non-implantable sensors and drug delivery devices, tissue scaffolds, non-invasive and minimally invasive apparatus, and wound dressings.

A hydrophilic surface on hydrophobic materials is also desirable for example, to achieve uniform wetting by water as this property is important to prevent fogging of optically clear surfaces and important for liquid sample spreading evenly over a film for diagnostic testing or for use in microfluidics.

In addition, a universal method to modify the surface of a material is desirable in order that the bulk properties are maintained. For example, the surface of materials such as thermoset elastomers could be made reactive so that the surface can be transformed to have any desired functionality or surface property. Desirable surface properties and combinations of surface properties can include but are not limited to anti-fouling (of any type) hydrophilic, barrier, wet lubricious (low coefficient of friction when wet with water), dry lubricious (low coefficient of friction between two dry or relatively dry surfaces) adhesive, non-adhesive, bioreactive, and biocompatible. For example, low fouling and low coefficient of friction materials may be useful in microfluidics, diagnostic tests, sensors and devices in the fields of medical products, bioprocesses or bioseparations such as membranes for microbial suspension, hormone separation, protein fractionation, cell separation, waste water treatment, oligosaccharide bioreactors, and protein ultrafiltration. In specific examples, after modification of the surface reagent that is attached to rubber, surface modification by polysiloxane for attaining a low coefficient of friction and a perfluorinated molecule for greater inertness and stability can be achieved. Solar cells i.e. dye-sensitized solar cell, organic light emitting diodes, field effect transistors, fuel cells are other areas that could benefit from the use of surface modified parts.

For all of these reasons, methods of modifying the surface of materials without affecting the bulk properties thereof are necessary. More specifically, additional methods of modifying polymer surface properties without affecting the bulk properties thereof are needed.

Polyzwitterions are specialty polymers that contain an equal number of anionic and cationic groups. In dilute, salt-free aqueous solution, coulombic interactions between positively and negatively charged repeat units reduce the hydrodynamic volume, and the polymer adopts a globular conformation. However, upon the addition of electrolytes (i.e. NaCl), a random coil conformation is observed due to screening of the intramolecular charge-charge attractions. Polyzwitterions find uses as fiber and rheology modifiers and in pharmaceutical, agricultural and personal care formulations, and for applications in the areas of enhanced oil recovery, water remediation and antifouling. Polyzwitterions with reactive groups that can be used to modify any surface are needed in order to impart surface properties of hydrophilicity, tolerance to high ionic strength and temperature, hemocompatibility and excellent resistance to biofouling.

SUMMARY

Some illustrative embodiments include polymers according to formula 12:

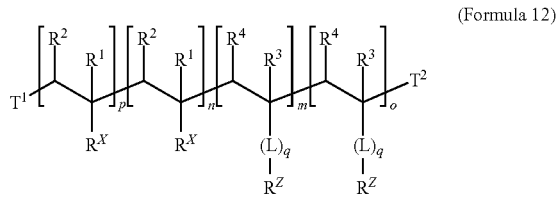

(Formula 12)

where $T^1$ and $T^2$ can independently be any group;
$R^X$ independently comprise at least one reactive group or non-reactive, non-zwitterionic group;
$R^Z$ comprises at least a zwitterionic portion;
$R^1$ and $R^3$ are independently hydrogen, substituted or unsubstituted alkyl, or halogen;
$R^2$ and $R^4$ are independently hydrogen, substituted or unsubstituted alkyl, substituted or unsubstituted alkoxy, or halogen;
q can independently be 0 or 1 and when an independent q is 1, L can be a linker group;
m can be an integer from 1 to 10,000;
n can be an integer from 0 to 10,000;
can be an integer from 0 to 10,000; and
p can be an integer from 0 to 10,000.

Some illustrative embodiments include polymers according to formula 13:

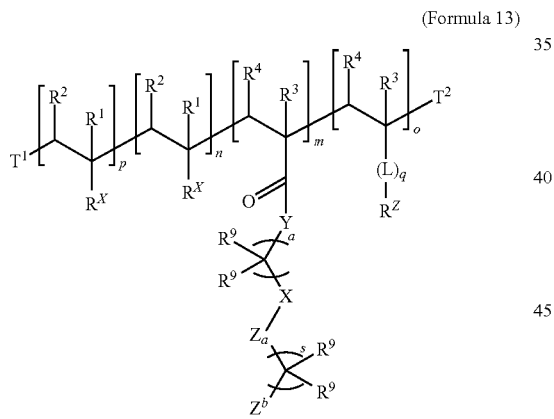

(Formula 13)

where $T^1$ and $T^2$ can independently be any group;
Y can be —O— or –NH;
X can be $CH_2$ or $(CH_2CH_2O)_vCH_2CH_2$, where v can be an integer from 1 to 10;
$R^X$ comprises at least one reactive group or at least one non-reactive, non-zwitterionic group;
one of $Z^a$ and $Z^b$ comprises a zwitterionic portion that has a positive charge and the other of $Z^a$ and $Z^b$ comprises a zwitterionic portion that has a negative charge;
$R^1$ and $R^3$ are independently hydrogen, substituted or unsubstituted alkyl, or halogen;
$R^2$ and $R^4$ are independently hydrogen, substituted or unsubstituted alkyl, substituted or unsubstituted alkoxy, or halogen;
$R^9$ can independently be selected from —H or $C_1$-$C_4$ alkyl chain optionally substituted with a heteroatom (e.g., $CH_2OH$);
each q can independently be 0 or 1 and when an independent q is 1, L can be a linker group;
a can be an integer from 0 to 11;
s can be an integer from 2 to 8;
m can be an integer from 1 to 10,000;
n can be an integer from 0 to 10,000;
can be an integer from 0 to 10,000; and
p can be an integer from 0 to 10,000.

Some illustrative embodiments include polymers according to any of formula 13a, 13b, or 13c:

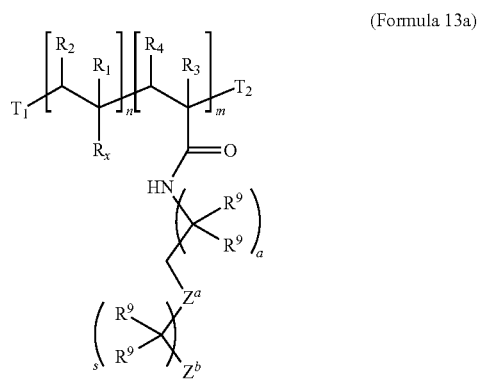

(Formula 13a)

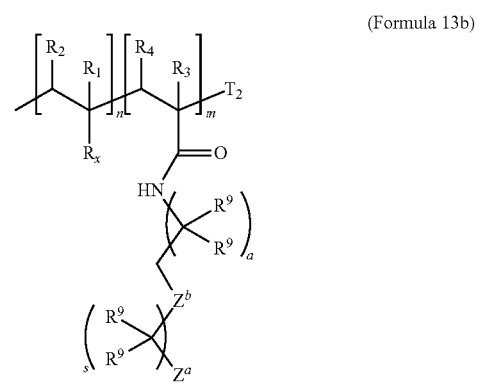

(Formula 13b)

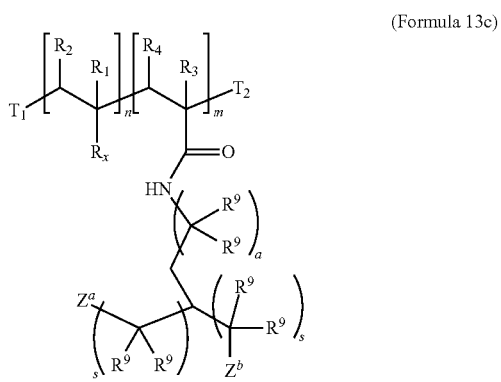

(Formula 13c)

where $T^1$ and $T^2$ can independently be any group;
$R^X$ comprises at least one reactive group or at least one non-reactive, non-zwitterionic group;
$R^1$ and $R^3$ are independently hydrogen, substituted or unsubstituted alkyl, or halogen;

$R^2$ and $R^4$ are independently hydrogen, substituted or unsubstituted alkyl, substituted or unsubstituted alkoxy, or halogen;

$R^9$ can independently be selected from –H or $C_1$-$C_4$ alkyl chain optionally substituted with a heteroatom;

m can be an integer from 1 to 10,000;

n can be an integer from 0 to 10,000;

a can be an integer from 0 to 11;

s can be an integer from 2 to 8;

one and only one of $Z^a$ and $Z^b$ have the formula 12b

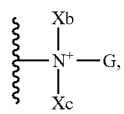

(Formula 12b)

$X^b$ and $X^c$ are independently selected from H, $CH_3$, or a $C_1$-$C_6$ alkyl chain optionally substituted with a heteroatom (e.g., $CH_2OH$); and G is a bond or a terminal group;

and the other of $Z^a$ and $Z^b$ comprise a sulfonate group, a carboxylate group, a phosphate group, a phosphinate group, —OP(OH)$_2$O, or a sulfate group.

Some illustrative embodiments include polymers according to formula 13d:

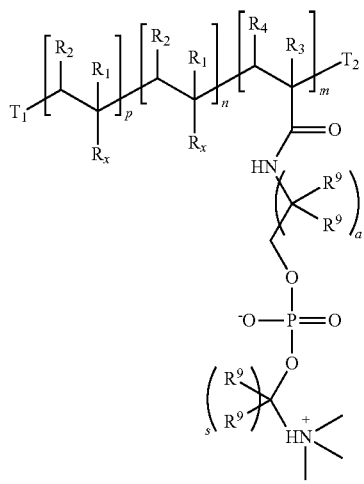

(Formula 13d)

where $T^1$ and $T^2$ can independently be any group;

$R^X$ comprises at least one reactive group or at least one non-reactive, non-zwitterionic group;

$R^1$ and $R^3$ are independently hydrogen, substituted or unsubstituted alkyl, or halogen;

$R^2$ and $R^4$ are independently hydrogen, substituted or unsubstituted alkyl, substituted or unsubstituted alkoxy, or halogen;

m can be an integer from 1 to 10,000;

n can be an integer from 0 to 10,000;

a can be an integer from 0 to 11; and s can be an integer from 2 to 8.

Some illustrative embodiments include polymers according to formula 15:

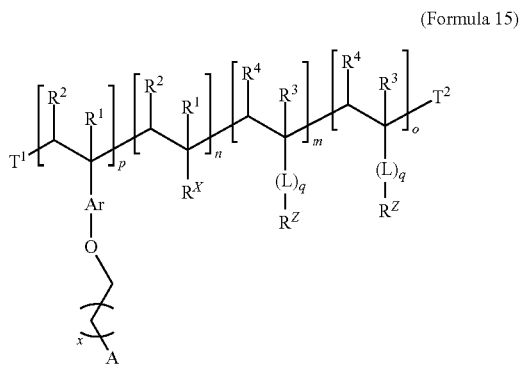

(Formula 15)

where $T^1$ and $T^2$ can independently be any group;

$R^X$ comprises at least one reactive group or at least one non-reactive, non-zwitterionic group;

$R^Z$ comprises at least a zwitterionic portion;

$R^1$ and $R^3$ are independently hydrogen, substituted or unsubstituted alkyl, or halogen;

$R^2$ and $R^4$ are independently hydrogen, substituted or unsubstituted alkyl, substituted or unsubstituted alkoxy, or halogen;

Ar comprises substituted or unsubstituted heteroaromatic groups, substituted or unsubstituted aryl groups, or combinations thereof;

A comprises a thiol group, a thiobenzoate group, a dithiobenzoate group, a thioacyl group, a dithioacyl group, an alkene group, a carbodithioate group, a 2-(cyanoethyl)thio group, or an alkyne group;

q can independently be 0 or 1 and when an independent q is 1, L can be a linker group;

m can be an integer from 1 to 10,000;

n can be an integer from 0 to 10,000;

can be an integer from 0 to 10,000;

p can be an integer from 0 to 10,000; and x can be an integer from 0 to 11.

Some illustrative embodiments include polymers according to formula 16:

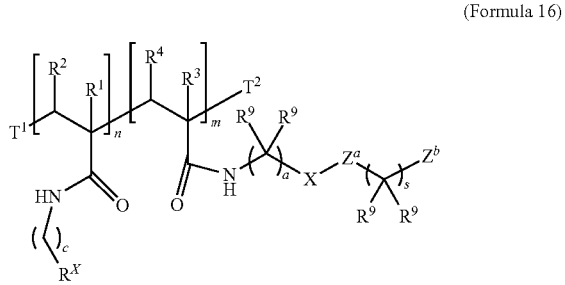

(Formula 16)

where $T^1$ and $T^2$ can independently be any group;

$R^X$ comprises at least one reactive group or at least one non-reactive, non-zwitterionic group;

$R^1$ and $R^3$ are independently hydrogen, substituted or unsubstituted alkyl, or halogen;

$R^2$ and $R^4$ are independently hydrogen, substituted or unsubstituted alkyl, substituted or unsubstituted alkoxy, or halogen;

$R^9$ can independently be selected from —H or $C_1$-$C_4$ alkyl chain optionally substituted with a heteroatom (e.g., $CH_2OH$);

X can be $CH_2$ or $(CH_2CH_2O)_vCH_2CH_2$, where v can be an integer from 1 to 10;

m can be an integer from 1 to 10,000;

n can be an integer from 0 to 10,000;

a can be an integer from 0 to 11;

s can be an integer from 2 to 8;

c can be an integer from 1 to 12; and one and only one of $Z^a$ and $Z^b$ have the formula 12b (Formula 12b)

$$\begin{array}{c} Xb \\ | \\ \xi-N^+-G, \\ | \\ Xc \end{array}$$

$X^b$ and $X^c$ are independently selected from H, $CH_3$, or a $C_1$-$C_6$ alkyl chain optionally substituted with a heteroatom (e.g., $CH_2OH$); and G is a bond or a terminal group;

and the other of $Z^a$ and $Z^b$ comprise a sulfonate group, a carboxylate group, a phosphate group, a phosphinate group, —$OP(OH)_2O$, or a sulfate group.

Some illustrative embodiments include polymers according to any of the formulae 15a, 15b or 15c:

(Formula 15a)

(Formula 15b)

(Formula 15c)

where $T^1$ and $T^2$ can independently be any group;

m can be an integer from 1 to 10,000; and n can be an integer from 0 to 10,000.

Some illustrative embodiments include polymers according to any of the formulae 15d, 15e or 15f:
(Formula 15d)
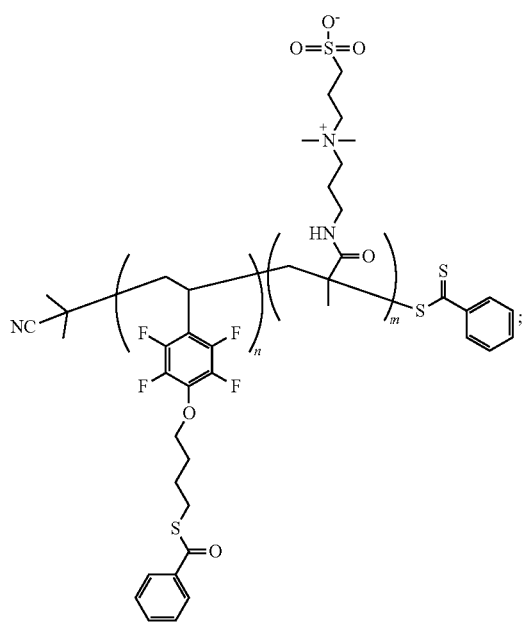
(Formula 15e)
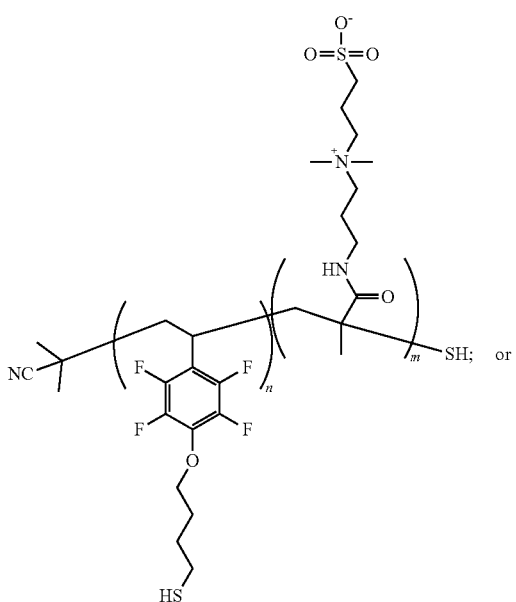
SH; or
(Formula 15f)
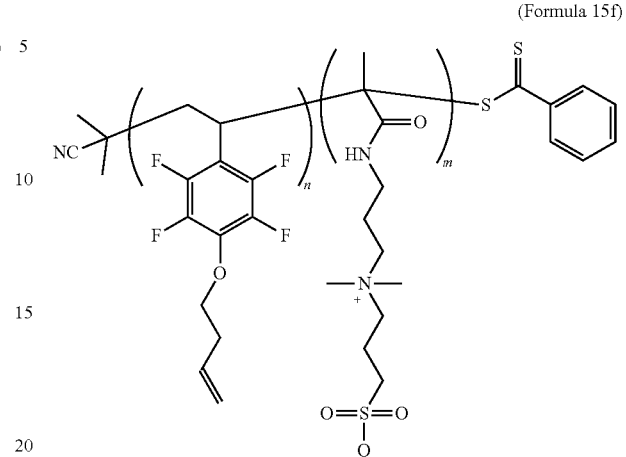
where m can be an integer from 1 to 10,000; and
n can be an integer from 0 to 10,000.
Some illustrative embodiments include polymers according to any of formulae 16a, 16b, 16c, 16d, or 16e
(Formula 16a)
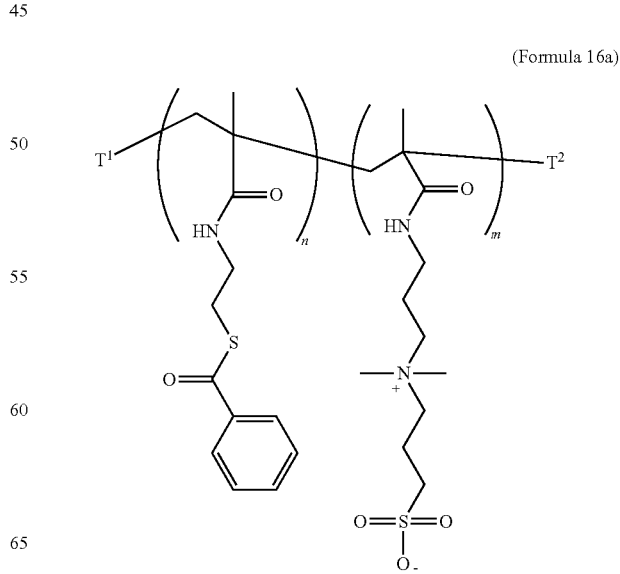

(Formula 16b)
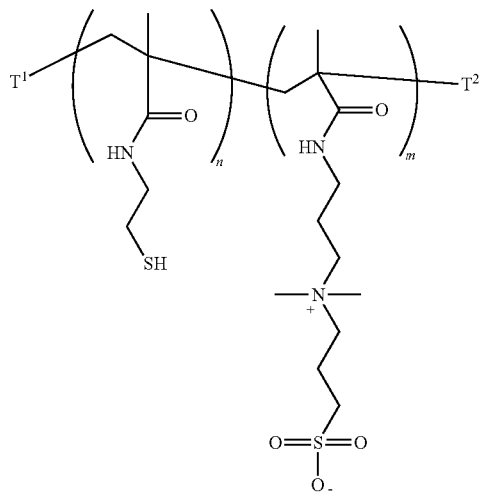
(Formula 16c)
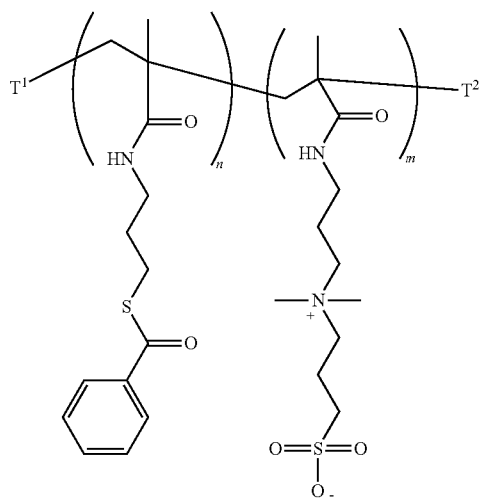
(Formula 16d)
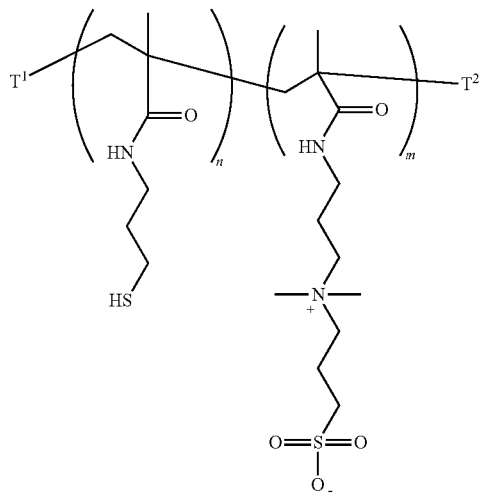
(Formula 16e)
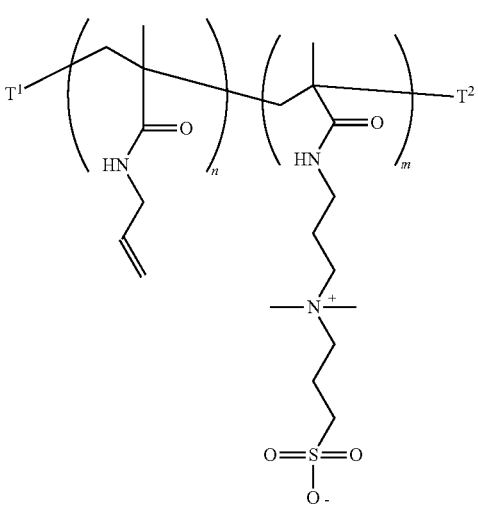
where $T^1$ and $T^2$ can independently be any group;
m can be an integer from 1 to 10,000; and
n can be an integer from 0 to 10,000.
Some illustrative embodiments include polymers according to any of formulae 16f, 16g, 16h, 16i, or 16j:
(Formula 16f)
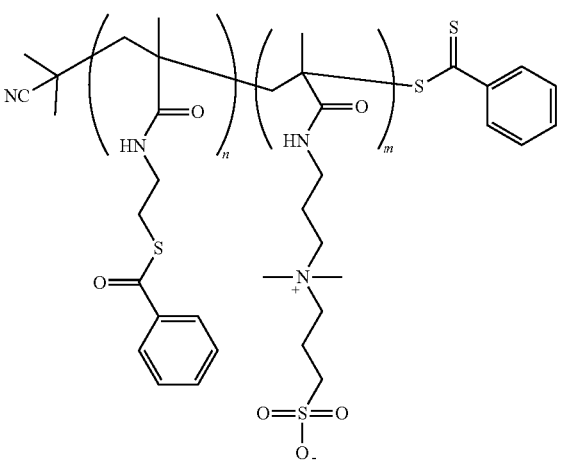
;

(Formula 16g)
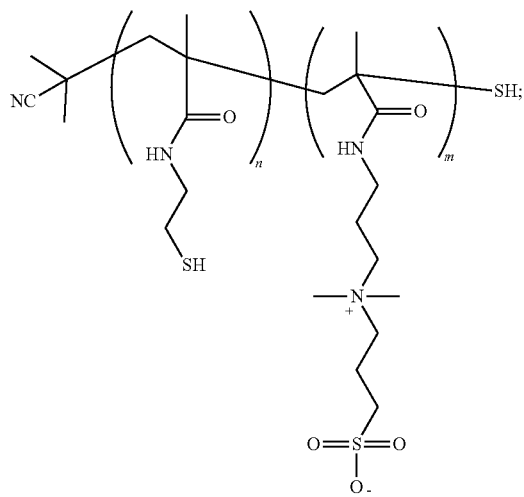
(Formula 16h)
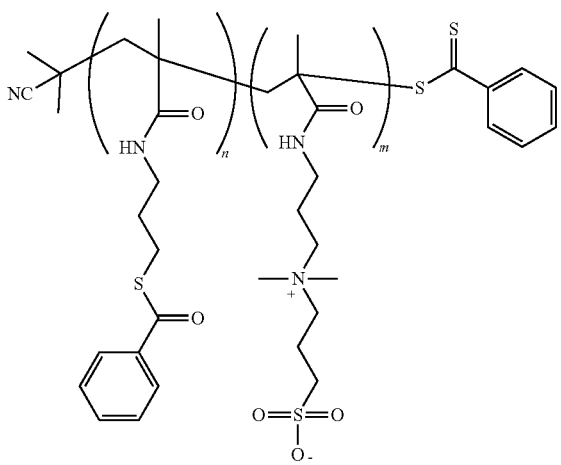
(Formula 16i)
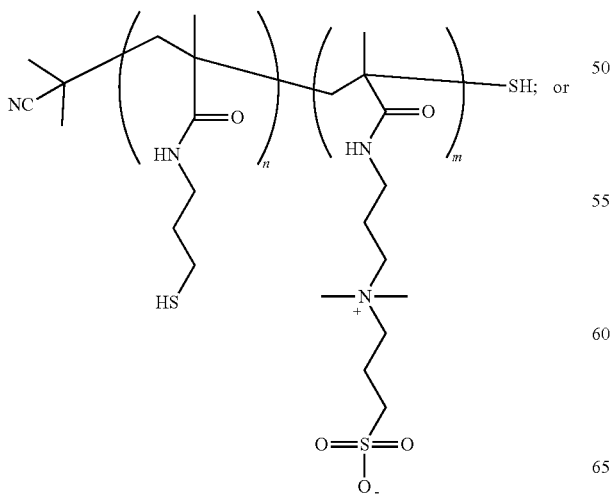
-SH; or
(Formula 16j)
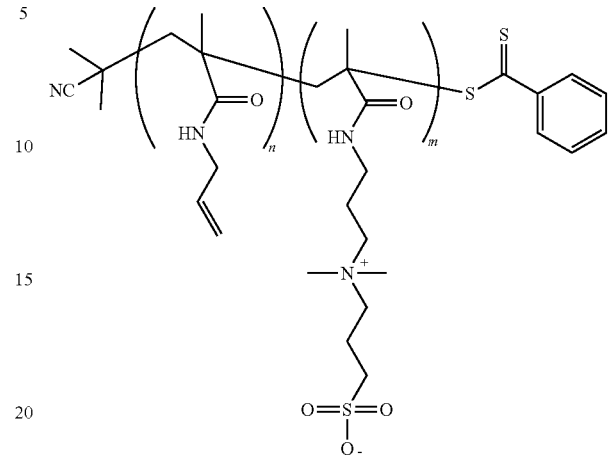
where m can be an integer from 1 to 10,000; and
n can be an integer from 0 to 10,000.
Additional illustrative embodiments include polymers according to any of formulae 16m, 16n or, 16o:
(Formula 16m)
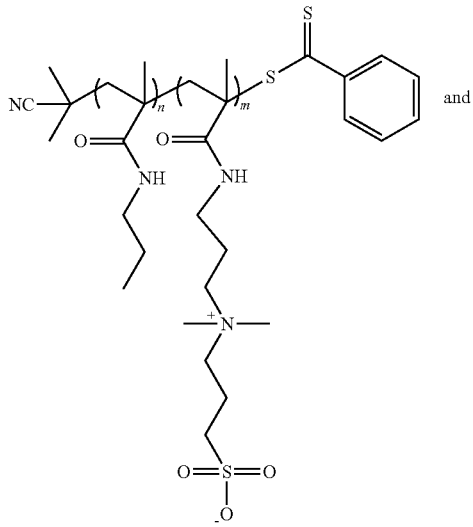
and -continued (Formula 16n)

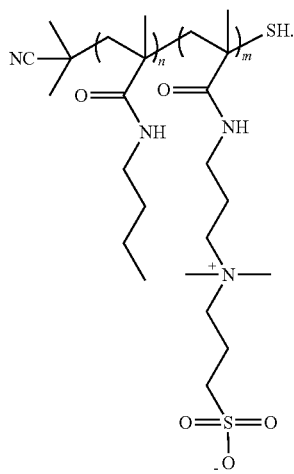

(Formula 16o)

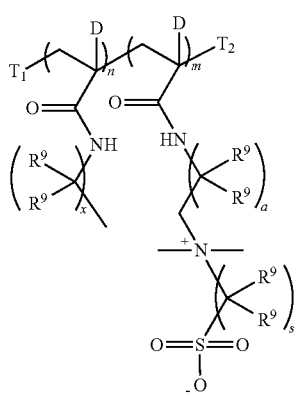

Some illustrative embodiments include homopolymers according to formula 14:

(Formula 14)

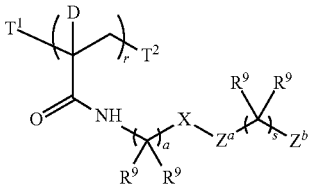

where $T^1$ and $T^2$ can independently be any group;

D is H or alkyl;

X can be $CH_2$ or $(CH_2CH_2O)_vCH_2CH_2$, where v can be an integer from 1 to 10;

$R^9$ can independently be selected from —H or $C_1$-$C_4$ alkyl chain optionally substituted with a heteroatom (e.g., $CH_2OH$);

r can be an integer from 2 to 10,000;

a can be an integer from 0 to 11;

s can be an integer from 2 to 8;

one and only one of $Z^a$ and $Z^b$ have the formula 12b (Formula 12b)

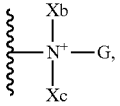

$X^b$ and $X^c$ are independently selected from H, $CH_3$, or a $C_1$-$C_6$ alkyl chain optionally substituted with a heteroatom (e.g., $CH_2OH$); and G is a bond or a terminal group;

and the other of $Z^a$ and $Z^b$ comprise a sulfonate group, a carboxylate group, a phosphate group, a phosphinate group, —$OP(OH)_2O$, or a sulfate group.

Some illustrative embodiments include homopolymers according to formula 14a:

(Formula 14a)

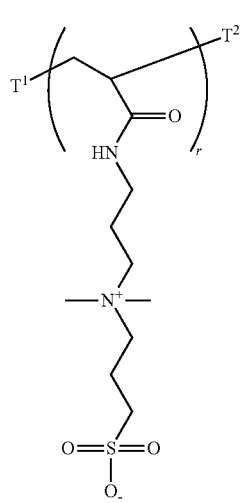

where $T^1$ and $T^2$ can independently be any group;

X can be $CH_2$ or $(CH_2CH_2O)_vCH_2CH_2$, where v can be an integer from 1 to 10;

$R^9$ can independently be selected from —H or $C_1$-$C_4$ alkyl chain optionally substituted with a heteroatom (e.g., $CH_2OH$);

$X^a$ and $X^b$ are independently selected from H, $CH_3$, or a $C_1$-$C_6$ alkyl chain optionally substituted with a heteroatom (e.g., $CH_2OH$);

r can be an integer from 2 to 10,000;

a can be an integer from 0 to 11; and each s can independently be can integer from 2 to 8.

Some illustrative embodiments include homopolymers having one of the following formulae:

(Formula 14b)

(Formula 14c)
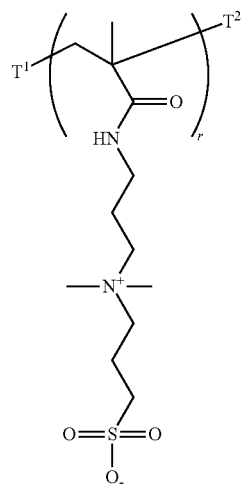
where T¹ and T² can independently be any group; and
r can be an integer from 2 to 10,000.
Some illustrative embodiments include homopolymers having one of the following formulae:
(Formula 14d)
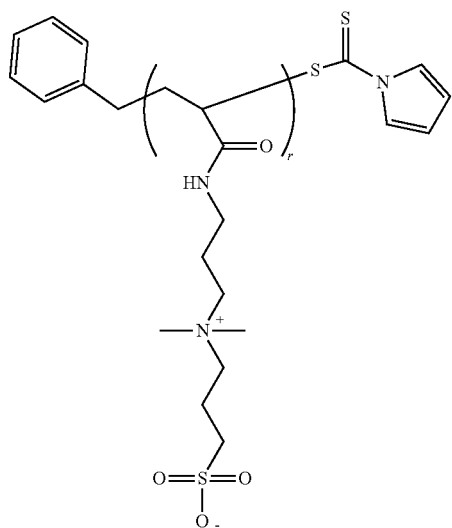
;
(Formula 14e)
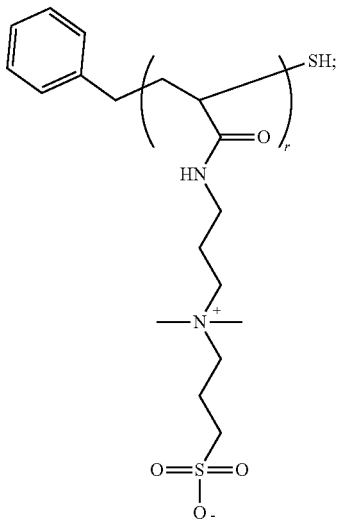
(Formula 14f)
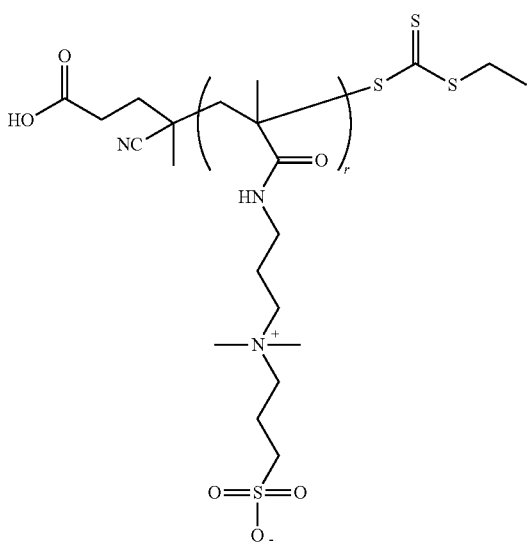
;
(Formula 14g)
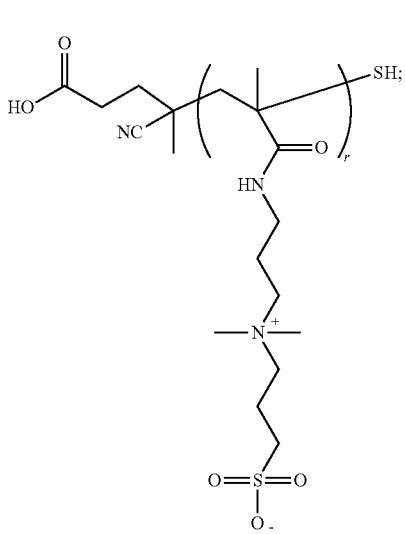

-continued

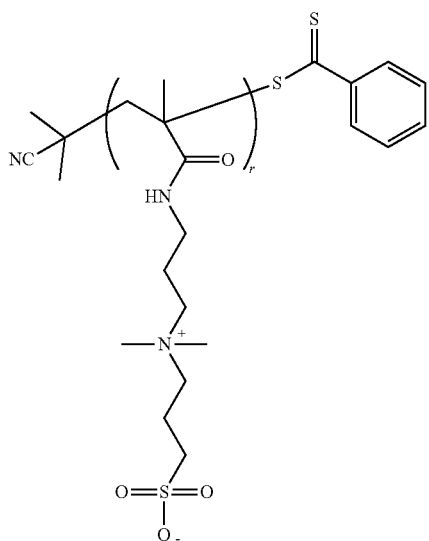
(Formula 14h)

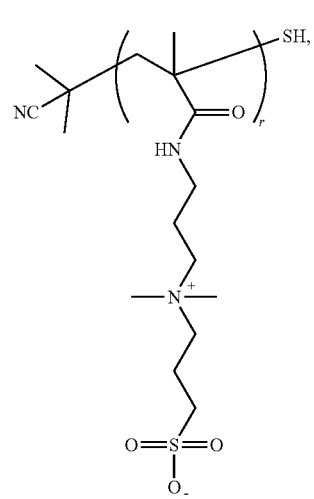
(Formula 14i)

where r can be an integer from 2 to 10,000.

Some illustrative embodiments include methods of forming a polymer comprising:

combining at least one monomer of formula 1a or 1b

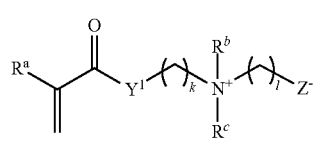
(Formula 1a)

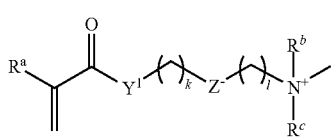
(Formula 1b)

where $R^a$, $R^b$ and $R^c$ are independently H, or alkyl;

$Y^1$ is O or NH;

k is an integer from 2 to 11;

l is an integer from 1 to 6; and $Z^-$ comprises a sulfonate group, a carboxylate group, a phosphinate group, a phosphate group, a sulfate group, or $-OP(OH)_2O$;

at least one radical source; and a reversible addition-fragmentation chain-transfer (RAFT) agent.

Some illustrative embodiments include articles comprising a portion comprising a polymer according to any of the above illustrative and more specifically illustrative polymer embodiments above. Some illustrative embodiments include articles comprising a surface, the surface having a polymer according to any of the above illustrative and more specifically illustrative polymer embodiments above.

Some illustrative embodiments include articles comprising: a surface comprising a thermoset elastomer; and a residue of a surface reagent that results after a reaction between the thermoset elastomer and surface reagent. The residue of a surface reagent comprises at least one reactive group. In a preferred embodiment the residue of a surface reagent comprises at least one unsaturated bond.

Some illustrative embodiments include methods of functionalizing a thermoset elastomer surface, the method comprising: combining a thermoset elastomer surface with a surface reagent, the surface reagent comprising at least one unsaturated bond that attaches to the thermoset elastomer surface and at least one reactive group that does not attach to the thermoset elastomer surface.

Some illustrative embodiments include articles comprising: a thermoset elastomer, a residue of a surface reagent and a modifier attached to the residue of the surface reagent. The surface reagent attaches to the thermoset elastomer and then the modifier attaches to the residue of the surface reagent. The modifier can be chosen to impart any desired property or reactivity to the thermoset elastomer surface. Modifiers can include non-polymeric small molecule modifiers and polymeric modifiers. Attachment of a modifier to a residue of a surface reagent attached to a surface forms a modified surface.

Some illustrative embodiments include methods of making a low coefficient of friction surface, the method comprising: combining a polymer known to impart a low coefficient of friction such as a polysiloxane, fluorinated polymer, or hydrophilic polymer such as polyvinylpyrrolidone, polyethylene glycol and polyvinyl alcohol or selected from polymers according to any of the illustrated polymers or even more specific illustrative embodiments above and mixtures thereof; and a surface, wherein the polymer attaches to the surface to make a low coefficient of friction surface.

Some illustrative embodiments include methods of making a surface resistant to biofouling, the method comprising: combining a thermoset elastomer surface with a surface reagent, the surface reagent comprising at least one unsaturated bond that attaches to the thermoset elastomer surface.

Some illustrative embodiments include articles comprising: a bulk; a surface; and a modified surface attached to the surface of the bulk, the modified surface comprising non-polymeric small molecule modifiers or polymer modifiers Some illustrative embodiments include methods of making a surface hydrophilic, the method comprising: combining a disclosed polymer modifier; and a surface, wherein the polymer modifier attaches to the surface to make the surface hydrophilic.

Some illustrative embodiments include methods of making a surface more resistant to biofouling, the method comprising: combining a modifier; and a surface, wherein the polymer modifier attaches to the surface to make the surface more resistant to biofouling than the surface is without the polymer attached thereto.

Some illustrative embodiments include methods of making a low coefficient of friction surface, the method comprising: combining a polymer known to impart a low coefficient of friction such as a polysiloxane, fluorinated polymer, or hydrophilic polymer such as polyvinylpyrrolidone, polyethylene glycol and polyvinyl alcohol or selected from polymers according to any of the illustrated polymers or even more specific illustrative embodiments above and mixtures thereof; and a surface, wherein the polymer attaches to the surface to make a low coefficient of friction surface.

Some illustrative embodiments include articles comprising: a surface comprising a thermoset elastomer; and a residue of a surface reagent attached to the thermoset elastomer surface, wherein the surface reagent comprises at least two unsaturated bonds.

Some illustrative embodiments include methods of functionalizing a thermoset elastomer surface, the methods comprising: combining a thermoset elastomer surface with a surface reagent, the surface reagent comprising at least two unsaturated bonds wherein at least one of the unsaturated bonds attaches the surface reagent to the thermoset elastomer surface.

Some illustrative embodiments include compounds of any of formulae 7a, 7b or combinations thereof:

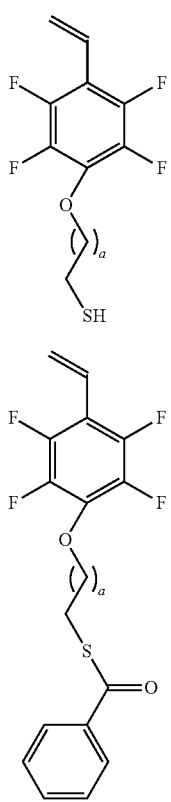

(Formula 7a)

(Formula 7b)

wherein a is an integer from 0 to 11.

Some even more specific embodiments include such compounds, wherein the compound is selected from compounds of formulae 7c, 7d, 7e or combinations thereof:

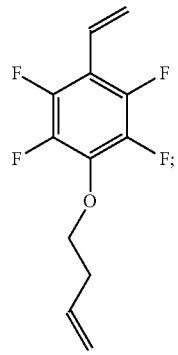

(Formula 7c)

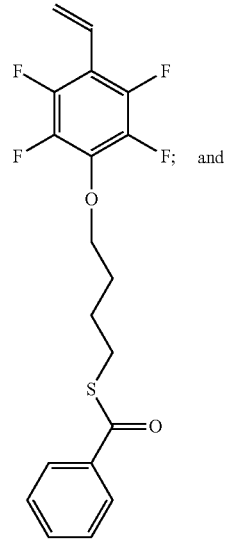

(Formula 7d)

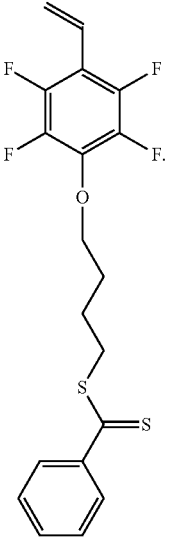

(Formula 7e)

Some illustrative embodiments include compounds of any of formulae 8a, 8b, 8c or combinations thereof:

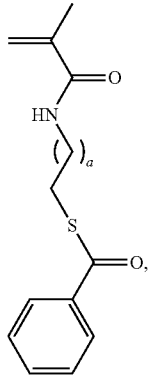
(Formula 8a)

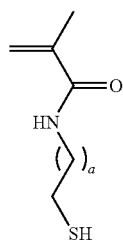
(Formula 8b)

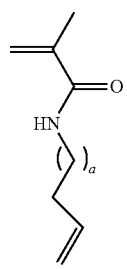
(Formula 8c)

wherein a is an integer from 0 to 11.

Some even more specific embodiments include such compounds, wherein the compound is selected from compounds of formulae 8d, 8e, 8f, or combinations thereof:

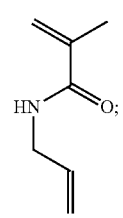
(Formula 8d)

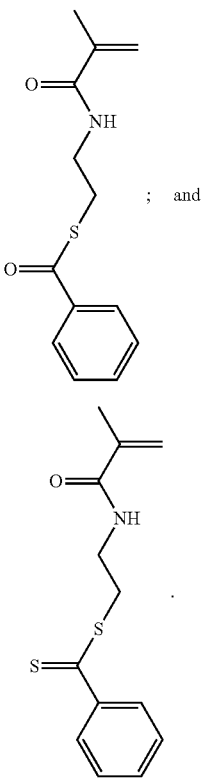
(Formula 8e)

; and (Formula 8f)

The above summary of the present disclosure is not intended to describe each disclosed embodiment or every implementation of the present disclosure. The description that follows more particularly exemplifies illustrative embodiments. In several places throughout the application, guidance is provided through lists of examples, in which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Zwitterionic Monomers

Figure 1A:
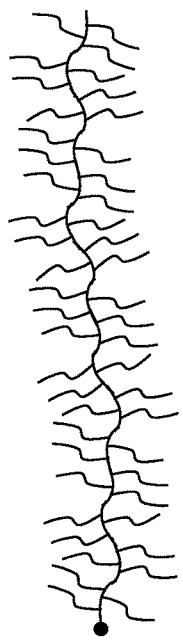
FIGS. 1A and 1B schematically illustrate disclosed polyzwitterionic polymers that include reactive functional groups at different locations.

Disclosed polymers are formed from at least one monomer that includes a zwitterionic group, referred to herein as a zwitterionic monomer. At least one zwitterionic monomer can be polymerized by itself to form a homopolymer, with a different zwitterionic monomer to form a copolymer, or with a second type of monomer, non-zwitterionic, to form a copolymer. In some embodiments where the zwitterionic monomer is polymerized with itself or with a different zwitterionic monomer, at least one of the types of zwitterionic monomers include both a zwitterionic group and a reactive functional group. In other embodiments where the zwitterionic monomer is polymerized with itself or with a different zwitterionic monomer, at least one of the types of zwitterionic monomers include both a zwitterionic group and a reactive functional group and optionally can include a non-reactive non-zwitterionic group. In still other embodiments where the zwitterionic monomer is polymerized with itself or with a different zwitterionic monomer, at least one of the types of zwitterionic monomers include both a zwitterionic group and a non-reactive non-zwitterionic group. A reactive functional group, as used herein, also includes a latent reactive functional group that can be modified, e.g., deprotected, to result in a reactive functional group. In some embodiments where the zwitterionic monomer is polymerized with a non-zwitterionic monomer, the non-zwitterionic monomer, the zwitterionic monomer, or both can include a reactive functional group.

In some embodiments zwitterionic monomers that are polymerized with themselves to form a homopolymer or with a second type of zwitterionic monomer to form a copolymer can be polymerized via reversible addition-fragmentation chain transfer (RAFT) polymerization. In some embodiments, disclosed copolymers formed from at least one monomer that includes a zwitterionic group and at least one monomer that includes a reactive group that can be polymerized using any type of free radical polymerization, including for example RAFT polymerization.

Zwitterionic monomers include one or more zwitterionic functional groups. A zwitterionic functional group is a chemical group that includes at least one positively and at least one negatively charged portion. Illustrative positively charged portions can include quaternary ammonium groups. Illustrative negatively charged portions can include sulfonate groups, carboxylate groups, phosphonate groups, phosphinate groups, sulfate groups, and —OP(OH)$_2$O groups. Illustrative zwitterionic functional groups can include, for example betaines such as carboxybetaines (which include a negatively charged carboxylate group and a positively charged quaternary ammonium group) e.g., N$^+$(R)$_3$(CH$_2$)$_x$C(=O)O$^-$, phosphorylbetaines (which include a negatively charged phosphate group and a positively charged quaternary ammonium group) e.g., ROP((=O)O$^-$)O(CH$_2$)$_x$N(R)$_3^+$, and sulfobetaines (which include a negatively charged sulfonate and a positively charged quaternary ammonium group) N$^+$(R)$_3$(CH$_2$)$_x$S(=O)$_2$O$^-$. Substituted derivatives of carboxybetaines, phosphorylbetaines and sulfobetaines can also be utilized as zwitterionic groups in zwitterionic monomers. For example, the groups indicated as R in the general formulas of carboxybetaines, phosphorylbetaines and sulfobetaines can be modified to form derivatives of carboxybetaines, phosphorylbetaines and sulfobetaines. In some embodiments, zwitterionic monomers can include sulfobetaines, for example.

Zwitterionic monomers also include a polymerizable group. Virtually any polymerizable group can be included in the zwitterionic monomer. Illustrative polymerizable groups can include vinylic groups. Illustrative vinylic groups can include, for example acryl esters, methacryl esters, acrylamides, and methacrylamides. Alkyl substitution (e.g.) methyl, ethyl, or larger at the α-carbon in the polymer backbone may increase the resistance of the polymer to hydrolysis.

Zwitterionic monomers may also include one or more reactive groups. Illustrative examples of reactive functional groups or protected reactive functional groups can include alkene groups, alkyne groups, nitrile groups, thiol groups, amine groups, carboxylic acid groups, ester groups, biotin groups, phthalimido groups, activated alkyne or alkene groups, Michael acceptors, maleimide groups, vinyl sulfone groups, silyl groups, dienophile groups, thioester groups, dithioester groups, thiocarbonylthio groups, dithiocarbamate groups, cyclopentadienyl groups, sulfonylthioformate groups, epoxy groups, hydroxyl groups, succinimide groups, pentafluorophenyl groups, carbonylazide groups, azide groups, isocyanate groups and photoreactive groups. Any method of protecting a reactive functional group can be utilized herein for any reactive functional group included in monomers, polymers, or otherwise. In some embodiments, a protective group can be chosen for ease of analysis (e.g., ease of identification using NMR), cost effectiveness of the reactants and deprotection scheme, ease of the synthetic steps, or any combination thereof. For example, an S-benzoyl protecting group may be useful for analysis purposes because the aromatic protons can easily be identified in a NMR spectra; and an acetyl protecting group may be useful from the standpoint of cost effectiveness if considering large scale reactions.

Formulae 1a and 1b illustrate specific examples of generic structures of zwitterionic monomers and annotates the relevant portions thereof:

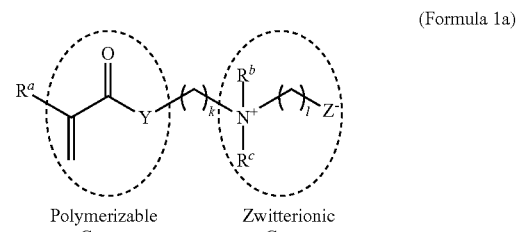

(Formula 1a)

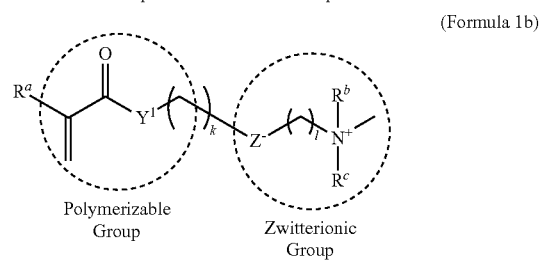

(Formula 1b)

where R$^a$, R$^b$ and R$^c$ are independently selected from H, or alkyl; Y$^1$ is O or NH; k is an integer from 2 to 11; l is an integer from 1 to 6; and Z$^-$ is sulfonate, carboxylate, phosphinate, phosphate, —OP(OH)$_2$O, or sulfate. In some embodiments, R$^a$ is a C$_1$ to C$_6$ alkyl and in some embodiments R$^a$ is —CH$_3$ or —CH$_2$CH$_3$. It should be noted in the general formulae 1a and 1b the acryl or amide indicated with the circle is only one possibility for the polymerizable group; and the portion indicated with the dashed circle is the zwitterionic portion.

Specific, illustrative zwitterionic monomers are exemplified below. It should be noted that the specific compounds presented herein are only examples of possible zwitterionic monomers. The specific illustrative zwitterionic monomers include:

3-(methacryloylamino)propyl]dimethyl(3-sulfopropyl) ammonium hydroxide inner salt (SBMAam), also referred to as N,N-Dimethyl-N-(3-methacrylamidopropyl)-N-(3-sulfopropyl) ammonium betaine (SPP) manufactured by Raschig GMBH is seen in formula 2

(Formula 2)

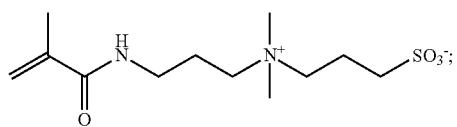

N-(3-Sulfopropyl)N-methacryloyloxyethyl-N,N-dimethyl ammonium betaine (SPE) manufactured by Raschig GMBH is seen in formula 3

(Formula 3)

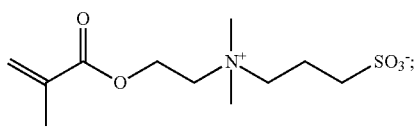

Sulphopropyldimethylammonioethyl acrylate (SPDA), manufactured by Raschig GMBH is seen in formula 4:

(Formula 4)

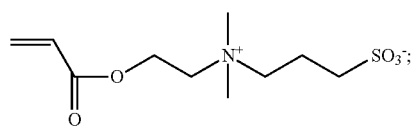

sulphohydroxypropyldimethylammoniopropyl methacrylamide (SHPP), manufactured by Raschig GMBH is seen in formula 5:

(Formula 5)

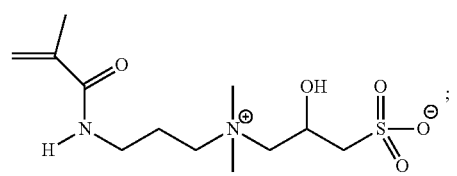

and 4-((3-acrylamidopropyl)dimethylammonio)butanoate is seen in formula 6:

(Formula 6)

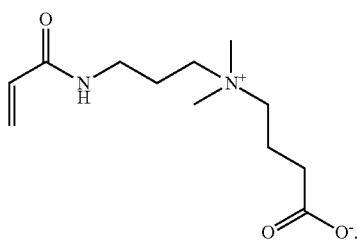

Non-Zwitterionic Monomers

In some embodiments, disclosed zwitterionic monomers can be polymerized with a non-zwitterionic monomer to form a copolymer. Useful non-zwitterionic monomers, if utilized to form disclosed polymers, include polymerizable groups such as vinyl groups, acryl ester groups, methacryl ester groups, acrylamide groups and methacrylamide groups, for example. Other polymerizable groups could also be utilized herein. Non-zwitterionic monomers that include such polymerizable groups can also include one or more reactive functional groups or groups that can be changed into, e.g., deprotected into reactive functional groups.

Non-zwitterionic monomers can optionally include a reactive functional group. A reactive functional group can be useful in combination with a zwitterionic monomer to provide pendant functionality to the polymer. The pendant functionality can be useful to attach the polymer to a surface, for example. In some embodiments, a monomer containing a reactive functional group can be polymerized while in a protected state and then deprotected to facilitate additional steps, such as attaching the polymer to a surface, for example. In some embodiments, a monomer containing a reactive functional group can be reacted or modified to convert one reactive functional group into another reactive functional group having a different reactivity.

In some embodiments, any polymerizable monomer that does not include a zwitterionic portion could be utilized. In some embodiments, vinyl containing monomers, acryl ester containing monomers, methacryl ester containing monomers, acrylamide containing monomers or methacrylamide containing monomers can be useful. Such monomers can also include substituted or derivatized versions of such monomers, e.g., substituted or derivatized at positions other than the polymerizable portion.

An example of specific, illustrative non-zwitterionic monomers that may be useful can include derivatized 3-buten-1-oxy derivatized perfluoroaryl, which has the general Formula 7 below. In compounds of formula 7, the vinyl group ($CH{=}CH_2$) renders the monomer polymerizable and the $R^X$ group can provide functionality to the polymer, once formed.

Formula 7

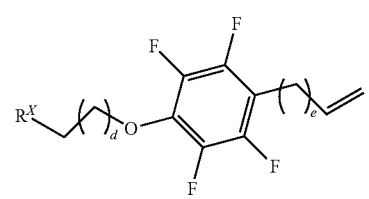

In formula 7, $R^X$ can include at least one reactive functional group or protected reactive functional group or non-reactive, non-zwitterionic group; and d can be an integer from 0 to 11, 0 to 8, 0 to 4, or even 1 to 3; and e can be an integer from 0 to 5, 0 to 3, 0 or 1, or even 0. It should also be noted that the optional additional carbons at d and e may be substituted with additional carbons or heteroatoms. In some preferred embodiments e=0. Illustrative non-reactive, non-zwitterionic groups that can be Rx or can be a part of Rx can include alkanes with and without heteroatoms and are groups not utilized in a subsequent reaction. Illustrative reactive functional groups that can be $R^X$ or can be part of $R^X$ can include, for example, alkene groups, alkyne groups, nitrile groups, thiol groups, amine groups, carboxylic acid groups, ester groups, biotin groups, phthalimido groups, activated alkyne or alkene groups, Michael acceptors, maleimide groups, vinyl sulfone groups, silyl groups, dienophile groups, thioester groups, dithioester groups, thiocarbonylthio groups, dithiocarbamate groups, diene groups, cyclopentadienyl groups, sulfonylthioformate groups, epoxy groups, hydroxyl groups, succinimide groups, pentafluorophenyl groups, carbonylazide groups, azide groups, isocyanate groups and photoreactive groups. In some embodiments, $R^X$ can include a structure that can be deprotected to form said reactive functional groups. Some illustrative reactive functional groups can be used without a protective group, for instance an alkene group. Others of the reactive functional groups require a protective group or could be modified during polymerization. A particular protective group can be chosen with respect to the polymerization reaction and the chemical structure of the reactive functional group, for example. One of skill in the art would be well aware of factors that should be considered when making such decisions. For example, many protective groups and schemes can be found in Greene, Theodora W.; Wuts, Peter G. M. "Protective Groups in Organic Synthesis $3^{rd}$ edition" John Wiley and Sons, Inc. 1999.

Formulae 7a and 7b show more specific, but still generalized compounds according to formula 7. In both of formulae 7a and 7b, a can be an integer from 0 to 11, from 1 to 5, from 1 to 4, or even from 1 to 3:

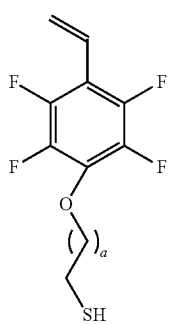

(Formula 7a)

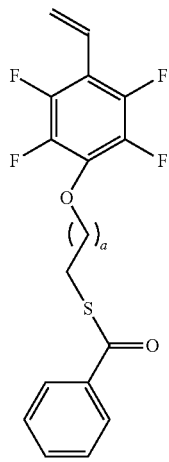

(Formula 7b)

Specific, illustrative compounds of formula 7, 7a and 7b include the following:

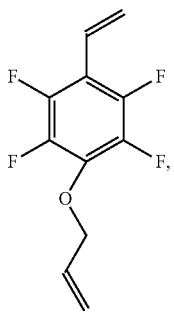

(Formula 7c)

which includes an alkene as a reactive functional group;

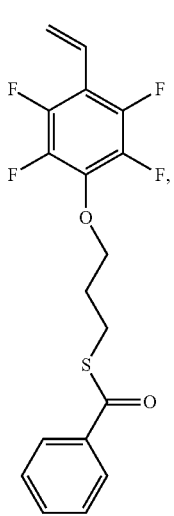

(Formula 7d)

which includes a protected thiol as a protected reactive functional group (removal of the benzoyl group forms the thiol); and

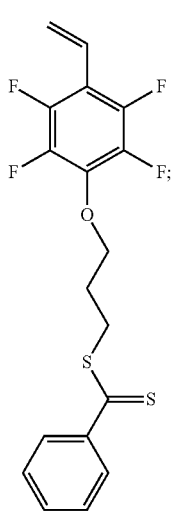

(Formula 7e)

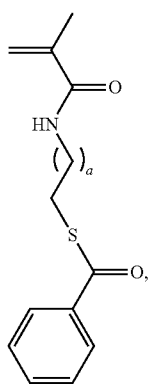

(Formula 8a)

which includes a protected thiol as a protected reactive functional group (removal of the thiobenzoyl group forms the thiol). The thiol group can easily be deprotected in a basic solution, optionally through aminolysis. The copolymerization of monomers of general Formula 7 (e.g., specific formulae 7c, 7d and 7e) with zwitterionic monomers has not been previously reported.

Additional examples of specific, illustrative non-zwitterionic monomers that may be useful can include acrylamide containing non-zwitterionic monomers having the general formula 8 below. In compounds of formula 8, the vinyl group (CH=CH$_2$) renders the monomer polymerizable and the $R^X$ group can provide functionality to the polymer, once formed, as in Formula 7 above.

(Formula 8b)

Formula 8

(Formula 8c)

In formula 8, $R^X$ can include at least one reactive functional group or protected reactive functional group or non-reactive, non-zwitterionic group; and e is an integer from 1 to 11, 1 to 8, 1 to 4, or 1 to 3. D can include hydrogen (H) or an alkyl (e.g., methyl). It should also be noted that the optional additional carbons provided by "f" may be substituted with additional carbons or heteroatoms. Illustrative examples of groups that can be $R^x$ or can be part of $R^x$ can be seen as listed above with respect to formula 7 above.

Formulae 8a, 8b and 8c show more specific, but still generalized compounds according to formula 8. In formulae 8a, 8b and 8c, a can be an integer from 0 to 11, 0 to 6, 0 to 4, or even 0 to 3.

Specific, illustrative compounds of formula 8, 8a, 8b and 8c include the following:

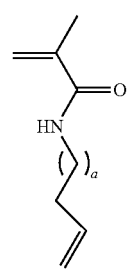

(Formula 8d)

which includes an alkene as a reactive functional group;

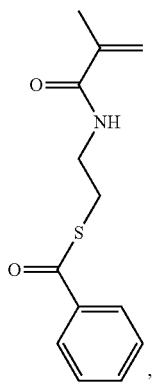
(Formula 8e)

which includes a protected thiol as a protected reactive functional group (removal of the benzoyl group forms the thiol); and

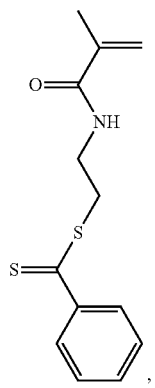
(Formula 8f)

which includes a protected thiol as a protected reactive functional group (removal of the thiobenzoyl group forms the thiol). The thiol group can easily be deprotected in a basic solution, optionally through aminolysis.

Polymerization of monomers without reaction of a pendant alkene group (as is included in the compound of formula 8d) can be challenging since the radical process that initiates the desired polymerization reaction can also initiate that formation of a radical from the pendant alkene. For instance, although a polymerization of N-allylmethacrylamide (Formula 8d) under standard free radical conditions using AIBN in toluene at 60-70° C. was reported in 1966, the resulting polymer was insoluble in common solvents and therefore it was assumed that crosslinking by the allyl group occurred (*J. Polym. Sci. Part A: Polym. Chem.* 1966, (4) 5, 1191-1201). Polymerization of N-allylmethacrylamide by RAFT has not been previously reported. As seen in the following examples, when N-allylmethacrylamide is polymerized by RAFT, the RAFT agent selects the alpha-beta unsaturated alkene over the allyl alkene.

Additional examples of specific, illustrative non-zwitterionic monomers that may be useful can include vinyl amide containing non-zwitterionic monomers having the general formula 8g below. In compounds of formula 8d, the vinyl group (CH=CH$_2$) renders the monomer polymerizable and the $R^X$ group can provide functionality to the polymer, once formed, as in Formula 7 above.

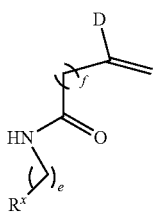
(Formula 8g)

In formula 8g, $R^X$ can include at least one reactive functional group or protected reactive functional group or non-reactive, non-zwitterionic group; and e can be an integer from 1 to 11 and f can be an integer from 0 to 10. In some preferred embodiments, f equals 0. It should also be noted that the optional additional carbons at e and f may be substituted with additional carbons, heteroatoms or repeating units of carbon with heteroatoms, for example $(CH_2CH_2O)_h$ where h is an integer from 1 to 4. Illustrative examples of groups that can be $R^X$ or can be part of $R^X$ can be seen as listed above with respect to formula 7 above.

Amounts of Monomers

In some embodiments, disclosed zwitterionic monomers may be polymerized with themselves or with other zwitterionic monomers. Such embodiments form homopolymers or copolymers including only zwitterionic monomers. In some embodiments, disclosed zwitterionic monomers may be polymerized with one or more non-zwitterionic monomers. Such embodiments form copolymers. The amounts of a first zwitterionic monomer, an optional second (or further) zwitterionic monomer, an optional first non-zwitterionic monomer, an optional second (or further) zwitterionic monomer can all be varied based on desired properties of the polymer, process considerations, other factors not noted here, or any combination thereof.

In some embodiments, not less than 25% of zwitterionic monomers (one or more than one), with respect to the total monomers can be utilized to form a polymer. In some embodiments, not less than 30%, 40%, 45%, 50%, 55%, 60%, 65%, 70%, 75%, 80%, 85%, 90%, 95% or 99% of zwitterionic monomers (one or more than one) with respect to the total monomers can be utilized to form a polymer. As used herein, a percentage of monomer utilized (e.g., at least 25% of one or more zwitterionic monomers) to form a polymer can refer to the percent by weight or the percent by number. For example, a polymer formed from at least 25% zwitterionic monomers could mean either that at least 25 moles zwitterionic monomers were polymerized with not more than 75 moles non-zwitterionic monomers; or that at least 25 g zwitterionic monomers were polymerized with not more than 75 g non-zwitterionic monomers. The total moles or total weight only considers the monomers, not additional materials that may be utilized in the polymerization (e.g., initiators, solvents, etc.).

Optionally, a percentage of monomer can also refer to the amount of that monomer(s) in a final polymer. As such, the amount of monomer in the final polymer can be characterized with weight. In this context, weight can refer to the weight of the monomer(s) unit in the polymerized chain relative to the total calculated weight of the chain. Polymer weights refer to a weight average molecular weight unless otherwise indicated. The amount of monomer in the final polymer can also be characterized with a percentage based on number. In this context, a number refers to a number of the monomer repeats in the backbone of the chain relative to the total number of monomer repeats in the backbone. In some embodiments, a polymer can be described by the ratio of the number of n repeat units with respect to the number of m repeat units or vice versa (referring to the formulae below for definition of m and n).

Polymerization

Disclosed polymers can be formed using monomers such as those discussed above. As such, one of skill in the art will understand that the characteristics, structures, or combinations thereof provided above with respect to the zwitterionic monomers and optionally non-zwitterionic monomers apply to disclosed polymers. For example, any of the chemical structures indicated above can be present in disclosed polymers as would be known to one of skill in the art depending on the method of polymerization.

Disclosed polymers can be made using any type of free radical polymerization, ring opening metathesis polymerization, catalyzed chain transfer polymerization, ATRP, reversible deactivation radical polymerization, cyclopolymerization, anionic polymerization, cationic polymerization, polycondensation reaction polymerization, photopolymerization, synthesis by post-polymerization modification, step growth polymerization, and polymerization of zwitterionic monomers. In instances where free radical polymerization is utilized, free radicals can be generated via a variety of mechanisms including for example the use of suitable initiator compounds, electrochemical generation, thermal generation or generation via exposure to light (e.g., UV, gamma, etc.).

One specific type of free radical polymerization that can be utilized herein can include reversible addition-fragmentation chain transfer polymerization, or RAFT polymerization. RAFT polymerization is a kind of reversible-deactivation radical polymerization. RAFT polymerization can be performed under various conditions in order to provide various architectures of the polymer including, for example brush polymers, star polymers, comb polymers, $AB_2$ star polymers, palm-tree $AB_n$ polymers, H-shaped $B_2AB_2$ polymers, dumbbell polymers, ring block polymers, star block $AB_n$ polymers, coil-cycle-coil polymers, and star $A_nB_n$ polymers. RAFT is a very versatile method of polymerization that confers living characteristics to radical polymerization. RAFT affords control over the generated molecular weight and polydispersity during a free-radical polymerization.

RAFT makes use of a chain transfer agent, which can also be referred to as a RAFT agent and can be represented by the formula 9

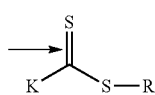

(Formula 9)

In formula 9, the C=S bond is reactive towards radical addition. The arrow in formula 9 indicates a reactive double bond. K is a group chosen to provide the chain transfer agent an appropriate reactivity towards propagating radicals and convey appropriate stability to the intermediate radicals. R is a homolytic leaving group such that the radical R· is capable of efficiently reinitiating polymerization.

In some embodiments, useful RAFT agents are those of formula 9 where K and R are chosen to provide desired polymerization reaction kinetics and structural control. Illustrative thiocarbonylthio compounds include dithiobenzoates (Formula 10a), dithiocarbamates (Formula 10b) and trithiocarbonates (Formula 10c), the structures of which are given below.

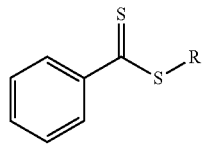

Formula 10a

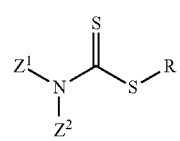

Formula 10b

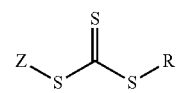

Formula 10c

A RAFT polymerization system includes a radical source, monomer or macromer and a RAFT agent. The radical source can include thermal initiators, light initiators or gamma initiators. Illustrative examples of radical initiators can include, for example diazo- and peroxide-initiators. Specific illustrative examples of radical initiators can include, for example, azobisisobutyronitrile (AIBN) and 4,4'-azobis(4-cyanovaleric acid) (ACVA). In some embodiments solvents may also be included in the RAFT polymerization system. A wide range of initiators and solvents can be utilized. The RAFT agent can be chosen specifically to polymerize certain families of monomers in some instances.

Conditions for RAFT polymerization can be chosen so that desired properties are obtained in the polymer. For example, temperatures can be chosen to control the rate at which the polymer chain is grown, the rate of free radical generation from the radical source, to shift the central RAFT equilibrium so that it favors chain growth at a desired rate, or any combination thereof.

RAFT polymerization generally leaves terminal functional groups on the polymer since the RAFT mechanism proceeds by insertion of monomer units into the RAFT agent. Scheme 1 below illustrates the RAFT polymerization process with a general RAFT agent and more specific RAFT agents. As seen in Scheme 1, the RAFT agent R group is separated from the other moieties of the RAFT agent by breaking the bond between the sulfur and the R group. Formulae 11a to 11c show the bonds broken in specific RAFT agents.

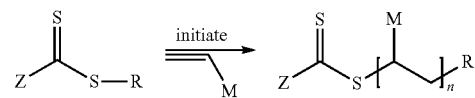

in which M is a monomeric pendant group.

Scheme 1

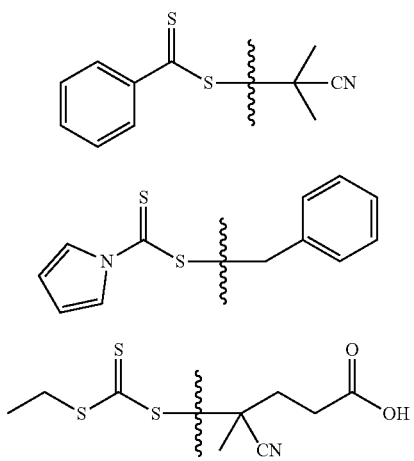

Formula 11a

Formula 11b

Formula 11c

In some embodiments, the RAFT agent, or more specifically, the portions of the RAFT agent that remain on the polymer can be chosen to provide groups on the resulting polymer that can be attached to a surface or reacted further and then attached to a surface. In some such embodiments, the RAFT agent moiety left on the polymer can include a thiol group or other nucleophile. Thiol groups, nucleophiles or groups susceptible to radical reactions can be particularly advantageous because there are numerous well known chemistries useful to exploit such groups to attach them to a surface. For example, a thiol group or a group that can be deprotected to form a thiol group on a polymer (e.g., from a RAFT agent) can be reacted in a thiol-yne or thiol-ene reaction with functional groups on a surface that include an unsaturated carbon carbon bond.

In some embodiments, RAFT agents can be chosen so that a RAFT agent moiety that remains after polymerization is a thiocarbonylthio group (see RAFT agents S(CS)Z group, and Willcock and O'Reilly, End Group removal and Modification of RAFT polymers, *Polymer Chemistry*, 2010 (1) 149-157). There are a number of methods available for further reaction of thiocarbonylthio groups, including photochemical and thermal elimination, reaction with nucleophiles and ionic reducing agents (e.g., amines, hydroxides, borohydrides, etc.), and reactions with alkene groups or alkyne groups. Thermolysis provides elimination of the RAFT agent moiety, yielding an unsaturated chain end. The thiocarbonyl may also be used as a dienophile with both small molecule dienes and dienes at polymer chain ends in hetero-Diels-Alder reactions.

In some embodiments, a RAFT agent can be chosen so that a RAFT agent moiety that remains after polymerization is one that can be further reacted to provide a reactive group for later reaction, e.g., as a linking agent to a surface. The RAFT agent may have latent functionality in that the reactive group can be generated before or during the coupling reaction to the surface. Certain embodiments herein include a thiol group generated on a terminal end of the polymer in order to react with a functionalized surface. This process may be advantageous because it can provide a "one-pot" chemistry that involves placing a surface prepared with suitable functional groups in the presence of a zwitterionic polymer with a RAFT agent moiety. Since the RAFT agent provides a moiety that mediates a linkage, additional chemicals are not necessary to complete the process.

Polymers

Disclosed herein are polymers that include at least zwitterionic groups, or stated another way, at least a residue of a zwitterionic monomer (e.g., a polymerized monomer can be described as a residue of a monomer). As such, disclosed polymers can be referred to herein as, zwitterionic polymers or polyzwitterionic polymers. Zwitterionic polymers are molecules that carry no net charge, are highly polar, and bind water tightly. No net charge is stated because the positively charged and negatively charged groups present in the polymer are equal in number. However, zwitterionic polymers may not be charge neutral in aqueous environments due to the differences in the relative strength of their acid and base components. Such polymers may be useful in any instance where it is useful to associate water onto molecules or materials, for instance material surfaces, finished products, and particles. Modifications to materials to associate with water for resistance to biofilm formation or other surface-fouling environments for example are possible illustrative applications where zwitterionic polymers may be useful.

Disclosed zwitterionic polymers may be copolymers. A copolymer is a polymer that includes or is polymerized from more than one type of monomer. Disclosed zwitterionic polymers may have a structure as seen in Formula 12 below.

(Formula 12)

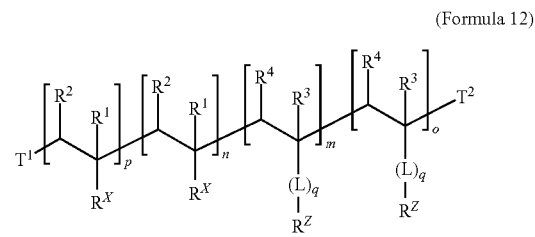

In formula 12, $T^1$ and $T^2$ can independently be any group; $R^X$ independently include at least one reactive group or non-reactive, non-zwitterionic group; $R^Z$ includes at least a zwitterionic portion; $R^1$ and $R^3$ are independently hydrogen, substituted or unsubstituted alkyl, or halogen; $R^2$ and $R^4$ are independently hydrogen, substituted or unsubstituted alkyl, substituted or unsubstituted alkoxy, or halogen; q can independently be 0 or 1 and when an independent q is 1, the associated L can be a linker group; m can be an integer from 1 to 10,000; n can be an integer from 0 to 10,000; o can be an integer from 0 to 10,000; and p can be an integer from 0 to 10,000. It is also to be understood that additional monomer fragments of the type represented by the p and n brackets (e.g., non-zwitterionic monomer fragments) can also be included in disclosed polymers, e.g., any number of different non-zwitterionic monomers can be polymerized to form disclosed polymers. It is also to be understood that additional monomer fragments of the type represented by the m and o brackets (e.g, the zwitterionic monomer fragments) can also be included in disclosed polymers, e.g., any number of different zwitterionic monomers can be polymerized to form disclosed polymers. It is also to be understood that the order of the monomer fragments need not be as represented by Formula 12. For example, disclosed polymers can be block copolymers, random copolymers, alternating copolymers, or other copolymers which may be combinations of block, random and alternating copolymers for example.

The formation of block copolymers and/or the characteristics of block copolymers, random copolymers, alternating copolymers, or any combination thereof can be controlled, at least somewhat by controlling when certain monomers are introduced into the polymerization system. In some embodiments, a first zwitterionic monomer can be polymerized first and a second zwitterionic monomer can be introduced after, or at the end of polymerization so that the groups of the second zwitterionic monomers are in blocks or are primarily located near the termini of the polymers. In some embodiments, a first zwitterionic monomer can be polymerized first and a second non-zwitterionic monomer can be introduced after, or at the end of polymerization of the first monomer polymerization so that the reactive groups of the second zwitterionic monomers are in blocks or are primarily located near the termini of the polymers. In some embodiments non-zwitterionic monomers with different types of pendant groups than a first non-zwitterionic monomer are introduced after, or near the end of, polymerization of a zwitterionic monomer and a first non-zwitterionic monomer (which can also be referred to as a second monomer) so that the pendant groups from the second non-zwitterionic monomers are in blocks or are primarily located near the termini of the polymers. In addition, the zwitterionic monomer can be reintroduced after, or near the end of, polymerization of a non-zwitterionic monomer so that the different types of pendant groups are in blocks that are primarily located near the center of the polymers. In other embodiments the zwitterionic monomers can be randomly arranged, alternating, or not at all controlled with respect to the monomers with different types of pendant groups. It should also be understood by one of skill in the art that any modifications, variations, or combinations of the above methods of controlling the nature of the polymer could also be utilized, as well as methods not specifically disclosed or contemplated herein.

$T^1$ and $T^2$ can be referred to as terminal groups. In some embodiments, the terminal groups can independently be derived from one or more RAFT agents. In some embodiments, the terminal groups can be a function of some other type of free radical polymerization. For example, $T^1$ and $T^2$ can independently be an alkyl (e.g., $C_1$ to $C_6$ alkyl), an aryl (e.g., phenyl), or a hydrogen (H).

In some embodiments, the terminal groups can be reactive. In some embodiments, a reactive group can have its reactivity modified, for example the type of reactivity, the level of reactivity, or both can be modified by reaction with some other molecule. For example, a group can be made reactive by deprotecting a portion thereof. In some embodiments the terminal groups can be utilized to attach (via any type of attachment mechanism, including, for example mechanical attachment, chemical attachment, dispersive attachment, electrostatic attachment, diffusive attachment, physical attachment, or any combination thereof) the polymer to a surface. In some embodiments $T^1$ and $T^2$ can independently be selected from reactive groups such as alkene groups, alkyne groups, nitrile groups, thiol groups, amine groups, carboxylic acid groups, ester groups, thioester groups, biotin groups, phthalimido groups, activated alkyne or alkene groups, Michael acceptor groups, maleimide groups, vinyl sulfone groups, silyl groups, dienophile groups, dithioester groups, thiocarbonylthio groups, cyclopentadienyl groups, sulfonylthioformate groups, epoxy, groups, hydroxyl groups, succinimide groups, pentafluorophenyl groups, carbonylazide groups, azide groups, isocyanate groups and photoreactive groups, for example.

The identity, origination, or both of $T^1$ and $T^2$ can depend at least in part on the polymerization method utilized. For example, if RAFT polymerization was utilized, $T^1$ and $T^2$ are likely RAFT agent moieties or a moiety substituted with alternative RAFT moieties. If some other type of free radical polymerization method was used, one or more of $T^1$ and $T^2$ may be substituted with any group, e.g., H, methyl, or alkyl, with substitution or derivatization of one or more of $T^1$ and $T^2$ to comprise a thiol, alkene, alkyne, nucleophile, or other reactive group, for example.

$R^X$, if present can include one or more reactive groups or non-reactive, non-zwitterionic groups. In some embodiments, a reactive group can have its reactivity modified, for example the type of reactivity, the level of reactivity, or both can be modified by reaction with some other molecule. In some embodiments the reactive group can be utilized to attach the polymer to a surface. In some embodiments $R^X$ can independently be selected from reactive groups such as alkene groups, alkyne groups, nitrile groups, thiol groups, amine groups, carboxylic acid groups, ester groups, biotin groups, phthalimido groups, activated alkyne or alkene groups, Michael acceptor groups, maleimide groups, vinyl sulfone groups, silyl groups, dienophile groups, dithioester groups, thiocarbonylthio groups, dithiocarbamate groups, cyclopentadienyl groups, sulfonylthioformate groups, epoxy, groups, hydroxyl groups, succinimide groups, pentafluorophenyl groups, carbonylazide groups, azide groups, isocyanate groups and photoreactive groups, for example.

$R^X$ may be the same or different in the polymer. In some embodiments, different $R^X$ may be independently selected to have different chemical structures in order to make a copolymer of two or more different monomeric units, for instance 3-10 different repeat units. Further, the copolymer may be a branched structure with the n and/or m repeat units having further side chains.

The $R^Z$ includes at least a zwitterionic group. As such, $R^Z$ includes at least a positively charged portion and a negatively charged portion. Any group that includes both a positively charged portion and a negatively charged portion can be utilized in $R^Z$. In some embodiments, $R^Z$ can have a structure such as that seen below in formula 12a

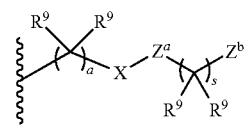

(Formula 12a)

In formula 12a, a can be an integer from 0 to 11 and s can be an integer from 2 to 8; X can be $CH_2$ or $(CH_2CH_2O)_v CH_2CH_2$, where v can be an integer from 1 to 10, 1 to 6, 1 to 4, or even 1 to 2; $R^9$ can independently be selected from —H or $C_1$-$C_4$ alkyl chain optionally substituted with a heteroatom (e.g., $CH_2OH$); one and only one of $Z^a$ and $Z^b$ are of a formula 12b

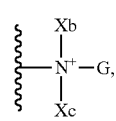

(Formula 12b)

where $X^b$ and $X^c$ are independently selected from H, $CH_3$, or a $C_1$-$C_6$ alkyl chain optionally substituted with a heteroatom (e.g., $CH_2OH$); and G is a bond (in the case of $Z^a$) or a terminal group (in the case of $Z^b$) and the other of $Z^a$ and $Z^b$ are selected from groups including at least one sulfonate, carboxylate, phosphate, phosphinate, —OP(OH)$_2$O, or sulfate. In some embodiments, R$^Z$ can include a quaternary ammonium ion (positively charged) where one of the alkyl chains connected thereto terminates in a negatively charged group (e.g., sulfonate, carboxylate, phosphate, phosphinate, —OP(OH)$_2$O, or sulfate) to provide the negatively charged portion to the zwitterionic group.

In some embodiments, R$^Z$ can include a nitrogen (N) within a cyclic structure that provides the positively charged group. As an illustrative example of such, the cyclic structure could be a pyridine ring, or the ring could be a benzimidazole or purine ring structure. An example of another possibility for R$^Z$ is seen below in formula 12c

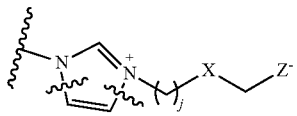

(Formula 12c)

In formula 12c, j is an integer from 0 to 6, 1 to 4, or even 1 to 2; X is as defined above and Z$^-$ is selected from groups including at least one sulfonate, carboxylate, phosphate, phosphinate, —OP(OH)$_2$O, or sulfate to provide the negatively charged group to the zwitterionic portion, R$^Z$. The imidazolyl ring in formula 12c can have additional carbons or heteroatoms (as indicated by the sinusoidal line) as well as be fused with additional rings, such as a phenyl ring.

In some embodiments, where the linker, L, is not present (e.g., q is 0), the positively charged portion of the zwitterion can be located preferentially on a ring that is part of the polymer backbone. An example of such an illustrative structure is seen in Formula 12d below:

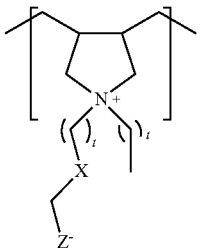

(Formula 12d)

In formula 12d, t is an integer from 0 to 6, 1 to 4, or even 1 to 2, X, and Z$^-$ are as defined above.

In Formula 12, when q is 0, L is not present. In formula 12, when q is 1, the associated L is present. As discussed above, L can be a linker group. In some embodiments, L can include an ester group, an amide group, an aromatic group, an ether group, a ring that optionally includes heteroatoms, two or more rings attached by an alkyl chain, two or more fused rings, fused rings that optionally contain aromaticity, two or more fused aromatic rings, an alkyl chain with or without branch points that could for example optionally be substituted with alcohol group(s), ether group(s), methyl group(s), fluoroalkyl group, heteroatom, carbamate group, or combinations thereof, or any number or combination thereof. In some embodiments, L can be an ether group of the formula (CH$_2$CH$_2$O)$_h$, where h is an integer from 1 to 4. In some embodiments, L can include heterocyclic aromatics, two or more aromatic groups attached by an alkyl chain, two or more fused aromatic groups, or any combination thereof. In some embodiments, L can include a-phenyl group.

In Formula 12 as well as anywhere present, m can be an integer from 1 to 10,000, 1 to 1,000, 1 to 100, 1 to 50, 1 to 25, 1 to 20, 10 to 40, or even 10 to 20 and all of n, o, and p can independently be integers from 0 to 10,000, 1 to 1,000, 1 to 100, 1 to 50, 1 to 25, 1 to 20, 10 to 40, or even 10 to 20. It is noted that the integers m and o (if a second or subsequent type of zwitterionic monomer is included) indicate the total amount of zwitterionic units and the integers n and p (if a second or subsequent type of non-zwitterionic monomer is included) indicate the total amount of non-zwitterionic units. The ratio of zwitterionic (m+o) to non-zwitterionic (n+p) can be controlled within the limits as defined by monomer reactivity, feed ratios, and by the concentration of both the zwitterionic and non-zwitterionic monomers present as well as reaction conditions (as well as their reactivity to the other monomers present) during the polymerization process. In some embodiments, the percentage of non-zwitterionic units with respect to the total (non-zwitterionic plus zwitterionic) can range from 0% to not greater than 75%, 0% to 50%, 0% to 30%, 0 to 15%, 0 to 10%, 0 to 5%, 1 to 50%, 1 to 30%, 1% to 10%, 1% to 5%. 0% non-zwitterionic units would indicate a zwitterionic homopolymer or a zwitterionic copolymer (two or more types of zwitterionic monomers being polymerized).

In some embodiments, disclosed polymers may have a formula 13, as seen below:

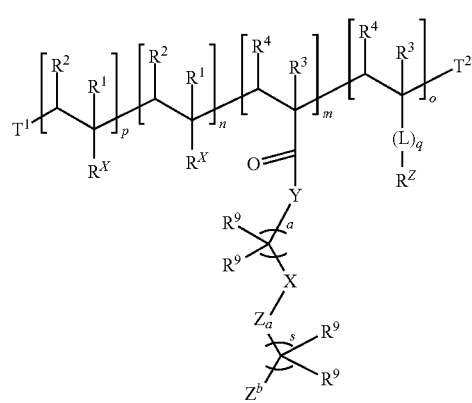

(Formula 13)

In formula 13, T$^1$, T$^2$, R$^1$, R$^2$, R$^3$, R$^4$, R$^X$, L, R$^Z$, Z$^b$, Z$^a$, X, a, s, m, n, o, p, and q are as defined above. Y in formula 13 can be O or NH. As such, for example, in formula 13, T$^1$ and T$^2$ can independently be any group; Y can be —O— or —NH; X can be CH$_2$ or (CH$_2$CH$_2$O)$_v$CH$_2$CH$_2$, where v can be an integer from 1 to 10, 1 to 6, 1 to 4, or even 1 to 2; R$^X$ comprises at least one reactive group or non-reactive, non-zwitterionic group; one of Z$^a$ and Z$^b$ comprises a zwitterionic portion that has a positive charge and the other of Z$^a$ and Z$^b$ comprises a zwitterionic portion that has a negative charge; R$^1$ and R$^3$ are independently hydrogen, substituted or unsubstituted alkyl, or halogen; R$^2$ and R$^4$ are independently hydrogen, substituted or unsubstituted alkyl, substituted or unsubstituted alkoxy, or halogen; R$^9$ can independently be selected from —H or C$_1$-C$_4$ alkyl chain optionally substituted with a heteroatom (e.g., CH$_2$OH); each q can independently be 0 or 1 and when an independent q is 1, the associated L can be a linker group; a can be an integer from 0 to 11; s can be an integer from 2 to 8; m can be an integer from 1 to 10,000; n can be an integer from 0 to 10,000; o can be an integer from 0 to 10,000; and p can be an integer from 0 to 10,000.

More specific, but still general formulas for polymers are given below in Formulae 13a, 13b, 13c and 13d.

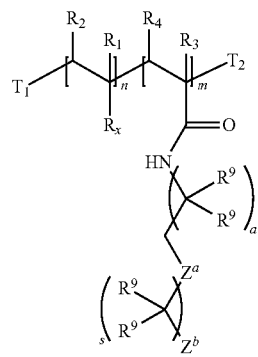
(Formula 13a)

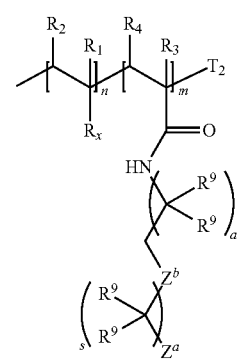
(Formula 13b)

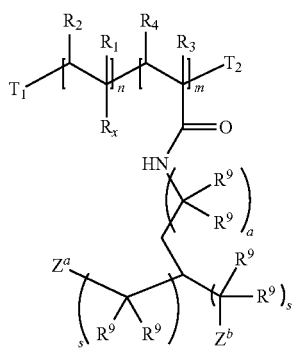
(Formula 13c)

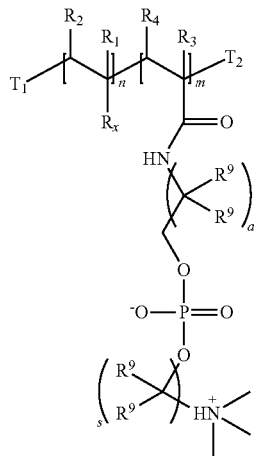
(Formula 13d)

In the formulae 13a, 13b, 13c and 13d below, $T^1$, $T^2$, $R^1$, $R^2$, $R^3$, $R^4$, $R^9$, $R^X$, $Z^a$, $Z^b$, a, m, n and s are all as defined above. As such, for example, in formulae 13a, 13b, 13c and 13d, $T^1$ and $T^2$ can independently be any group; $R^X$ comprises at least one reactive group or non-reactive, non-zwitterionic group; $R^1$ and $R^3$ are independently hydrogen, substituted or unsubstituted alkyl, or halogen; $R^2$ and $R^4$ are independently hydrogen, substituted or unsubstituted alkyl, substituted or unsubstituted alkoxy, or halogen; $R^9$ can independently be selected from —H or $C_1$-$C_4$ alkyl chain optionally substituted with a heteroatom (e.g., $CH_2OH$); m can be an integer from 1 to 10,000; n can be an integer from 0 to 10,000; a can be an integer from 0 to 11; s can be an integer from 2 to 8; one and only one of $Z^a$ and $Z^b$ have the formula 12b

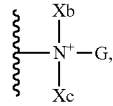
(Formula 12b)

where $X^b$ and $X^c$ are independently selected from H, $CH_3$, or a $C_1$-$C_6$ alkyl chain optionally substituted with a heteroatom (e.g., $CH_2OH$); and G is a bond or a terminal group; and the other of $Z^a$ and $Z^b$ comprise a sulfonate group, a carboxylate group, a phosphate group, a phosphinate group, —OP(OH)$_2$O, or a sulfate group In some embodiments, polymers can be homopolymers that include only residues from zwitterionic monomers. An example of such homopolymers are seen in Formula 14 below.

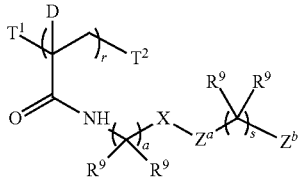
(Formula 14)

where $T^1$, $T^2$, X, $Z^a$, $Z^b$, a and s are as defined above; r is an integer from 2 to 10,000, 1 to 1,000, 1 to 100, 1 to 50, 1 to 24, 1 to 20, 10 to 40 or even 10 to 20; and D is hydrogen, methyl or alkyl. As such, for example, in formula 14, $T^1$ and $T^2$ can independently be any group; D is H or alkyl (e.g., methyl); X can be $CH_2$ or $(CH_2CH_2O)_vCH_2CH_2$, where v can be an integer from 1 to 10, 1 to 6, 1 to 4, or even 1 or 2; $R^9$ can independently be selected from —H or $C_1$-$C_4$ alkyl chain optionally substituted with a heteroatom (e.g., $CH_2OH$); r can be an integer from 2 to 10,000; a can be an integer from 0 to 11; s can be an integer from 2 to 8; one and only one of $Z^a$ and $Z^b$ have the formula 12b

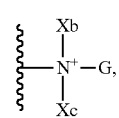

(Formula 12b)

$X^b$ and $X^c$ are independently selected from H, $CH_3$, or a $C_1$-$C_6$ alkyl chain optionally substituted with a heteroatom (e.g., $CH_2OH$); and G is a bond or a terminal group; and the other of $Z^a$ and $Z^b$ comprise a sulfonate group, a carboxylate group, a phosphate group, a phosphinate group, —OP(OH)$_2$O, or a sulfate group.

Formula 14a shows a more specific example of a homopolymer

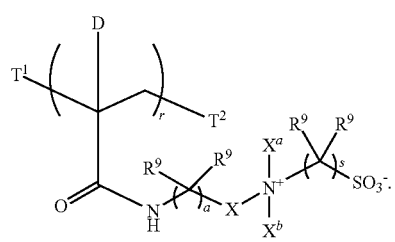

(Formula 14a)

In formula 14a, $T^1$, $T^2$, $R^9$, X, D, a, s, and r are as defined above, and all a and s are independently defined. As such, for example in formula 14a, $T^1$ and $T^2$ can independently be any group; X can be $CH_2$ or $(CH_2CH_2O)_vCH_2CH_2$, where v can be an integer from 1 to 10, 1 to 6, 1 to 4, or even 1 or 2; $R^9$ can independently be selected from —H or $C_1$-$C_4$ alkyl chain optionally substituted with a heteroatom (e.g., $CH_2OH$); $X^b$ and $X^c$ are independently selected from H, $CH_3$, or a $C_1$-$C_6$ alkyl chain optionally substituted with a heteroatom (e.g., $CH_2OH$); and G is a bond or a terminal group; r can be an integer from 2 to 10,000; each a can independently be an integer from 0 to 11; and each s can independently be can integer from 2 to 8

Formula 14b and 14c show general, but more specific formulae than formula 14a.

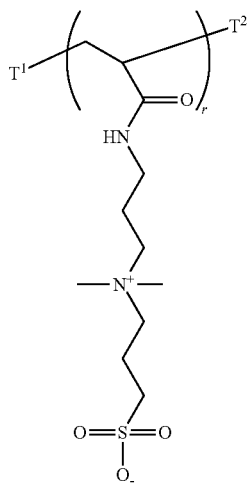

(Formula 14b)

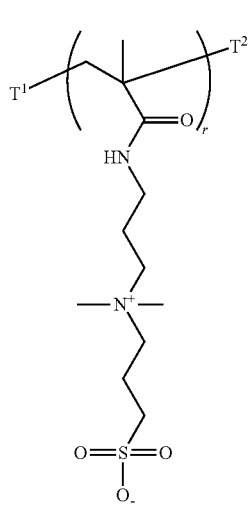

(Formula 14c)

In formulae 14b and 14c, $T^1$, $T^2$, and r are as defined above. As such, for example, in formula 14b and 14c $T^1$ and $T^2$ can independently be any group; and r can be an integer from 2 to 10,000.

Formulae 14d to 14i below show specific illustrative examples of disclosed homopolymers. In formulae 14d to 14i r is as defined above, and for example can be an integer from 2 to 10,000.

47
(Formula 14d)
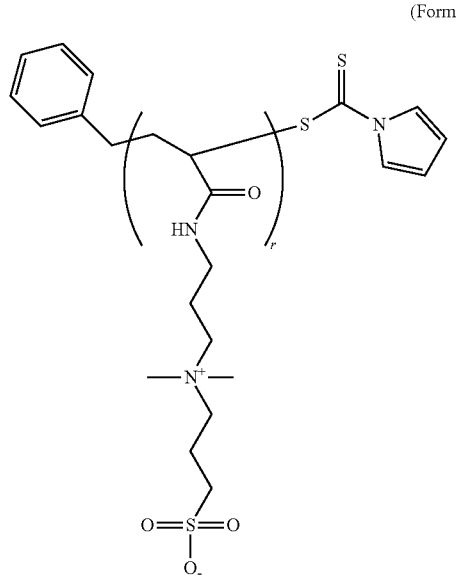
(Formula 14e)
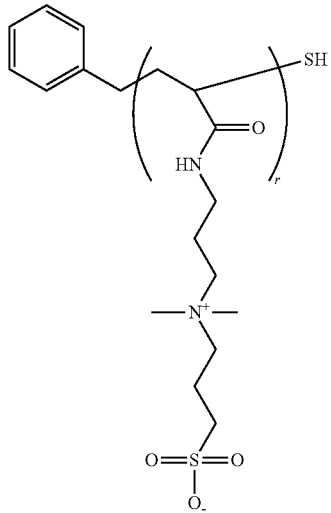
(Formula 14f)
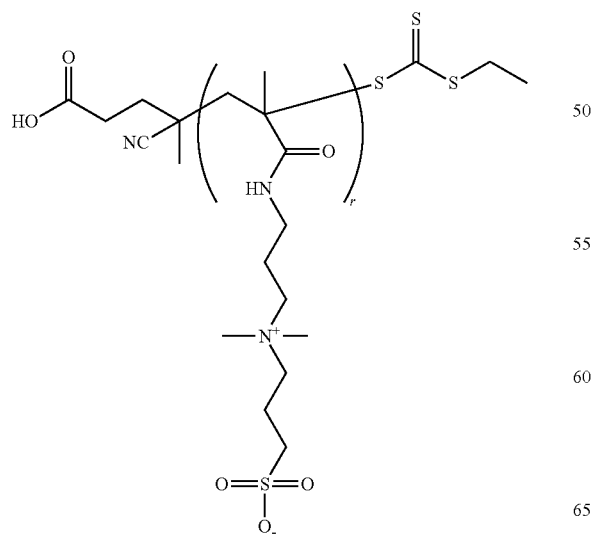
48
-continued
(Formula 14g)
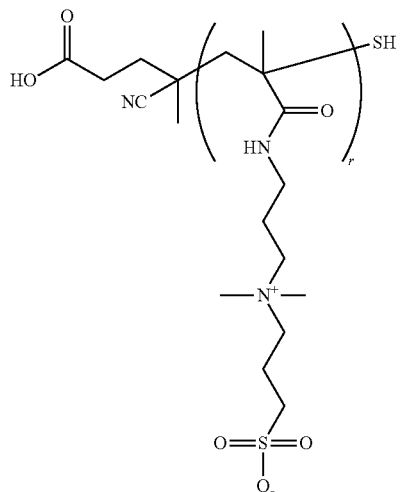
(Formula 14h)
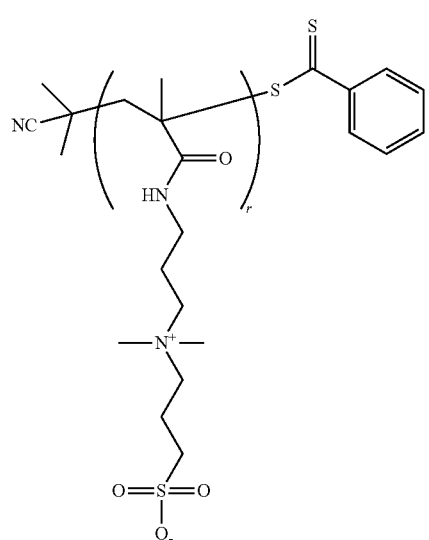
(Formula 14i)
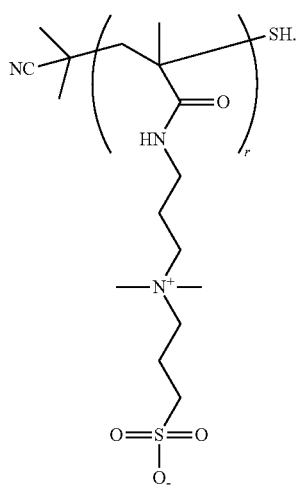

An illustrative scheme to form the homopolymers of formulae 14h and 14i using RAFT polymerization as seen in Scheme 2 below.

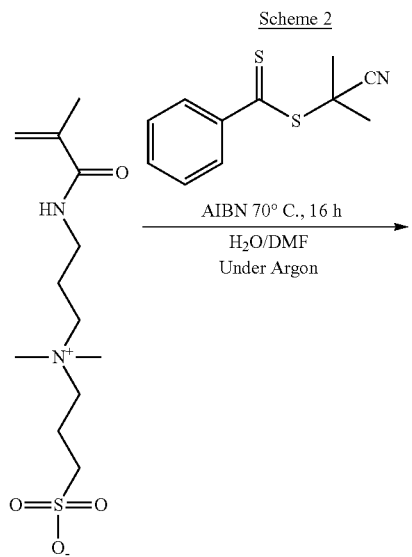

Scheme 2

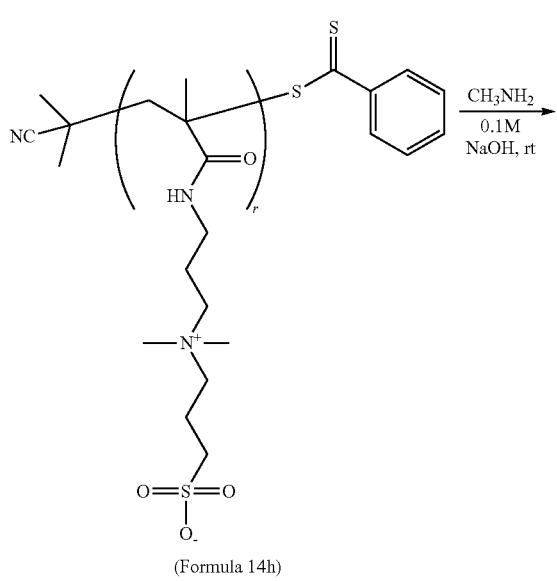

(Formula 14h)

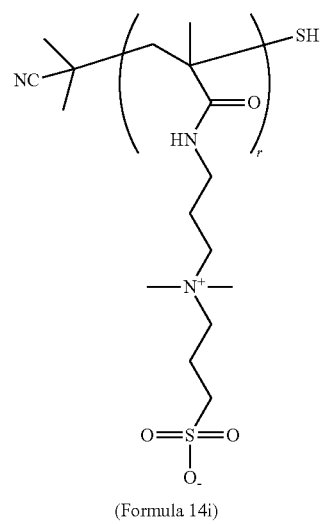

(Formula 14i)

In Scheme 2, a zwitterionic monomer (sulfobetaine methacrylamide, SBMAam) is polymerized with a RAFT agent, 2-cyanoprop-2-yl-dithiobenzoate (commercially available from Millipore-Sigma). Although Scheme 2 indicates the presence of AIBN as the initiator and dimethylformamide (DMF)/H$_2$O as the solvent, one of skill in the art would understand that numerous other initiators, solvents or solvent systems, or both could also be utilized. The resultant polymer (formula 14h) is terminated with a nitrile group that is left over from the RAFT agent. The nitrile group would then be available to undergo various further reactions and may be useful for attachment of the polymer to functional groups on a surface of a material, for example. Further, or alternatively, the dithiobenzoate, left over from the RAFT agent, may be cleaved to reveal a terminal reactive SH group as well to form the homopolymer of formula 14i.

The homopolymers of formulae 14d to 14g could be prepared using similar schemes via the use of different RAFT agents. Furthermore, it will be known by one of skill in the art that the homopolymer of formula 14e can be formed by deprotecting the homopolymer of formula 14d; and the homopolymer of formula 14g could be formed by deprotecting the homopolymer of formula 14f.

Reactive groups can also be incorporated into disclosed polymers by including them in non-zwitterionic monomers and forming a copolymer via polymerization with disclosed zwitterionic monomers. Reactive groups incorporated from non-zwitterionic polymers can be the same type or a different type or types of reactive groups than are incorporated from RAFT agents or other free radical polymerization. Reactive groups can also be incorporated into disclosed polymers by including them in zwitterionic monomers. Reactive groups incorporated into the polymer via monomers (as opposed to RAFT agents) are referred to as pendant reactive groups because they are located off the backbone of the polymer, in contrast to terminal reactive groups incorporated via the RAFT agent, which are located on the terminal ends of the polymer. In some embodiments, pendant reactive groups that include an amide group can optionally include an alkyl substituent at the carbon directly adjacent the NH group (the α carbon) of the amide.

In some embodiments, polymers of formula 15, which is a copolymer, can be formed.

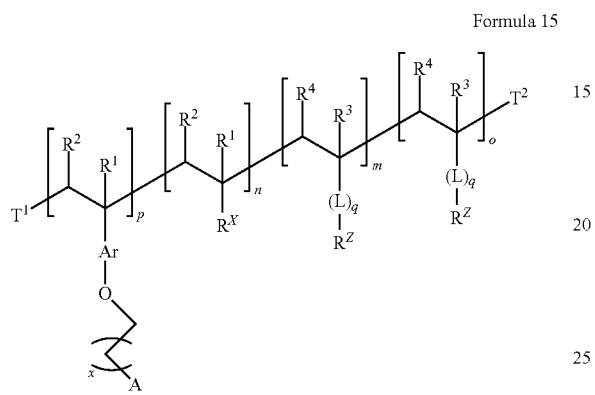

Formula 15

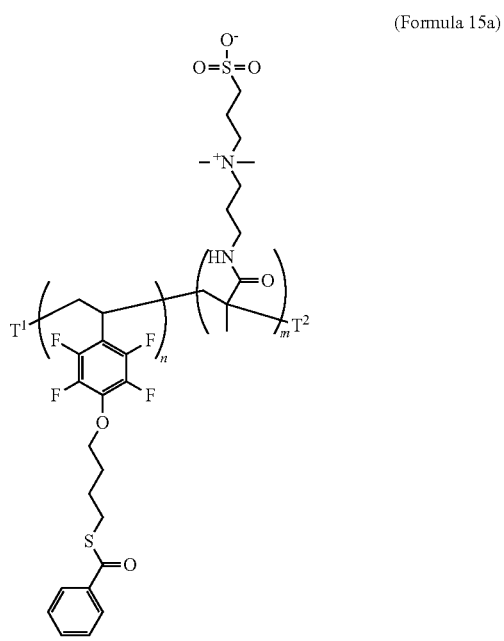

(Formula 15a)

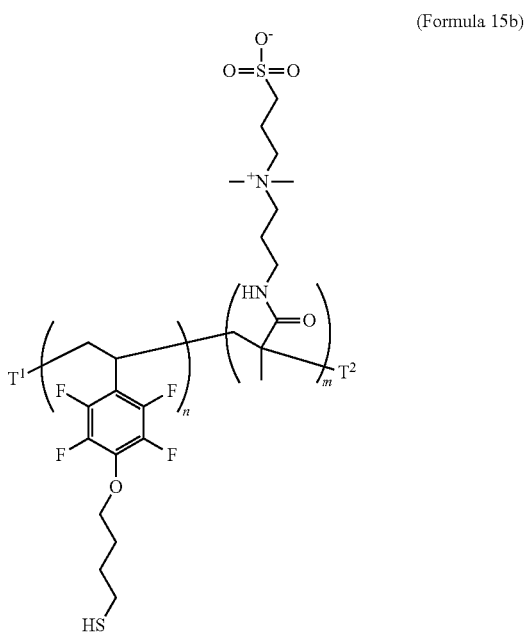

(Formula 15b)

In formula 15, $T^1$, $T^2$, $R^1$, $R^2$, $R^3$, $R^4$, $R^X$, $R^Z$, L, m, n, o, p, q and x are as defined above; Ar includes any aromatic group including substituted or unsubstituted heteroaromatic groups and substituted or unsubstituted aryl groups; and A is a thiol group, a thiobenzoate group, a dithiobenzoate group, a thioacyl group, a dithioacyl group, an alkene group, a carbodithioate group, a 2-(cyanoethyl)thio group, or an alkyne group. As such, for example, in formula 15, $T^1$ and $T^2$ can independently be any group; $R^X$ comprises at least one reactive group or non-reactive, non-zwitterionic group; $R^Z$ comprises at least a zwitterionic portion; $R^1$ and $R^3$ are independently hydrogen, substituted or unsubstituted alkyl, or halogen; $R^2$ and $R^4$ are independently hydrogen, substituted or unsubstituted alkyl, substituted or unsubstituted alkoxy, or halogen; Ar comprises substituted or unsubstituted heteroaromatic groups, substituted or unsubstituted aryl groups, or combinations thereof; A comprises a thiol group, a thiobenzoate group, a dithiobenzoate group, a thioacyl group, a dithioacyl group, an alkene group, a carbodithioate group, a 2-(cyanoethyl)thio group, or an alkyne group; the q can independently be 0 or 1 and when an independent q is 1, the associated L can be a linker group; m can be an integer from 1 to 10,000; n can be an integer from 0 to 10,000; o can be an integer from 0 to 10,000; p can be an integer from 0 to 10,000; and x can be an integer from 0 to 11, 0 to 8, 0 to 4, 0 to 3, 0 to 2 or even 0 or 1.

Formula 15a and 15b show general, but more specific formulae than formula 15.

In formulae 15a and 15b, $T^1$, $T^2$, m and n are as defined above. As such, for example, $T^1$ and $T^2$ can independently be any group; m can be an integer from 1 to 10,000; and n can be an integer from 0 to 10,000.

Illustrative specific examples of compounds encompassed by the general formula 15 include, for example compounds 15d and 15e, as seen below.

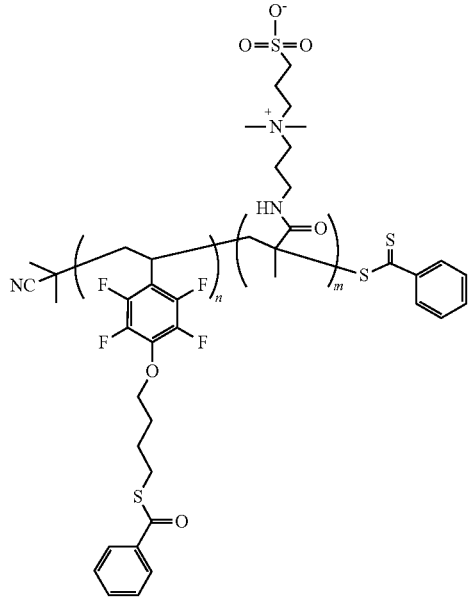

(Formula 15d)

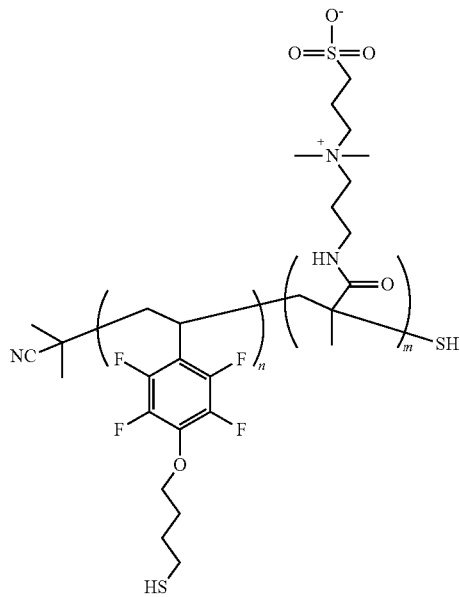

(Formula 15e)

In formulae 15d and 15e, m and n are as defined above. As such, for example, m can be an integer from 1 to 10,000; and n can be an integer from 0 to 10,000.

An illustrative synthetic scheme for polymers of formula 15 is depicted in Scheme 3a below. Such copolymers may be formed via RAFT polymerization by polymerizing a zwitterionic monomer and a non-zwitterionic monomer with a RAFT agent. Although Scheme 3a (as well as Schemes 3b, 3c and 3d) indicates the presence of AIBN as the initiator and dimethylformamide (DMF)/$H_2O$ as the solvent, one of skill in the art would understand that numerous other initiators, solvents or solvent systems, or both could also be utilized in any such polymerizations.

Scheme 3a

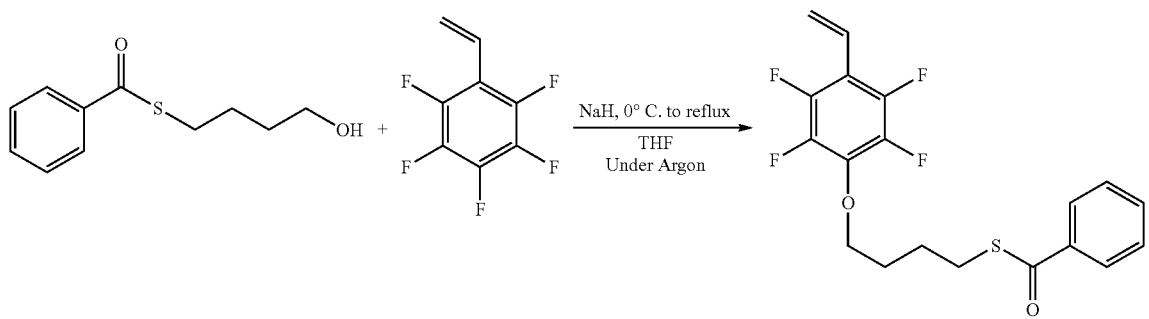

-continued

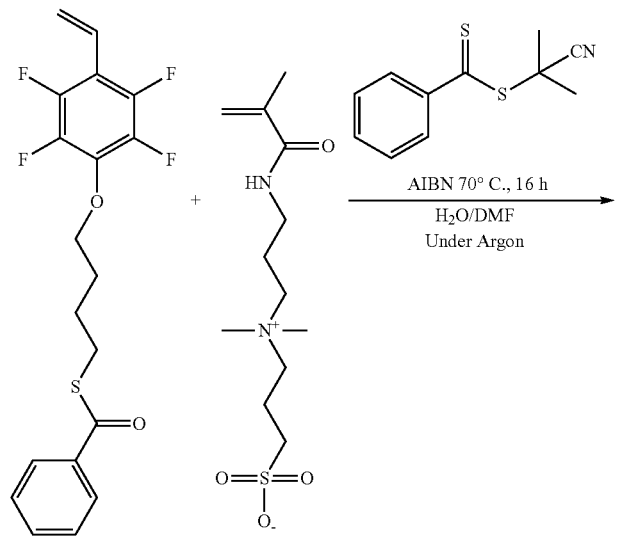

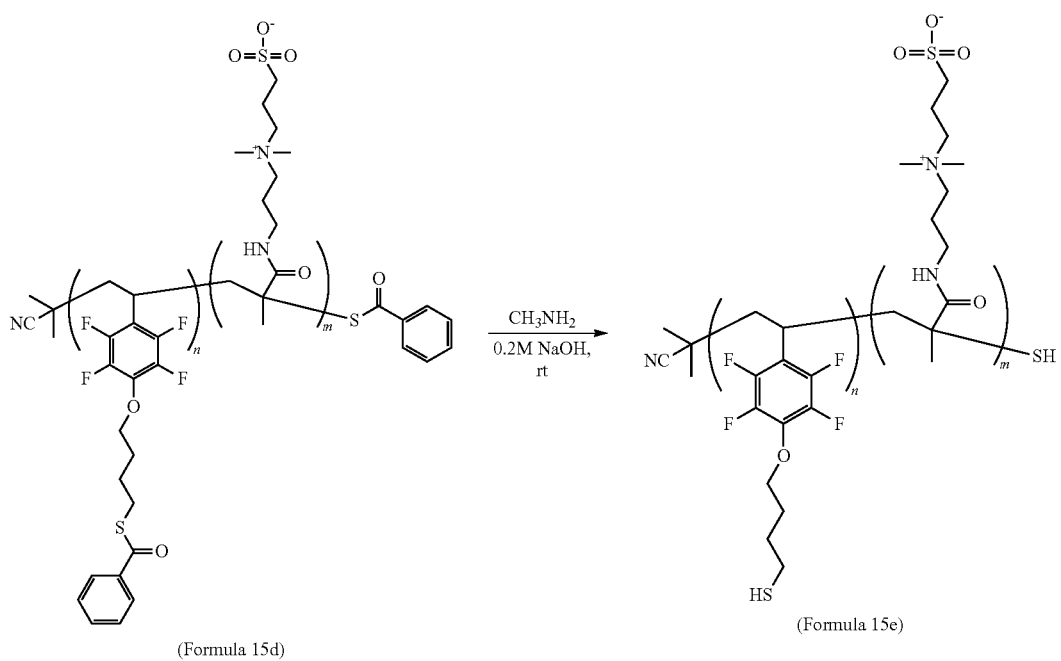

(Formula 15d)

(Formula 15e)

Scheme 3a begins by depicting the synthesis of the non-zwitterionic monomer, 4-(4'-benzoylmercaptobutane-1'-oxy)-2,3,5,6-tetrafluorostyrene. The second reaction in Scheme 3a shows the RAFT copolymerization of the 4-(4'-benzoylmercaptobutane-1'-oxy)-2,3,5,6-tetrafluorostyrene monomer and the SBMAam monomer with the RAFT agent, 2-cyanoprop-2-yl-dithiobenzoate. The resultant polymer (Formula 15d) is terminated with a cyanoalkyl group and a dithiobenzoate group that are left over from the RAFT agent. In contrast to the polymer of Scheme 2, the polymer of Scheme 3a also includes pendant thiobenzoate groups due to the presence of the thiobenzoate in the non-zwitterionic monomer. The terminal dithiobenzoate group and the pendant thiobenzoate groups can then be cleaved, deprotecting the SH groups as shown above in Formula 15e.

Formula 15c shows a general, but more specific formula than formula 15.

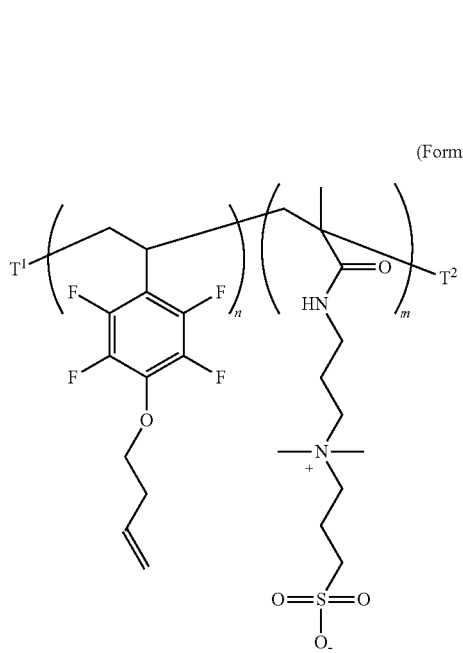

(Formula 15c)

In formula 15c $T^1$, $T^2$, m and n are as defined above. As such, $T^1$ and $T^2$ can independently be any group; m can be an integer from 1 to 10,000; and n can be an integer from 0 to 10,000.

A similar polymer includes that depicted in Formula 15f below, where m and n are as defined above:

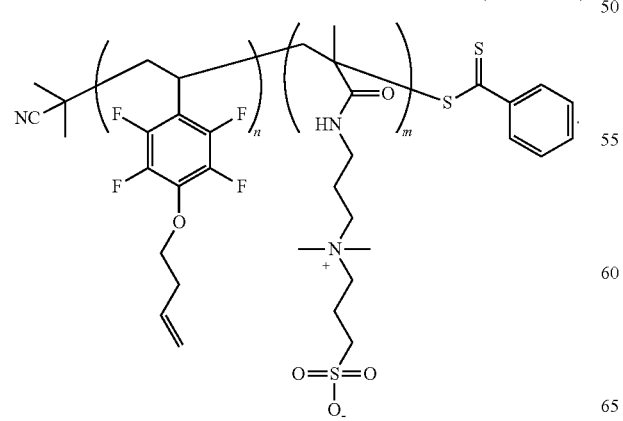

(Formula 15f)

Scheme 3b below shows an illustrative synthetic scheme for synthesizing the polymer of formula 15f.

Scheme 3b

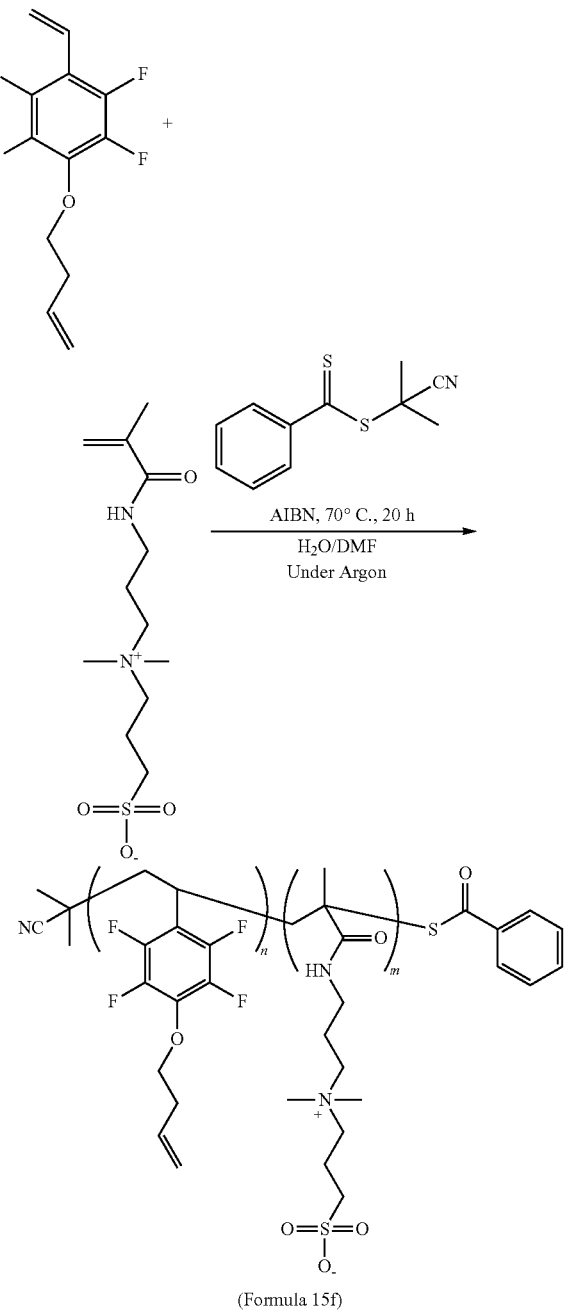

(Formula 15f)

Scheme 3b is similar to that of Scheme 3a in that it shows formation of a copolymer via RAFT copolymerization of a non-zwitterionic 4-(3'-buten-1'-oxy)-2,3,5,6,-tetrafluorostyrene monomer and a zwitterionic SBMAam monomer with the RAFT agent, 2-cyanoprop-2-yl-dithiobenzoate. The resultant polymer (formula 15f) is terminated with a cyanoalkyl group and a dithiobenzoate group that are left over from the RAFT agent. The polymer of Scheme 3b also includes pendant unsaturated groups due to their presence in the non-zwitterionic monomer. The dithiobenzoate group could also be deprotected to form a reactive SH group.

In some embodiments, polymers of formula 16 can be formed.

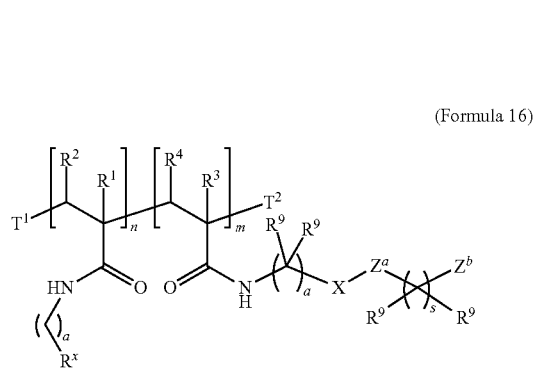

(Formula 16)

In formula 16, $T^1$, $T^2$, $R^1$, $R^2$, $R^3$, $R^4$, $R^9$, $R^X$, $Z^a$, $Z^b$, a, c s, m, and n are as defined above. As such, for example in formula 16, $T^1$ and $T^2$ can independently be any group; $R^X$ comprises at least one reactive group or non-reactive, non-zwitterionic group; $R^1$ and $R^3$ are independently hydrogen, substituted or unsubstituted alkyl, or halogen; $R^2$ and $R^4$ are independently hydrogen, substituted or unsubstituted alkyl, substituted or unsubstituted alkoxy, or halogen; $R^9$ can independently be selected from —H or $C_1$-$C_4$ alkyl chain optionally substituted with a heteroatom (e.g., $CH_2OH$); X can be $CH_2$ or $(CH_2CH_2O)_vCH_2CH_2$, where v can be an integer from 1 to 10, 1 to 6, 1 to 4 or even 1 or 2; m can be an integer from 1 to 10,000; n can be an integer from 0 to 10,000; a can be an integer from 0 to 11; s can be an integer from 2 to 8; c can be an integer from 1 to 12; and one and only one of $Z^a$ and $Z^b$ have the formula 12b

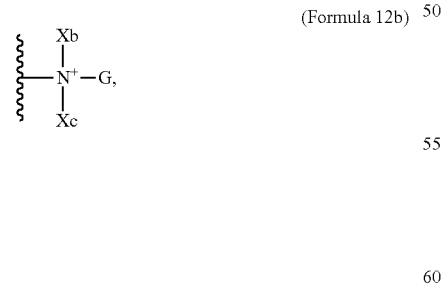

(Formula 12b)

$X^b$ and $X^c$ are independently selected from H, $CH_3$, or a $C_1$-$C_6$ alkyl chain optionally substituted with a heteroatom (e.g., $CH_2OH$); and G is a bond or a terminal group; and the other of $Z^a$ and $Z^b$ comprise a sulfonate group, a carboxylate group, a phosphate group, a phosphinate group, —$OP(OH)_2O$, or a sulfate group.

Formulae 16a to 16d show general, but more specific formulae than formula 16.

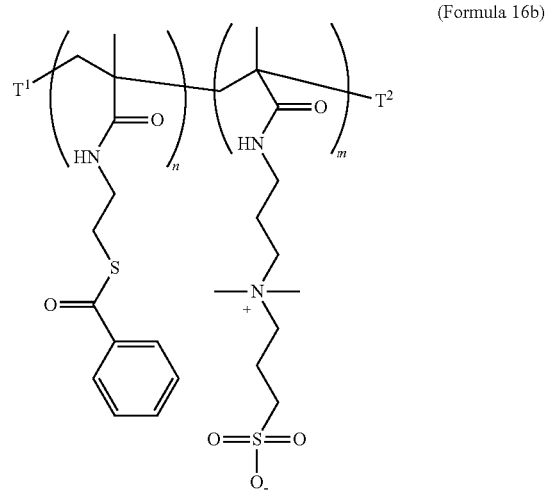

(Formula 16b)

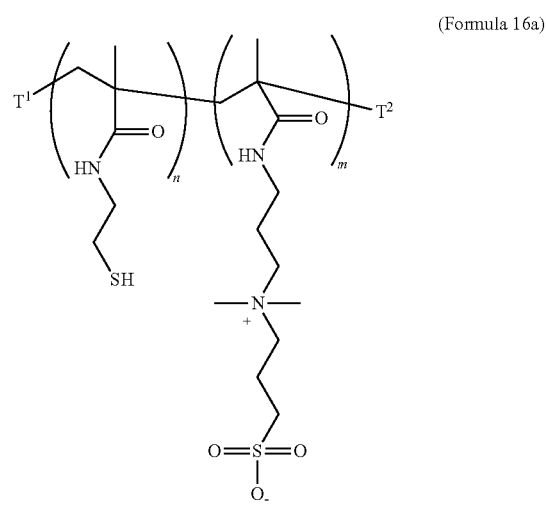

(Formula 16a)

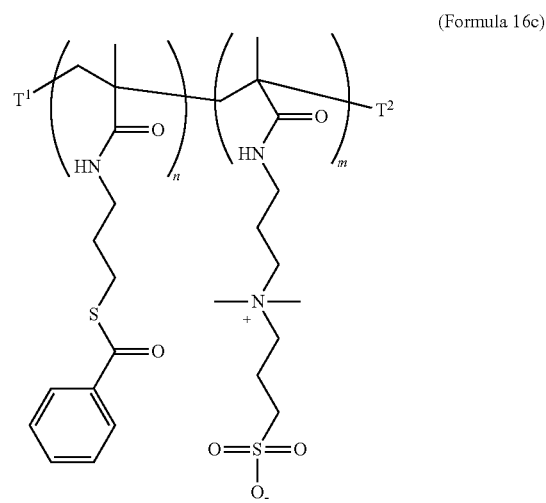

(Formula 16c)

(Formula 16d)

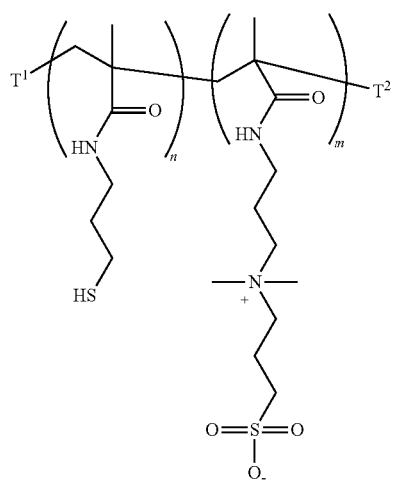

(Formula 16f)

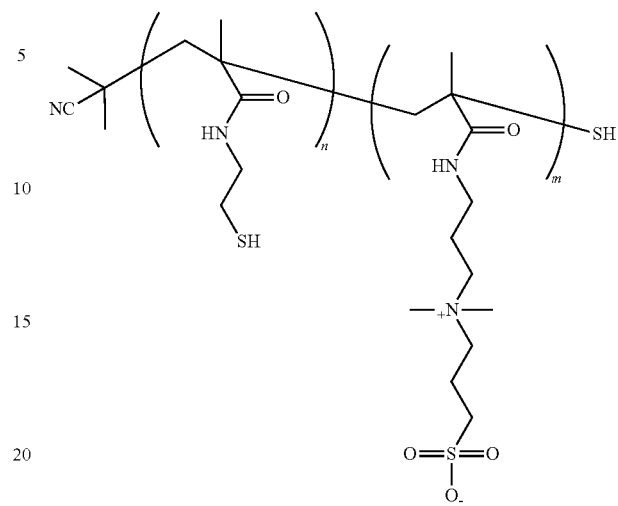

In formulae 16a to 16d, $T^1$, $T^2$, m and n are as defined above. As such, $T^1$ and $T^2$ can independently be any group; m can be an integer from 1 to 10,000; and n can be an integer from 0 to 10,000.

Formulae 16e to 16i show specific examples of such polymers. In some embodiments, $T^1$, $T^2$ and $R^X$ in Formula 16 can independently include vinyl containing groups, thiobenzoate, dithiobenzoate, or nitrile for example. In some embodiments, $T^1$, $T^2$ and $R^X$ in Formula 16 can independently include vinyl containing groups, thiobenzoate or dithiobenzoate for example.

(Formula 16g)

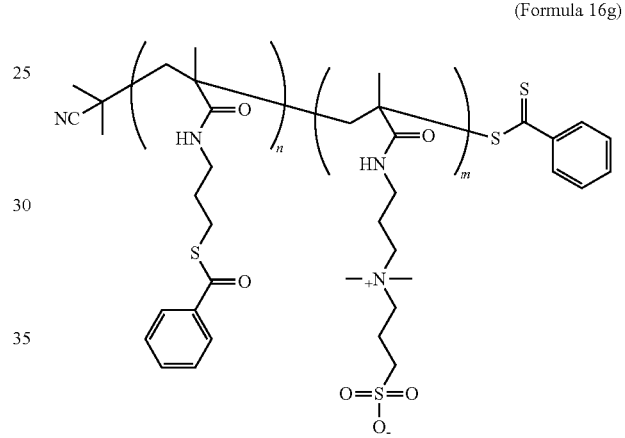

(Formula 16h)

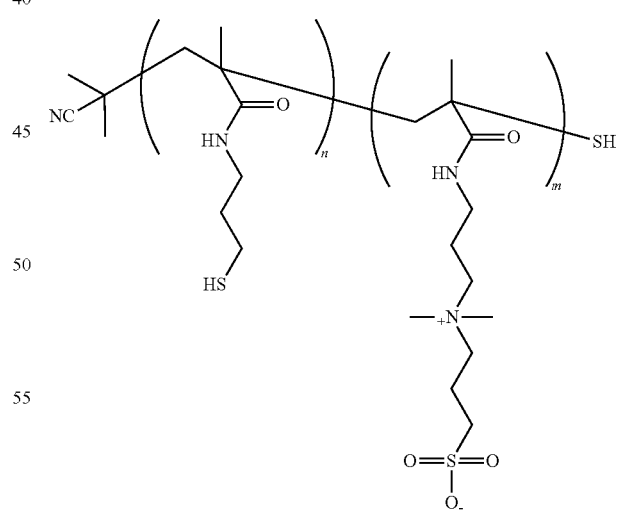

(Formula 16e)

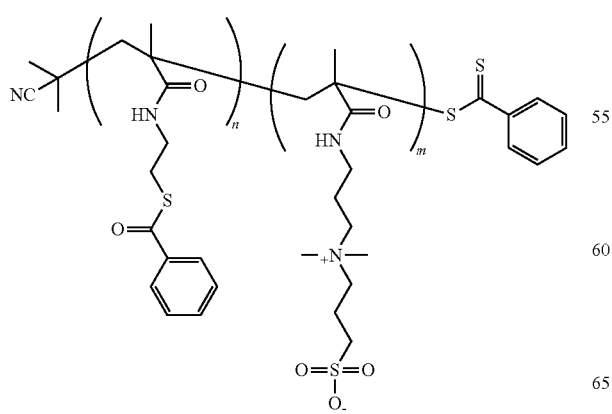

It is noted that Formula 16f is the deprotected version of formula 16e, which could also interchangeably replace dithiobenzoate with thiobenzoate and vice versa; formula 16h is the deprotected version of formula 16g, which could also interchangeably replace dithiobenzoate with thiobenzoate and vice versa.

Scheme 3c below shows an illustrative synthetic route to form polymers of formulae 16e and 16f.

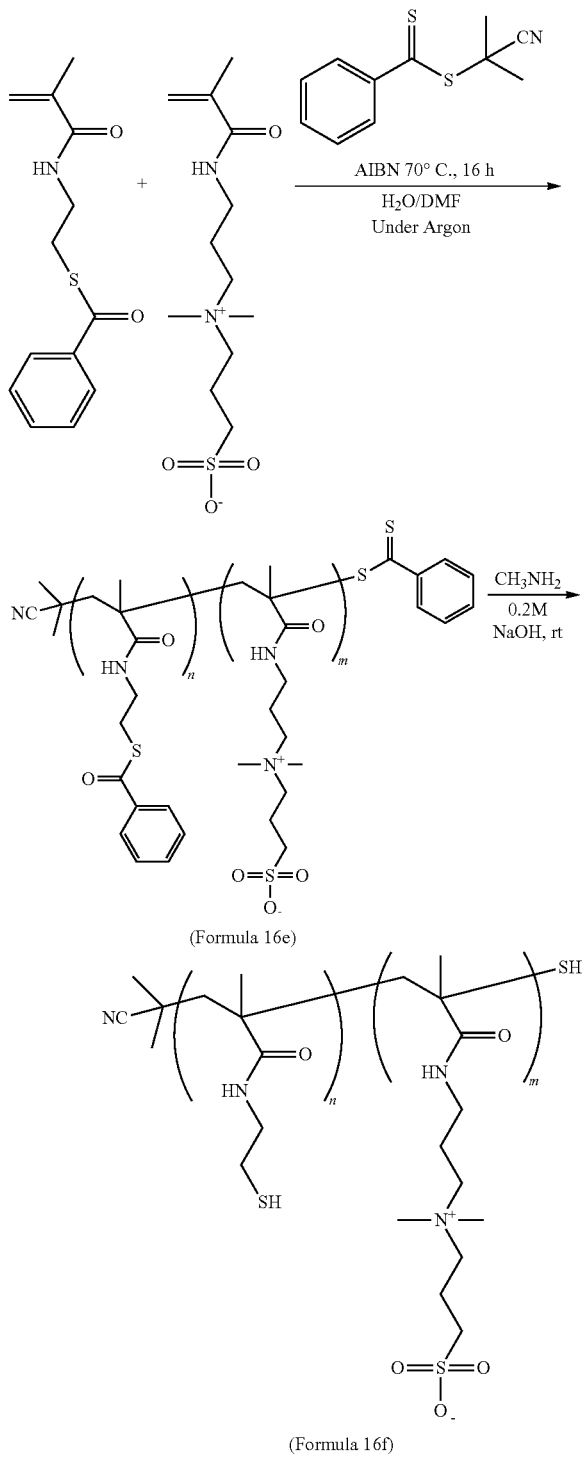

(Formula 16e)

(Formula 16f)

Scheme 3c is similar to that of Schemes 3a and 3b in that it shows formation of a copolymer via RAFT polymerization of a non-zwitterionic S-Benzoyl-N-Methacryloyl cysteamine monomer and a zwitterionic SBMAam monomer with the RAFT agent, 2-cyanoprop-2-yl-dithiobenzoate. The resultant polymer (formula 16e) is terminated with a cyanoalkyl group and a dithiobenzoate group that are left over from the RAFT agent. The polymer of Scheme 3c also includes pendant groups that include the thiobenzoate group due to its presence in the non-zwitterionic monomer. The thiobenzoate groups could also be deprotected to form reactive SH groups (formula 16f).

Formula 16i below shows a general but more specific formula of formula 16.

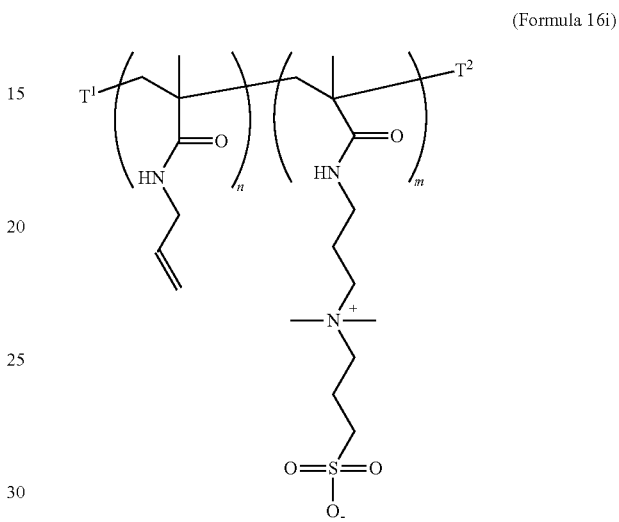

(Formula 16i)

In formula 16i, $T^1$, $T^2$, m and n are as defined above. As such, for example, in formula 16i, As such, $T^1$ and $T^2$ can independently be any group; m can be an integer from 1 to 10,000; and n can be an integer from 0 to 10,000.

The compound shown in formula 16j shows a polymer of formula 16, where both $T^1$ and $T^2$ are RAFT agent moieties with $T^1$ being a nitrile group and $T^2$ being a dithiobenzoate group; and $R^x$ containing a vinyl group.

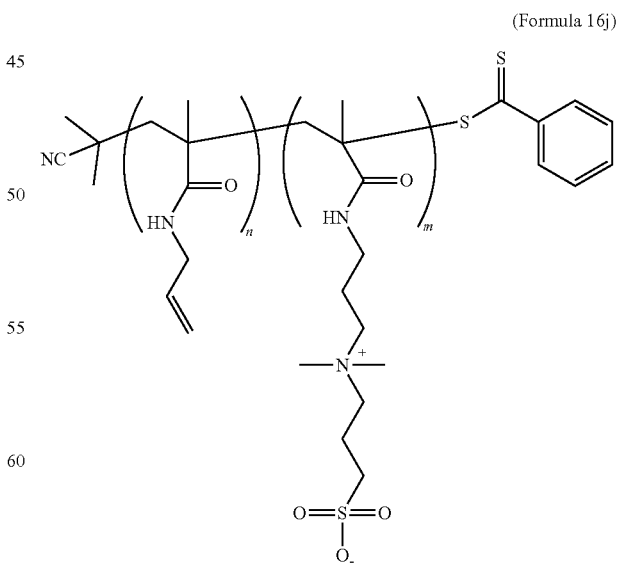

(Formula 16j)

Disclosed polymers also include polymers similar to any of the specific polymers or general polymer formulas depicted herein but with alternative RAFT agents replacing those depicted at $T^1$, $T^2$, or both; or may even be free of RAFT agents and instead may have other groups (e.g., alkyl groups such as methyl groups, aryl groups such as phenyl, or hydrogen at $T^1$, $T^2$, or both)) as they would be if they were prepared using other types of free radical polymerization. Furthermore, disclosed polymers also include polymers similar to any of the specific polymers or general polymer formulas depicted herein but the residual RAFT moieties of $T^1$, $T^2$ or both may be eliminated or converted into other groups, for example thiol groups or alkene groups.

Scheme 3d below shows an illustrative synthetic scheme for synthesizing the polymer of formula 16j.

Scheme 3d

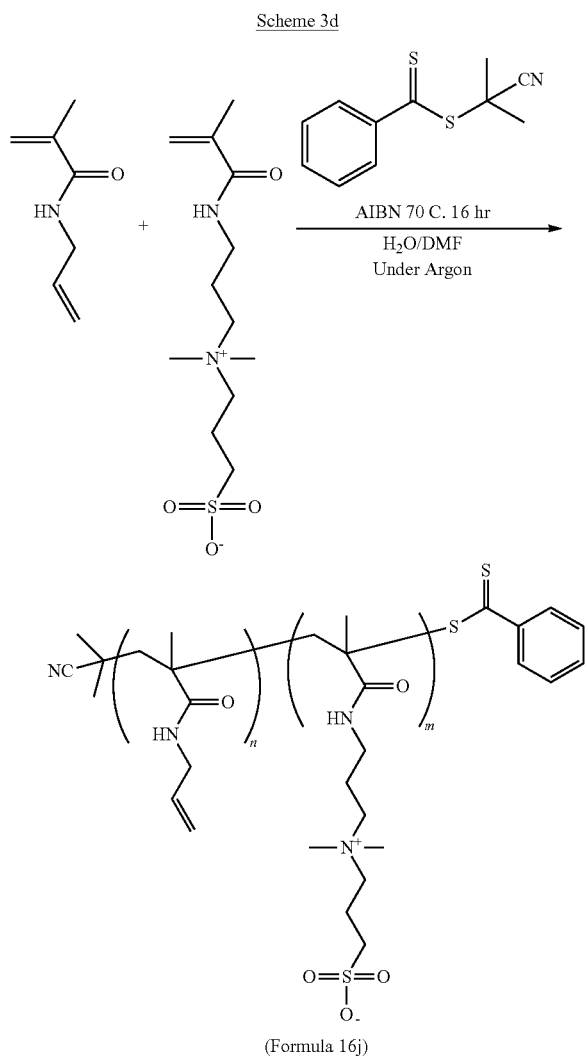

(Formula 16j)

Scheme 3d is similar to that of Schemes 3a, 3b and 3c in that it shows formation of a copolymer via RAFT copolymerization of a non-zwitterionic N-allylmethacrylamide monomer and a zwitterionic SBMAam monomer with the RAFT agent, 2-cyanoprop-2-yl-dithiobenzoate. The resultant polymer (Formula 16j) is terminated with a nitrile group and a dithiobenzoate group that are left over from the RAFT agent. The polymer of Scheme 3d also includes pendant groups that include the reactive allylmethacrylamide group due to its presence in the non-zwitterionic monomer. The dithiobenzoate group could also be deprotected to form a reactive SH group. The presence of the N-allylmethacrylamide in the copolymer provides a pendant tether or cross-linking site that can be used to relatively easily attach the zwitterionic polymer to a wide variety of surfaces. The methyl groups on the polymer backbone and the use of amides over esters provides increased resistance to hydrolysis, which may be advantageous in some applications of the polymers.

Disclosed polymers may have many novel and/or advantageous properties that can be harnessed for new products and applications yet to be determined. Applications in which the polyzwitterions are attached to a surface or used on their own (unattached) can be envisioned.

Biological applications are one possible use of polyzwitterions. An important requirement of materials in bio-applications is their resistance to non-specific protein adsorption and cell adhesion. Properties of polyzwitterions have been investigated and they have arisen as likely meeting this requirement. Bio-applications can include, for example, protein and nucleic acid separation, immunoassays and diagnosis, immobilization of polysaccharides and enzymes, cell labeling and embolization. Polyzwitterions have been used for both material and biological applications that utilize surface-coated semiconductor and metallic structures (e.g. gold nanoparticle) and were shown to stabilize the surfaces and provide protection from fouling, degradation, and protein absorption. Polyzwitterions are both hemocompatible and biocompatible and can therefore be incorporated into pharmaceutical and medical device products. Water molecules bind tightly to polyzwitterions resulting in the ability to greatly reduce friction coefficients even under pressures up to hundreds of atmospheres. This property would have applications in many areas including orthopedic implants for wear resistance. Due to one of the unique functionalities of polyzwitterions, their ability to undergo different types of self-association from intramonomer to intrachain and interchain aggregation, they show electro-responsive, salt-responsive and thermo-responsive behaviors. Thermo-responsive behavior may be useful in applications such as drug delivery, a specific example of which could include encapsulating a drug at low temperatures and releasing the drug at higher temperatures. Electro-responsive behavior may be useful in applications such as gel actuators, membranes with controlled permeability, and gel electrolyte in solid-state supercapacitors, for example. Polyzwitterions could also be useful in natural and waste water treatment systems to remove metal ions by chelating them.

Surface Functionalization and Modification

Also disclosed herein are methods of functionalizing surfaces or making them reactive surfaces and methods of modifying surfaces, both previously functionalized surfaces and unaltered surfaces. A surface can be functionalized or made into a reactive surface by the addition of surface reagents that contain reactive functional groups, modified by the addition of other agents, or both.

In some disclosed methods a surface can be functionalized by the addition of surface reagents. In some embodiments, not all surface types can be made reactive through the use of surface reagents. Once a surface has been functionalized through use of a surface reagent, the surface can be utilized as is, or it can be then modified by attaching a modifier which can be a non-polymeric modifier or a polymeric modifier.

Illustrative non-polymeric modifiers can include, for example biomolecules, bioactive molecules, pharmacophores, nucleic acids, proteins, peptides, amino acids, organic or inorganic small molecules, perfluorinated molecules, thiol substituted molecules, silanes, functionalized silanes, 3-mercaptopropyltriethoxysilane, succinimides, cyclodextrins, fullverenes, adamantanes, dyes, chromophores, fluorophores, saccharides, lipids, organic semiconductors, and biotin. In some embodiments, non-polymeric modifiers can also be referred to as non-polymeric small molecule modifiers.

Illustrative polymeric modifiers can include, but are not limited to homo and copolymers of polymethacrylates, polyacrylates, polyacrylamides, polymethacrylamides, polycarbonates, polyolefins, polyurethanes, polyacrylonitriles, polyvinyl chlorides, polyamides, polysulphones, polystyrenes, polyvinyl fluorides, polyvinyl alcohols, polyvinyl esters, polyvinyl butyral, polyvinyl ethers, polyvinylidene chlorides, polyvinylidene fluorides, polyimides, polyesters, polyetherketones, polyethers, polytetrafluoroethylene, polychloroethers, polydimethylsiloxanes, polyvinylpyrrolidone, polyvinylalcohols, cellulose, polyanhydrides, polyorthoesters, hyaluronic acid, starch, dextran, heparin, chondroitin sulfate, dermatan sulfate, heparan sulfate, keratan sulfate, dextran sulfate, pentosan polysulfate, and chitosan; and protein (and other polyamino acids), examples of which include but are not limited to gelatin, collagen, fibronectin, laminin, albumin, elastin, and active peptide domains thereof and the like. Specific polymeric modifiers can include polymers disclosed herein.

Functionalization

In some illustrative embodiments, surface reagents may attach to a surface through many different mechanisms or via a combination of mechanisms. Possible mechanisms can include, for example, mechanical, chemical (e.g., covalent bonds), dispersive, electrostatic, diffusive and physical. As used herein, a physical mechanism describes materials that attached by being held in place through crosslinks (a chemical bond between different chains of atoms in a polymer or other molecule) within the material itself. The word "attach" or "attached" as used throughout this document can refer to any of the above types of mechanisms or combination of mechanisms.

In some embodiments surfaces can be transformed with a surface reagent including at least one unsaturated bond. As used herein, "unsaturated bond" includes double bonds and triple bonds. In some embodiments a surface can be transformed with a surface reagent including at least three unsaturated bonds. In some embodiments, surfaces can be transformed with a surface reagent including at least two unsaturated bonds, one of which attaches the surface reagent to the surface and one of which is available to be reacted with something other than the surface (something to modify the reagent or something to attach to the reagent). In some embodiments, surfaces can be transformed with a surface reagent including at least two unsaturated bonds, one of which attaches the surface reagent to the surface and one of which is modified by a secondary reagent. In some embodiments, surfaces can be functionalized with a surface reagent including at least two unsaturated bonds, one of which attaches the reagent to the surface and one of which can be used to attach a modifier (non-polymeric or polymer).

Illustrative functional groups that can be or can form a surface reagent can include, for instance groups that can participate in substitution reactions, elimination reactions, addition reactions, radical reactions, rearrangement reactions and organic redox reactions, Michael reactions; maleimide-thiol reactions; amine-succinimide reactions; ring opening reactions; and click chemistry reactions.

In some embodiments, the surface reagent can include a moiety that can participate in a click reaction that can optionally conjugate a compound(s), e.g., a modifier, to the surface. Click reactions can generally be described as reactions that are modular and wide in scope; have high efficiency and high yield; create little to no offensive by-products; have readily available starting materials and reagents; utilize no solvent or a benign solvent; and offer relatively simple purification techniques. Illustrative examples of a click reactions include thiol-ene or thiol-yne click chemistries, which generally include a reaction between an alkene or alkyne and a thiol. Schemes 4a and 4b below show specific examples including terminal alkenes (Scheme 4a) and terminal alkynes (Scheme 4b) and a thiol, as seen in Scheme 4a and 4b below (where $R^a$ and $R^b$ generally represent alkyls). It should be noted that non-terminal alkenes and alkynes could undergo the reaction in a similar fashion.

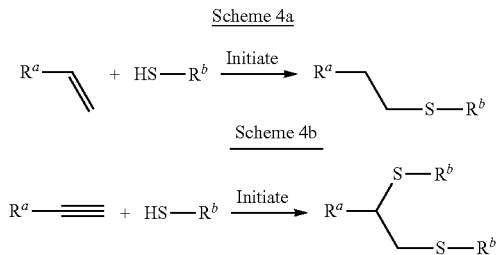

Mechanisms of thiol-ene and thiol-yne click chemistries include free radical mechanisms or nucleophilic mechanisms. The thiolene reaction provides a single reaction, whereas the thiolyne reaction includes a second reaction that can take place after a thiol fragment has linked to the alkyne (intermediate not shown in Scheme 4b). Thiyl radicals are versatile reactive intermediates that undergo a wide range of addition reactions to unsaturated systems including alkenes and alkynes. Thiyl radicals are readily generated thermally (with and without the use of common initiators such as azo- or peroxide-compounds), with high ionizing radiation, or by using photoinitiators. The reactions can be run neat (without solvent) or in a large selection of solvents. Illustrative solvents that can be utilized can include, for example organic solvents such as tetrahydrofuran (THF), methanol, ethanol, dimethyl formamide (DMF), or combinations thereof; water; or combinations thereof. In some embodiments, an inert environment may also be used to avoid undesirable side reactions involving molecular oxygen.

In some embodiments, a surface can be functionalized by reacting the surface with a surface reagent. The residue of the surface reagent, which is attached (e.g., chemically attached) to the surface, can then be useful as is, can be reacted further, can be utilized to attach a compound(s) (e.g., a modifier) to the surface, or some combination thereof. In some embodiments, the surface reagent can be utilized to render a surface amenable to attachment. The surface can then optionally be modified by reaction or association with any molecule thereto. The added molecule is attached to the surface via the residue of the surface reagent. Stated another way, the surface can be modified with a modifier by using the surface reagent as a linker to attach the modifier to the surface.

Surface reagents, as that term is utilized herein include compounds that include at least two double bonds. One of the at least two double bonds reacts with the surface to attach the residue of the surface reagent, leaving at least one double bond available at the surface to optionally attach a modifier thereto. Useful surface reagents can include double bonds, triple bonds, or both. In some embodiments, useful surface reagents can include at least two double bonds, three double bonds, any number of double bonds, at least two triple bonds, three triple bonds, any number of triple bonds, at least one double bond and at least one triple bond, or any combination thereof.

Useful surface reagents can include both commercially available compounds and synthesized compounds.

Examples of illustrative commercially available compounds can include: 1,2,4 trivinyl cyclohexane; 2,4,6 triallyl-1,3,5 triazine; 1,3,5 triazine 2,4,6 (1H,3H, 5H) trione; 1,7 octadiene; N,N'-hexamethylene bis(methacrylamide); 1,4-butanediol diacrylate; 1,4-butanediol dimethacrylate; di(t-rimethylolpropane) tetraacrylate; pentaerythritol tetraacrylate; pentaerythritol tetramethacrylate; pentaerythritol triacrylate; pentaerythritol allyl ether; pentaerythritol trimethacrylate; trimethylolpropane triacrylate; trimethylolpropane trimethacrylate; dipentaerythritol penta-/hexa-acrylate; pentaerythritol diacrylate monostearate; 1,3-butanediol diacrylate; 1,3-butanediol dimethacrylate; neopentyl glycol diacrylate; neopentyl glycol dimethacrylate; ethylene glycol diacrylate; ethylene glycol dimethacrylate; glycerol diacrylate; glycerol dimethacrylate; 3-(acryloyl oxy)-2-hydroxypropylmethacrylate; N-2-acryloylamino)ethyl acrylamide; N-2-acryloylamino)ethyl methacrylamide; divinyl styrene; 1,4-diacryloylpiperazine; N,N'-(1,2-dihydroxyethylene) bis (acrylamide); and 1,4-di-(2-furoyl)piperazine, polybutadiene (1,2 vinyl content from 28 to 90%), butadiene styrene copolymer, hydroxyl-terminated polybutadiene, maleinized polybutadiene, and epoxidized hydroxyl-terminated polybutadiene.

In some embodiments, surface reagents can be synthesized. Generally, a multi-hydroxyl containing compound (~(CH$_2$OH)$_c$ in Schemes 5a and 5b) is reacted with an alkylating agent, for example as seen in Scheme 5a, an alkenyl bromide and in Scheme 5b an alkynyl bromide to form alkenyl alkoxide or alkynyl alkoxide containing compounds that can be useful as surface reagents. It should be noted that the hydroxyl containing compound in Schemes 5a and 5b can, but need not be, part of larger compounds. The sinusoidal line can indicate connection to any element or group of elements. In general, the compound containing the hydroxyl groups contains at least two hydroxyl groups in order to produce a surface reagent that includes at least two unsaturated carbon-carbon bonds after reaction with the alkylating agent. As such, c is an integer of 2 or greater. As such, dihydroxyl containing compounds, trihydroxyl containing compounds, tetrahydroxyl containing compounds, pentahydroxyl containing compounds, etc. can be utilized in Scheme 5a and 5b, for example. The alkenyl bromide or alkynyl bromide, as indicated by j can include longer carbon chains as well. In some embodiments, j can be an integer from 1 to 18; 1 to 15; 1 to 12; or 1 to 6 for example. It should also be noted that alkenyl bromides or alkynyl bromides having different carbon chain lengths can be mixed with a single (or more than one) alcohol containing compound to produce a mixture of surface reagents.

Scheme 5a

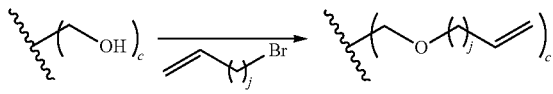

-continued
Scheme 5b

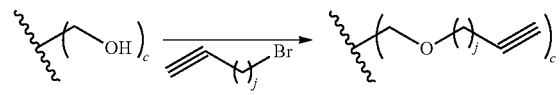

In some embodiments, the alcohol containing compound can include more than two alcohol groups (e.g., c in Scheme 5a and 5b is equal to or greater than 2 and j is an integer from 1 to 18), for example, polyols with equal to or more than two alcohol groups can be utilized. Use of a polyol with equal to or greater than two hydroxyl groups could lead to a surface reagent having equal to or more than two double or triple bonds. It should also be noted that not all hydroxyl groups in a polyol containing compound need to be converted to alkoxide alkenyl or alkoxide alkynyl containing groups. For example, all but one of the hydroxyl groups in a polyol could remain unconverted, i.e., they could remain as hydroxyl groups. In this case only one unsaturated carbon-carbon bond would be needed to attach the surface reagent to the surface and the remaining alcohols could be converted to have different functionality or be attached to a modifier.

Generally, a multi-hydroxyl containing compound (~(CH$_2$OH)$_c$ in Schemes 5a and 5b) may be desirable because the alcohol groups can undergo many other reactions with different reagents that result in a surface reagent with new functionality. For example, there are synthetic pathways from the alcohol group to achieve many different functionalities or a combination of functionalities including an alkene group, an alkyne group, thiol group, nitrile group, azide group, amine group, carboxylic acid group, thioester group, ester group, amide group, Biotin group, phthalimido group, an activated alkene or alkyne group, Michael acceptor group, maleimide group, vinyl sulfone group, dienophile group, dithioester group, thiocarbonylthio group, dithiocarbamate group, diene group, cyclopentadienyl group, sulfonylthioformate group, epoxy group, succinimide group, aromatic group, pentafluorophenyl group, carbonylazide group, azide group, isocyanate group and photoreactive group. Artisans can choose the surface reagent functional groups and compound modifier functional groups that react effectively to bond the compound modifier, of any size to the surface with the surface reagent e.g. via n substitution reactions, elimination reactions, addition reactions, radical reactions, rearrangement reactions and organic redox reactions, Michael reactions; maleimide-thiol reactions; amine-succinimide reactions; ring opening reactions; and click chemistry reactions. Michael reactions, maleimide-thiol, amine-succinimide, free radical, and click chemistries. In addition, surface reagents with the multi-functionality above but made without the use of a multi-hydroxy compound can be used.

Scheme 5c includes an example of a hydroxyl containing compound that can be utilized to form surface reagents. In Scheme 5c (j is as defined above), the hydroxyl containing compound is the polyol, pentaerythritol. It should also be understood that the alkenyl bromide could also be replaced with an alkynyl bromide to form surface reagents with triple bonds instead of that shown in Scheme 5c.

Scheme 5c

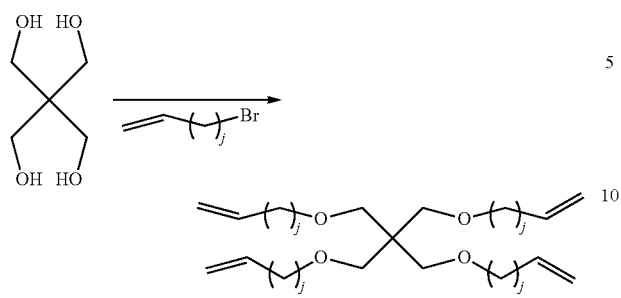

Illustrative polyol containing compounds that can be utilized to form surface reagents can include pentaerythritol, dipentaerythritol, 1,1,1 tris(hydroxymethyl)-propane, tripentaerythritol, 1,1,1 tris(hydroxymethyl)-ethane, di(trimethylol)propane, and trimethylolpropane allyl ether, tetrapentaerythritol. pentapentaerythritol, heptapentaerythritol, octapentaerythritol, nonapentaerythritol, decapentaerythrito and higher pentaerythritols and mixtures thereof, for example.

Reaction conditions for the reaction of the hydroxyl containing compound with the alkenyl or alkynyl bromide can include various solvents or solvent systems and strong bases. In some embodiments sodium hydride (NaH) can be used to deprotonate the hydroxyl groups of the hydroxyl containing compound so that the alkenyl or alkynyl bromide, can react with it to form the surface reagent. In some embodiments that utilize NaH to deprotonate the hydroxyl groups, dimethylformamide (DMF), tetrahydrofuran (THF), hexanes, diglyme, or any combinations thereof can be utilized. Illustrative other reagents that can be utilized to deprotonate the hydroxyl groups can include, potassium hydroxide (KOH), sodium hydroxide (NaOH), or combinations thereof. Particular reaction conditions (e.g., solvent, temperature, etc.) can of course depend further on the reagents utilized, the particular hydroxyl containing compound, the particular alkenyl bromide or alkynyl bromide, other considerations not mentioned herein, or combinations thereof and would be ascertainable by one of skill in the art.

Examples of some illustrative surface reagents that can be synthesized can include pentaerythritol allyl ether; 4,8,12,-trioxapentadeca-1,14-diene, 6,6,10,10,-tetrakis[(allyloxy)methyl]; and 4,8,12,16-tetraoxanonadeca-1,18-diene, 6,6, 10,10,14,14-hexakis[(2-propen-1-yloxy)methyl].

Illustrative surface reagents that can be synthesized using the illustrative scheme above can include the following general formulas 17a to 17h, where each R terminates the carbon containing chain and independently is a —CH=CH$_2$ or —C≡CH group; and j is an integer from 1 to 18. It should be noted that the compounds of Formulae 17g and 17h contain double bonds in an alkyl double bond position (—OCH$_2$CH$_2$CH=CH$_2$) and in an allyl double bond position (—OCH$_2$CH=CH$_2$).

(Formula 17a)

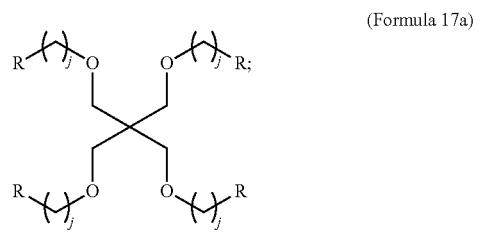

(Formula 17b)

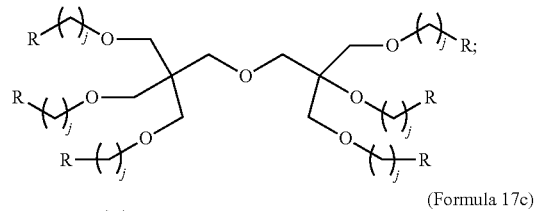

(Formula 17c)

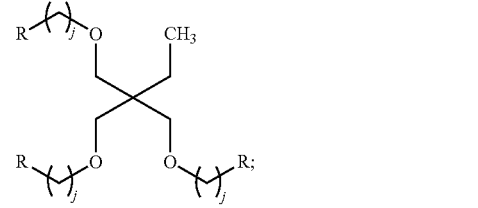

(Formula 17d)

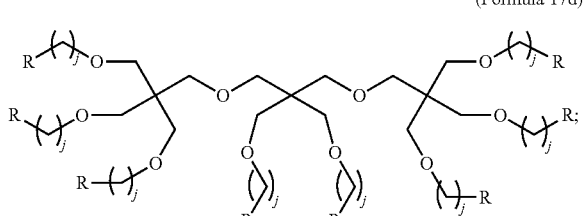

(Formula 17e)

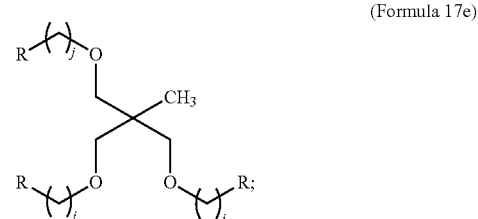

(Formula 17 f)

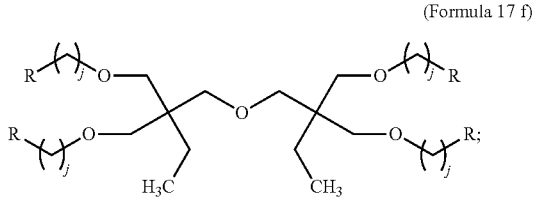

(Formula 17g)

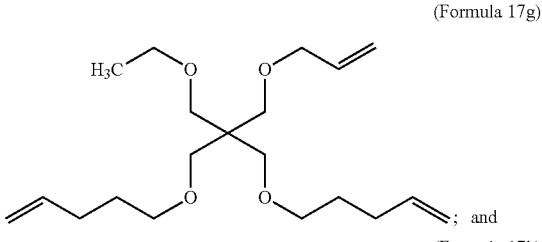

; and (Formula 17h)

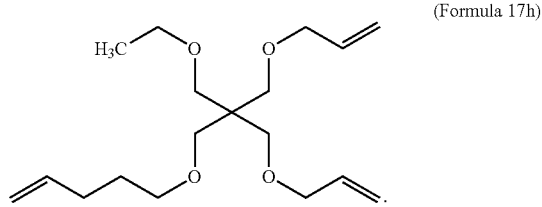 [SMILES: C=CCCCOCC(COCC)(COCC=C)COCC=C]

The particular reaction to attach the surface reagent to the surface, method of bringing the surface reagent and the surface into contact (including the solvent for example), time of exposure of the surface reagent to the surface, and combinations thereof can be chosen, as would be known to one of skill in the art, in order to obtain permanent attachment of the surface reagent at desired levels to the surface.

Methods of bringing the surface reagent and the surface into contact can vary depending on the surface reagent, the surface, the form the surface is in, or combinations thereof for example. In some embodiments, the surface reagent can be in a solvent and the surface reagent composition (at least the solvent and the surface reagent) can be brought into contact with the surface. The surface reagent composition can be brought into contact with the surface by applying the surface reagent to the surface using any application method(s), by immersing the surface in the surface reagent, or by any combination thereof.

Illustrative solvents that can be utilized in embodiments where the surface reagent(s) are brought into contact with the surface in a surface reagent composition can include, for example organic solvents such as ethyl acetate, cyclohexane, toluene, hexane, chloroform, heptane, methyl ethyl ketone (MEK), or combinations thereof. Concentrations of the surface reagent in the surface reagent composition can vary depending on a number of factors. In some embodiments the surface reagent can have a concentration of not less than 0.001 Molar (M), not less than 0.002 M, or not less than 0.02 M in the surface reagent composition.

Reaction conditions for attachment, including temperature, pressure, atmosphere, concentration, reagents, etc. can depend at least in part on the surface reagents, the reactions being done to attach the surface reagent, the surface being modified, etc. In some embodiments, certain chemistries that may be useful for attaching the surface reagent can include free radical bonding with radical formation being initiated thermally by light, and/or with a free radical initiator, for example. The parameters of initiation including for example, temperature; intensity, time and wavelength in the case of photoinitiation; relative concentrations of initiator, etc.; and other reagents can all be utilized to control and tailor the attachment of the surface reagent to the surface. In some embodiments, azonitriles and peroxides, which can be particularly useful, can include, for example 2,2' azobis-isobutyronitrile (AIBN) having a melting point of 100-103° C. and a 65° C. 10 hr half-life; 2,2'azobis-2-methylbutyronitrile (AMBN) having a melting point of 48-52° C. and a 67° C. 10 hr half-life; α-cumylperoxy-neodecanoate having a 38° C. 10 hr half-life; and lauroyl peroxide having a melting point of 55° C. and a 65° C. 10 hr half-life.

Examples of useful exposure times for the surface reagent to the surface can include, for example 2 minutes to 16 hours. Useful exposure times can depend, at least in part, on the form of the surface reagent(s) (in a solvent or neat), the type of surface, the chemistry being utilized to link the surface reagent to the surface, the form of the surface (e.g., dimension, shape, morphology, topography, etc.), and combinations thereof.

A coating refers to a surface covering that is applied by dip, spin, spray, brush, vapor deposition, roll, blade, rod, or electrochemical coating techniques. A coating applied by dip, spray or other methods uses a coating composition that contains a polymer dissolved in a solvent that has an adequate viscosity for substrate film formation. Methods of dip coating include immersing an article to be coated in a coating composition, followed by removal of the article from the solution at a controlled rate and then drying the coating by solvent evaporation. Coating methods rely on coating compositions wetting the article to be coated, or in other words the coating composition must spread onto the surface and not bead up upon drying. Disadvantages of articles that have been coated using any method often include delamination of the coating during use, coating defects such as webbing between surface protrusions, coating unevenness and clumping, for example.

Functionalized surfaces disclosed, illustrated, exemplified and claimed herein are not coated. Disclosed surface reagents undergo a reaction with the substrate by, for example immersing the substrate in a surface reagent composition containing solvent, the surface reagent(s), and an initiator. A reaction between the surface reagent and substrate occurs at elevated temperature. The reaction time can be determined by the half-life of the free-radical initiator. The concentration of surface reagent(s) in the surface reagent composition are relatively low and are not of adequate viscosity for dip or spray coating methods. If the surface reagent composition with or without initiator was attempted to be coated onto the surface, it would not be effective in attaching the surface reagent because non-polymeric molecule surface reagents do not form a film on the substrate and polymeric surface reagents bead up on the surface when exposed to the elevated temperature needed for surface reagent attachment.

It may be useful to confirm attachment of the surface reagent to the surface and to determine the amount of reactive functional groups remaining after attachment of the surface reagent to the surface. The remaining reactive functional groups are available for further reaction and can be utilized to attach a compound(s) (e.g., a modifier) to the surface. One method of confirming surface reagent attachment can include washing the surface with a solvent after the surface reagent has been attached to the surface and then verifying that the surface reagent is still attached. In some embodiments, the modified surface can be washed with a solvent in which the molecule of interest (the surface reagent) is very soluble. A solvent in which the surface reagent is very soluble is one in which the surface reagent has a solubility of at least 10 mg/mL. One method of determining the amount of reactive functional groups remaining after surface attachment can include reacting the surface with bromine (a solution of $Br_2$ in $CHCl_3$) once the surface reagent has been attached and the unreacted surface reagent removed by washing. Specific examples of illustrative methods of carrying out both of these tests can be seen in the Examples below.

In some embodiments, a surface can be characterized by the amount of unsaturated carbon-carbon bonds at the surface (as opposed to in the bulk). In some more specific embodiments, a surface can be characterized by the difference in the amount of unsaturated carbon-carbon bonds at the surface due to the reaction of the surface reagent.

Use of Functionalized Surfaces

As discussed above, a functionalized surface (e.g., a surface that has been reacted with a surface reagent) can be useful as is, can have the reactive portion of the surface reagent further reacted, or can have a modifier attached thereto. A surface reagent that has been reacted with a surface can be referred to as a surface agent residue. Surface functionalization can result in a product that is non-fouling, has a low coefficient of friction, or combinations thereof, for example.

In some embodiments, a functionalized surface may be further reacted and used without attachment or without immediate attachment of a modifier. Illustrative types of reactions that can be utilized for unsaturated carbon-carbon bonds can include, for example electrophilic addition, epoxidation, ozonolysis, oxidative cleavage, dihydroxylation, hydroboration-oxidation, carbene addition, click reactions, olefin metathesis, dimerization and polymerization, or any combination thereof. Illustrative types of reaction that can be utilized for alcohol groups are well known and those skilled in the art can use these reactions to introduce additional functionalities. After such a reaction, an optional additional reaction of the unsaturated carbon-carbon bond and/or alcohol groups can result in modification to achieve new surface properties or can result in conversion of the surface with a new functionality that can also be modified to achieve a new surface property. Depending on a desired property or structure, various reactions or series of reactions can be carried out on the at least one remaining double and/or triple bond that remains after attaching the surface reagent to the surface.

In some embodiments, the available reactive functional groups of attached surface reagents can be utilized to attach modifiers thereto. Modifiers can include any compounds or materials. Illustrative types of modifiers can include, for example, polymeric modifiers and non-polymeric modifiers. Illustrative modifiers can be chosen, as desired to impart properties that include but are not limited to anti-fouling properties (of any type) hydrophilic properties, barrier properties, wet lubricious properties (low coefficient of friction when wet with water), dry lubricious properties (low coefficient of friction between two dry or relatively dry surfaces) adhesive properties, non-adhesive properties, bioreactive properties, bioactive properties, anti-microbial properties, electrical properties, anti-fogging properties, stimuli-responsive properties, catalytic properties, photonic properties, magnetic properties, dielectric properties, chemical and biological sensing, stabilization properties, labeling properties, low surface energy properties, high surface energy properties, anti-corrosion properties, chemical compatibility properties, biocompatible properties, hemocompatible properties, and antithrombogenic properties. The modifier or modifiers can generate a combination of properties and can be tuned for the desired application. Illustrative applications can include, for example solar cells, organic light emitting diodes (OLEDs), field effect transistors (FETs), e.g., organic field effect transistors (OFETs), dye sensitive solar cells, and fuel cells. Illustrative applications can also include use with proteins, especially in circumstances where anti-fouling properties are exhibited.

In some embodiments, non-polymeric modifiers can be utilized to modify a functionalized surface. In some embodiments, non-polymeric modifiers can include, for example biomolecules, bioactive molecules, pharmacophores, nucleic acids, proteins, peptides, amino acids, organic or inorganic small molecules, perfluorinated molecules, thiol substituted molecules, silanes, functionalized silanes, 3-mercaptopropyltriethoxysilane, succinimides, cyclodextrins, fullverenes, adamantanes, dyes, chromophores, flurophores, saccharides, lipids, organic semiconductors, and biotin. A specific example of a perfluorinated molecule can include, for example, perfluorodecanethiol, which can be attached to a functionalized surface.

In some embodiments polymers can be utilized to modify the reactive surface. Some illustrative types of polymers that can be useful as polymeric modifiers can include, for example polysiloxanes, fluorinated polymers, hydrophilic polymers such as polyvinylpyrrolidone, polyethylene glycol, polyzwitterion, and polyvinyl alcohol, antimicrobial and biocidal polymers such as polymers that contain phosphonium or quaternary ammonium salts or biguanide groups or N-halamine groups, stimuli responsive polymers such as the polymer thermoresponsive poly(N-isopropylacrylamide) and polymers that are conjugated to drugs bioreactive moieties for example.

In some embodiments, polymer modifiers can include disclosed polymers, for example disclosed polyzwitterionic polymers Any polymeric modifier, including for example those disclosed herein, can be attached to a functionalized surface. As discussed above, a functionalized surface includes a residue from a surface reagent. In some embodiments, polymeric modifiers can be attached to a surface via more than one residue. In some embodiments, polymeric modifiers can be covalently attached to a functionalized surface. For example, a polymer can be covalently bound via one residue to one point of a surface, a second residue to a second point of a surface, etc.; a polymeric modifier can be covalently bound via more than one residue (e.g., a residue can be covalently bound to a another residue and that residue can be covalently bound to another residue, etc.) to one point of a surface; or any combination thereof. Possible configurations of polymeric modifiers attached to a surface via a residue are discussed below and apply to polymeric modifiers attached via disclosed surface reagents.

Surfaces Useful for Functionalization

Disclosed surface reagents can be advantageous to a number of surfaces because they can be used in an infinite number of reaction schemes in order to provide a surface with any property or properties. For example, as long as a surface includes unsaturated carbon-carbon bonds, a surface reagent including an unsaturated carbon-carbon bond can be utilized as a springboard to afford virtually any functionality, property, or both to the surface by also including at least a second reactive group in the surface reagent, which can provide the desired functionality or property, can be further reacted to provide the desired functionality or property, or both. Alternatively or additionally, disclosed surface reagents can be utilized to attach some secondary compound(s), which can also be utilized to provide other properties or functionalities.

Disclosed surface reagents can be attached to any surface that is reactive towards the surface reagents. Stated another way, disclosed surface reagents can be attached to any surface that is sufficiently reactive or can be made sufficiently reactive towards a compound having an unsaturated bond.

In some embodiments, surfaces that can be reacted with surface reagents, modified, for example with polymers such as polyzwitterionic polymers, or both can include thermoset elastomers. In some embodiments, useful thermoset elastomers can be compounded. Thermoset elastomers are commercially available in a wide range of compositions and properties.

Thermoset elastomer materials include both natural rubber (NR) and synthetic rubbers. Illustrative, non-limited examples include, polyisoprene (IR), styrene-butadiene rubbers (SBR), carboxylated styrene-butadiene (XSBR), polybutadiene (BR), polychloroprene (CR), polysulfide (T), epichlorohydrin (CO), epichlorohydrin-ethyleneoxide, polyacrylate (ACM), chlorinated polyethylene, chlorosulfonated polyethylene (CSM), polyester-polyurethanes (AU), polyether-polyurethanes (EU), isobutylene (methylpropene), ethylene-propylene (EP), ethylene propylene diene monomer (EPDM), butyl (IIR), bromobutyl, chlorobutyl, nitrile (NBR), silicone (MQ), hydrogenated nitrile (HNBR), carboxylated NBR (XNBR), fluorocarbon (FKM), fluorinated silicone (FVMQ), and blends and/or copolymers of any of the rubbers.

In some embodiments, a useful surface can include rubber. The rubber can be thermoset elastomer in finished part form. Use of such material may be advantageous because it can be reacted with surface reagents, modified, with polymers such as polyzwitterionic polymers for example, or both after all high temperature processing has been completed. In developing a rubber compound, a raw dry rubbery material is mixed with various compounding ingredients. Compounding is a term of art that refers to a process of sequentially adding ingredients into the raw rubber to make a final homogeneous mix that is typically referred to as a rubber compound. Rubber that has not been compounded can be referred to as raw rubber. Common compounding ingredients added into the rubber can include, for example one or more of vulcanizing agents, vulcanization accelerators, activators for the accelerators, fillers, processing aids, antidegradants and other miscellaneous ingredients for specific purposes. The compounding ingredients are used to make the rubber compound have the desired final properties in its final form.

Accordingly, a thermoset elastomer is not a raw rubbery material and may include one or more of: a vulcanizing agent, a vulcanization accelerator, an activator for an accelerator, a filler, a processing aid, a softener, an antidegradant, as well as other chemical moieties that result from the inclusion of such materials and the compounding process. Vulcanization is a chemical process for converting uncured natural rubber or synthetic elastomer or other polymers into more durable materials via a process that can include heat or radiation or pressure with the addition of vulcanization agents, curatives and optionally with accelerators. These additives modify the polymer by forming cross-links (bridges) between individual polymer chains. Examples of vulcanization agents are crosslinkers, sulfur, peroxide, metallic oxides (e.g., MgO, ZnO, PbO), acetoxysilane, multiarmed vinylic compounds (e.g., diacrylates, triacrylates, dimethacrylates, ethylene glycol dimethacrylate, trimethacrylates, acrylamides, phenols, methlyenebisacrylamide, hydroxydimethoxyethylacrylamide). A vulcanization accelerator is a chemical substance that causes vulcanization of rubber to take place more rapidly or at lower temperatures. Many classes of compounds act as accelerators, and typical examples are organic materials containing sulfur and nitrogen, derivatives of benzothiazole, sulfeneamides, ethylene thiourea, thiurams, and dithiocarbamates. Activators support vulcanization, e.g., zinc oxide, stearic acid, palmitic acid, lauric acid, fatty acids, and salts thereof. Many fillers are known and used to enhance color or physical properties, for example, carbon black, white clay, mineral fillers, silica, and calcium carbonate. Processing aids are available in great variety and are used to improve processability of a rubber compound or to alter its physical properties, for example, as a lubricant, dispersing agent, wetting agent, plasticizer, blowing agent, factice, softener, or tackifying agent. An anti-degradant deters the aging of a compounded rubber, for example, an antioxidant, antiozonants, amine type anti-degradant, and phenolic type anti-degradant.

Illustrative forms of surfaces that can be reacted with disclosed surface reagents, and then optionally modified, can include virtually any form of surfaces, including two dimensional, e.g., substantially flat, surfaces; and three dimensional, e.g., regular or irregular particles, formed (using any process(es)) articles having virtually any shape whatsoever. Illustrative three dimensional surfaces can be formed into final articles and then reacted with surface reagent(s) and optionally modified; reacted with surface reagent(s), optionally modified and then formed into final articles; or a combination thereof.

A surface useful for attachment can optionally be associated with a bulk as well. In some embodiments, an article includes a bulk and at least one surface, for example. In some embodiments, the bulk can be of substantially the same material as the surface and in some embodiments the bulk can be of a different material than the surface.

Surface Modification of Surfaces not Functionalized

Surfaces not made active via use of disclosed surface reagents can also have disclosed polyzwitterionic polymers attached thereto. In some embodiments, a surface can have disclosed polyzwitterionic polymers covalently bound thereon. While in some embodiments, a surface can have disclosed polyzwitterionic polymers attached thereto via any type of mechanism discussed above, including combinations thereof.

Virtually any surface can be modified with disclosed polyzwitterionic polymers. Disclosed polyzwitterionic polymers can be utilized with or without disclosed surface reagents in a number of advantageous ways. For example, polyzwitterionic polymers can be useful to render non-hydrophilic surfaces hydrophilic. Alternatively or additionally, polyzwitterionic polymers can be useful to reduce or eliminate formation of biofilms on surfaces.

Illustrative types of surfaces that can be modified with disclosed polyzwitterionic polymers can include virtually any surfaces. Examples of surfaces can include organic surfaces, inorganic surfaces, or combinations thereof. Illustrative inorganic surfaces can include, for example glass, ceramics, and metals. Illustrative organic surfaces can include, for example, natural and synthetic materials. Illustrative natural surfaces can include, for example cellulose (e.g., wood or any other form). Illustrative synthetic surfaces can include, for example polymers (of any form or type).

Illustrative forms of surfaces that can be modified with disclosed polyzwitterionic polymers can include virtually any form of surfaces, including two dimensional, e.g., substantially flat, surfaces; and three-dimensional surfaces, e.g., regular or irregular particles, formed (using any process(es)) articles having virtually any shape whatsoever. Illustrative three-dimensional surfaces can be formed into final articles and then modified with polyzwitterionic polymers; modified with polyzwitterionic polymers and then formed into final articles; or a combination thereof.

In some embodiments, surfaces that can be reacted with surface reagents, modified, for example with polymers such as polyzwitterionic polymers, or both can include thermoset elastomers. In some embodiments, useful thermoset elastomers can be crosslinked, compounded, or both. Thermoset elastomers are commercially available in a wide range of compositions and properties.

Thermoset elastomer materials include both natural rubber (NR) and synthetic rubbers. Illustrative, non-limited examples include, polyisoprene (IR), styrene-butadiene rubbers (SBR), carboxylated styrene-butadiene (XSBR), polybutadiene (BR), polychloroprene (CR), polysulfide (T), epichlorohydrin (CO), epichlorohydrin-ethyleneoxide, polyacrylate (ACM), chlorinated polyethylene, chlorosulfonated polyethylene (CSM), polyester-polyurethanes (AU), polyether-polyurethanes (EU), isobutylene (methylpropene), ethylene-propylene (EP), ethylene propylene diene monomer (EPDM), butyl (IIR), bromobutyl, chlorobutyl, nitrile (NBR), silicone (MQ), hydrogenated nitrile (HNBR), carboxylated NBR (XNBR), fluorocarbon (FKM), fluorinated silicone (FVMQ), and blends and/or copolymers of any of the rubbers.

In some embodiments, a specific useful surface can include rubber. The rubber can be a thermoset elastomer in finished part form. Use of such material may be advantageous because it can be reacted with surface reagents, modified, with polymers such as polyzwitterionic polymers for example, or both after all high temperature processing has been completed. In developing a rubber compound, a raw dry rubbery material is mixed with various compounding ingredients. Compounding is a term of art that refers to a process of sequentially adding ingredients into the raw rubber to make a final homogeneous mix that is typically referred to as a rubber compound. Rubber that has not been compounded can be referred to as raw rubber. Common compounding ingredients added into the rubber can include, for example one or more of vulcanizing agents, vulcanization accelerators, activators for the accelerators, fillers, processing aids, antidegradants and other miscellaneous ingredients for specific purposes. The compounding ingredients are used to make the rubber compound have the desired final properties in its final form.

Accordingly, a thermoset elastomer is not a raw rubbery material and may include one or more of: a vulcanizing agent, a vulcanization accelerator, an activator for an accelerator, a filler, a processing aid, a softener, an antidegradant, as well as other chemical moieties that result from the inclusion of such materials and the compounding process. Vulcanization is a chemical process for converting uncured natural rubber or synthetic elastomers or related polymers into more durable materials via the addition of sulfur or other equivalent curatives or accelerators. These additives modify the polymer by forming cross-links (bridges) between individual polymer chains. Examples of vulcanization agents are crosslinkers, sulfur, peroxide, metallic oxides (e.g., MgO, ZnO, PbO), acetoxysilane, multiarmed vinylic compounds (e.g., diacrylates, triacrylates, dimethacrylates, ethylene glycol dimethacrylate, trimethacrylates, acrylamides, phenols, methlyenebisacrylamide, hydroxydimethoxyethylacrylamide). A vulcanization accelerator is a chemical substance that causes vulcanization of rubber to take place more rapidly or at lower temperatures. Many classes of compounds act as accelerators, and typical examples are organic materials containing sulfur and nitrogen, derivatives of benzothiazole, sulfeneamides, ethylene thiourea, thiurams, and dithiocarbamates. Activators support vulcanization, e.g., zinc oxide, stearic acid, palmitic acid, lauric acid, fatty acids, and salts thereof. Many fillers are known and used to enhance color or physical properties, for example, carbon black, white clay, mineral fillers, silica, and calcium carbonate. Processing aids are available in great variety and are used to improve processability of a rubber compound or to alter its physical properties, for example, as a lubricant, dispersing agent, wetting agent, plasticizer, blowing agent, factice, softener, or tackifying agent. An anti-degradant deters the aging of a compounded rubber, for example, an antioxidant, antiozonants, amine type anti-degradant, and phenolic type anti-degradant.

Illustrative forms of surfaces that can be modified with polyzwitterionic polymers can include virtually any form of surfaces, including two dimensional, e.g., substantially flat, surfaces; and three dimensional surfaces, e.g., regular or irregular particles, formed (using any process(es)) articles having virtually any shape whatsoever. Illustrative three dimensional surfaces can be formed into final articles and then reacted with surface reagent(s) and optionally modified; reacted with surface reagent(s), optionally modified and then formed into final articles; or a combination thereof.

A surface useful for attachment of polyzwitterionic polymers can optionally be associated with a bulk as well. In some embodiments, an article includes a bulk and at least one surface, for example. In some embodiments, the bulk can be of substantially the same material as the surface and in some embodiments the bulk can be of a different material than the surface.

In some embodiments, surfaces that are naturally hydrophobic can be made hydrophilic by modification with polyzwitterionic polymers. In some embodiments compounded rubber containing surfaces, which are naturally hydrophobic can be rendered hydrophilic by modification with disclosed polyzwitterionic polymers. In some embodiments, disclosed compounded rubber containing surfaces, which are naturally hydrophobic can be rendered hydrophilic through reaction with disclosed surface reagent(s) and modification with disclosed polyzwitterionic polymers.

Disclosed surfaces can be made to have desirable properties of the bulk material (e.g., thermoset elastomer for example) as well as those of polyzwitterionic polymers that are utilized to modify the surface thereof. As such, disclosed herein are methods of modifying the surface properties (e.g., hydrophilic versus hydrophobic, prevention or minimization of biofilm formation) of a material while still maintaining the bulk properties thereof (e.g., elasticity, modulus, etc.).

A surface useful for modification with polyzwitterionic polymers can optionally be associated with a bulk as well. In some embodiments, an article includes a bulk and at least one surface, for example. In some embodiments, the bulk can be of substantially the same material as the surface and in some embodiments the bulk can be of a different material than the surface.

Attachment of Polyzwitterionic Polymers

Whether a polymer is attached directly to a surface or via a surface reagent, the configuration of attachment can be described.

Figure 1B:
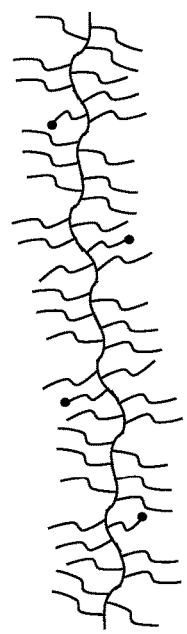

As discussed above, polyzwitterionic polymers can include reactive groups at terminal positions ($T^1$ and $T^2$ in polymer formulae above) and at pendant positions ($R^x$ in polymer formulae above). FIG. 1A shows reactive functional groups (·) at a terminal position; and FIG. 1B shows reactive functional groups (.) on pendant chains. Attachment of the polyzwitterionic polymer (whether via a linker or not) is via one or more reactive groups. The configuration of the surface/polyzwitterionic polymer depends on which reactive group(s) is bound (covalently or otherwise) to the surface.

Figure 2A:
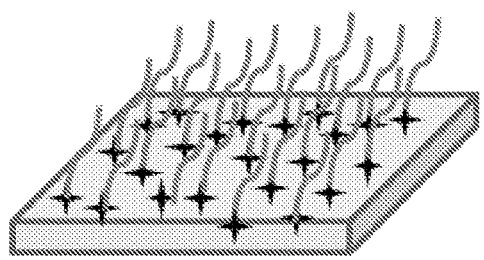
FIGS. 2A, 2B, 2C and 2D schematically illustrate different possible configurations of disclosed polyzwitterionic polymers including brush configurations (FIGS. 2A and 2B); and network configurations (FIGS. 2C and 2D).
Figure 2B:
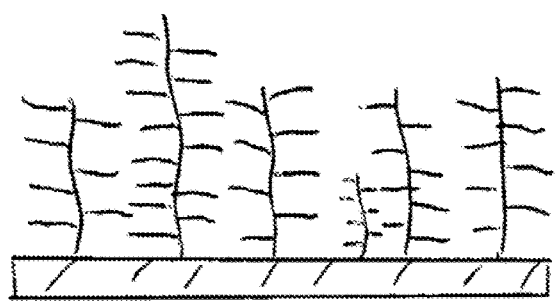
Figure 2C:
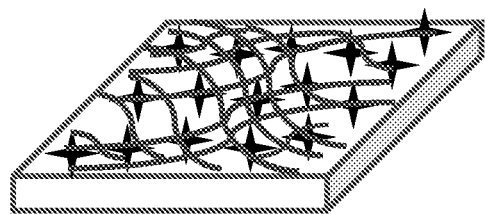
Figure 2D:
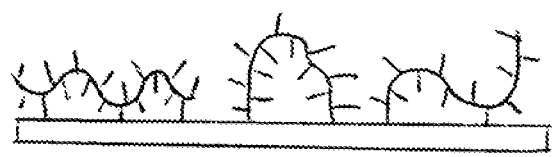
Figure 3:
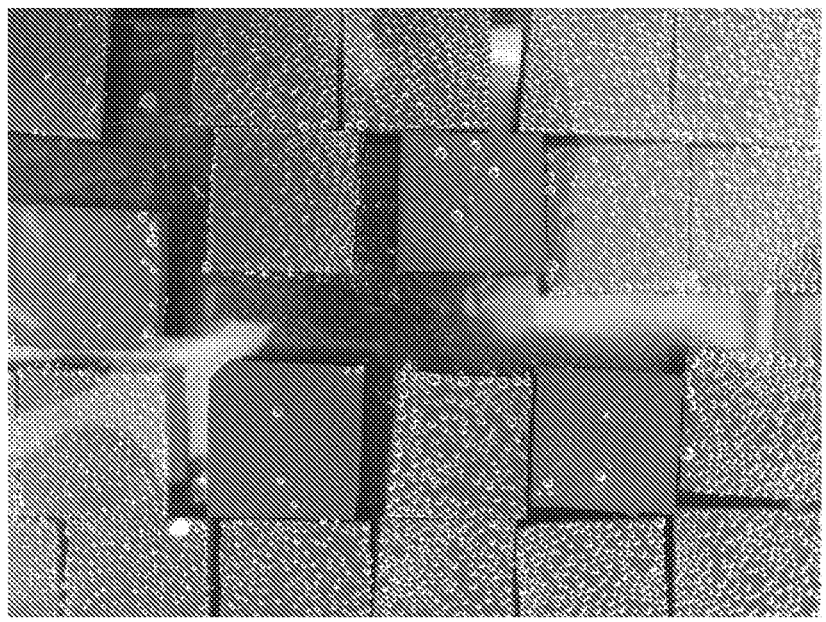
FIG. 3 is a photograph showing both unmodified butyl rubber coupons (those with bubbles) and modified butyl rubber coupons (those without bubbles).

A polymer that only links to the surface at one terminal position is referred to herein as being in a brush configuration. Illustrative brush configurations can be seen in FIGS. 2A and 2B. The polymer brush configuration seen in FIG. 2A shows a surface reagent residue between the surface and the polymer; and that in FIG. 2B shows a polymer being bound directly to the surface. A polymer that links to the surface at any two or more positions (e.g., both terminal positions of a polymer, a terminal position and a pendant position of a polymer, or two pendant positions of a polymer) is referred to herein as being in a network configuration. Illustrative network configurations can be seen in FIGS. 2C and 2D. The polymer network configuration seen in FIG. 2C shows a surface reagent residue between the surface and the polymer; and that in FIG. 2D shows a polymer being bound directly to the surface.

Illustrative Embodiments

Some illustrative embodiments include polymers according to formula 12:

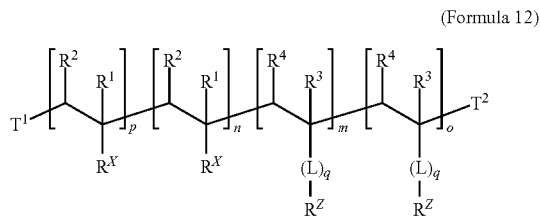

(Formula 12)

where $T^1$ and $T^2$ can independently be any group;
$R^X$ independently comprise at least a reactive group or non-reactive, non-zwitterionic group;
$R^Z$ comprises at least a zwitterionic portion;
$R^1$ and $R^3$ are independently hydrogen, substituted or unsubstituted alkyl, or halogen;
$R^2$ and $R^4$ are independently hydrogen, substituted or unsubstituted alkyl, substituted or unsubstituted alkoxy, or halogen;
q can independently be 0 or 1 and when an independent q is 1, L can be a linker group;
m can be an integer from 1 to 10,000;
n can be an integer from 0 to 10,000;
can be an integer from 0 to 10,000; and
p can be an integer from 0 to 10,000.

Some illustrative embodiments include polymers according to formula 13:

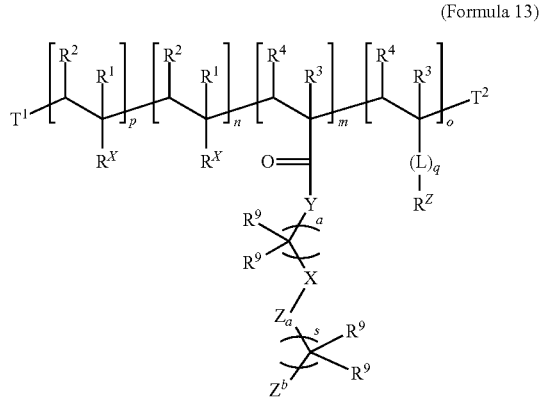

(Formula 13)

where $T^1$ and $T^2$ can independently be any group;
Y can be —O— or —NH;
X can be $CH_2$ or $(CH_2CH_2O)_vCH_2CH_2$, where v can be an integer from 1 to 10, 1 to 6, 1 to 4 or even 1 or 2;
$R^X$ comprises at least one reactive group or non-reactive, non-zwitterionic group;
$R^Z$ comprises at least a zwitterionic portion;
$R^1$ and $R^3$ are independently hydrogen, substituted or unsubstituted alkyl, or halogen;
$R^2$ and $R^4$ are independently hydrogen, substituted or unsubstituted alkyl, substituted or unsubstituted alkoxy, or halogen;
$R^9$ can independently be selected from —H or $C_1$-$C_4$ alkyl chain optionally substituted with a heteroatom (e.g., $CH_2OH$);

each q can independently be 0 or 1 and when an independent q is 1, the associated L can be a linker group;
a can be an integer from 0 to 11;
s can be an integer from 1 to 6;
m can be an integer from 1 to 10,000;
n can be an integer from 0 to 10,000;
can be an integer from 0 to 10,000; and
p can be an integer from 0 to 10,000.

Some illustrative embodiments include polymers according to any of formula 13a, 13b, or 13c:

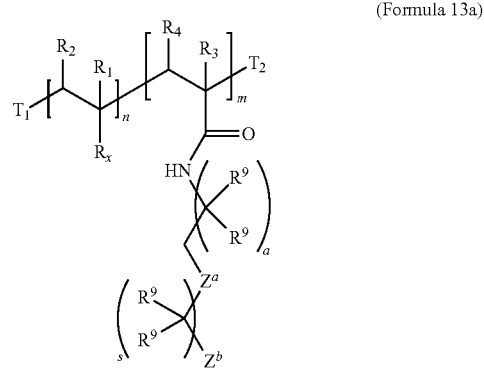

(Formula 13a)

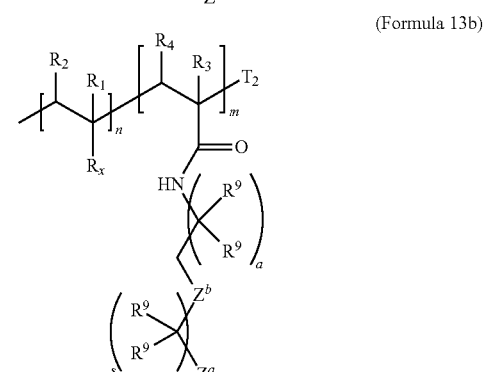

(Formula 13b)

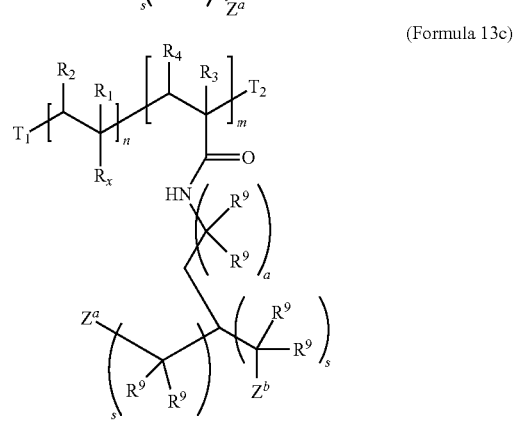

(Formula 13c)

where $T^1$ and $T^2$ can independently be any group;
$R^X$ comprises at least one reactive group or non-reactive, non-zwitterionic group;
$R^1$ and $R^3$ are independently hydrogen, substituted or unsubstituted alkyl, or halogen;
$R^2$ and $R^4$ are independently hydrogen, substituted or unsubstituted alkyl, substituted or unsubstituted alkoxy, or halogen;
m can be an integer from 1 to 10,000;
n can be an integer from 0 to 10,000;

a can be an integer from 0 to 11;

s can be an integer from 2 to 8;

one and only one of $Z^a$ and $Z^b$ have the formula 12b

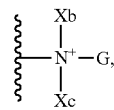

(Formula 12b)

$X^b$ and $X^c$ are independently selected from H, CH$_3$, or a C$_1$-C$_6$ alkyl chain optionally substituted with a heteroatom; and G is a bond or a terminal group;

and the other of $Z^a$ and $Z^b$ comprise a sulfonate group, a carboxylate group, a phosphate group, a phosphinate group, —OP(OH)$_2$O, or a sulfate group.

Some illustrative embodiments include polymers according to formula 13d:

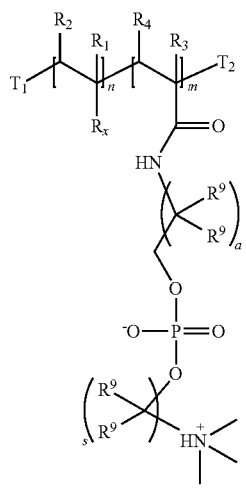

(Formula 13d)

where T$^1$ and T$^2$ can independently be any group;

R$^X$ comprises at least one reactive group or non-reactive, non-zwitterionic group;

R$^1$ and R$^3$ are independently hydrogen, substituted or unsubstituted alkyl, or halogen;

R$^2$ and R$^4$ are independently hydrogen, substituted or unsubstituted alkyl, substituted or unsubstituted alkoxy, or halogen;

m can be an integer from 1 to 10,000;

n can be an integer from 0 to 10,000;

a can be an integer from 0 to 11;

s can be an integer from 2 to 8.

Some illustrative embodiments include polymers according to formula 15

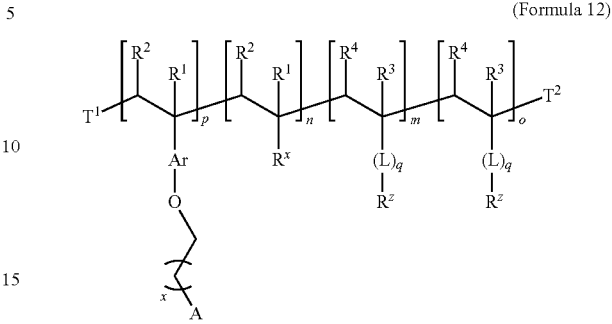

(Formula 12)

where T$^1$ and T$^2$ can independently be any group;

R$^X$ comprises at least one reactive group or non-reactive, non-zwitterionic group;

R$^Z$ comprises at least a zwitterionic portion;

R$^1$ and R$^3$ are independently hydrogen, substituted or unsubstituted alkyl, or halogen;

R$^2$ and R$^4$ are independently hydrogen, substituted or unsubstituted alkyl, substituted or unsubstituted alkoxy, or halogen;

Ar comprises substituted or unsubstituted heteroaromatic groups, substituted or unsubstituted aryl groups, or combinations thereof;

A is a thiol group, a thiobenzoate group, a dithiobenzoate group, a thioacyl group, a dithioacyl group, an alkene group, a carbodithioate group, a 2-(cyanoethyl)thio group, or an alkyne group.

q can independently be 0 or 1 and when an independent q is 1, the associated L can be a linker group;

m can be an integer from 1 to 10,000;

n can be an integer from 0 to 10,000;

can be an integer from 0 to 10,000;

p can be an integer from 0 to 10,000; and x can be an integer from 0 to 11.

Some illustrative embodiments include polymers according to formula 16:

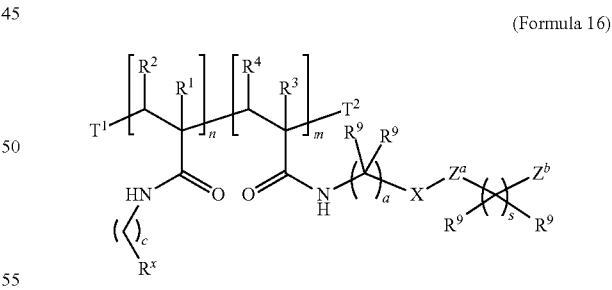

(Formula 16)

where T$^1$ and T$^2$ can independently be any group;

R$^X$ comprises at least a reactive group or non-reactive, non-zwitterionic group;

R$^1$ and R$^3$ are independently hydrogen, substituted or unsubstituted alkyl, or halogen;

R$^2$ and R$^4$ are independently hydrogen, substituted or unsubstituted alkyl, substituted or unsubstituted alkoxy, or halogen;

R$^9$ can independently be selected from —H or C$_1$-C$_4$ alkyl chain optionally substituted with a heteroatom (e.g., CH$_2$OH);

X can be $CH_2$ or $(CH_2CH_2O)_vCH_2CH_2$, where v can be an integer from 1 to 10, 1 to 6, 1 to 4 or even 1 or 2;
m can be an integer from 1 to 10,000;
n can be an integer from 0 to 10,000;
a can be an integer from 0 to 11;
s can be an integer from 2 to 8;
c can be an integer from 1 to 12; and
one and only one of $Z^a$ and $Z^b$ have the formula 12b

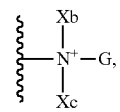

(Formula 12b)

$X^b$ and $X^c$ are independently selected from H, $CH_3$, or a $C_1$-$C_6$ alkyl chain optionally substituted with a heteroatom (e.g., $CH_2OH$); and G is a bond or a terminal group;
and the other of $Z^a$ and $Z^b$ comprise a sulfonate group, a carboxylate group, a phosphate group, a phosphinate group, —$OP(OH)_2O$, or a sulfate group.

Some even more specific embodiments include the polymers above, wherein $T^1$ and $T^2$ can independently comprise one or more reactive groups. Some even more specific embodiments include the polymers above, wherein $T^1$ and $T^2$ can independently comprise alkene groups, alkyne groups, nitrile groups, thiol groups, amine groups, carboxylic acid groups, ester groups, biotin groups, phthalimido groups, activated alkyne or alkene groups, Michael acceptor groups, maleimide groups, vinyl sulfone groups, silyl groups, dienophile groups, thioester groups, dithioester groups, thiocarbonylthio groups, dithiocarbamate groups, cyclopentadienyl groups, sulfonylthioformate groups, epoxy, groups, hydroxyl groups, succinimide groups, pentafluorophenyl groups, carbonylazide groups, azide groups, isocyanate groups and photoreactive groups. Some even more specific embodiments include the polymers above, wherein $T^1$ and $T^2$ can independently be derived from one or more reversible addition fragmentation chain transfer (RAFT) agents. Some even more specific embodiments include the polymers above, wherein $T^1$ and $T^2$ can independently comprise thiobenzoate groups, dithiobenzoate groups, trithiocarbonate, thiol groups and nitrile groups. Some even more specific embodiments include the polymers above, wherein $T^1$ and $T^2$ can independently be $C_1$ to $C_6$ alkyl groups, aryl groups, or hydrogen. Some even more specific embodiments include the polymers above, wherein $R^X$ can independently comprise alkene groups, alkyne groups, nitrile groups, thiol groups, amine groups, carboxylic acid groups, ester groups, biotin groups, phthalimido groups, activated alkyne or alkene groups, Michael acceptor groups, maleimide groups, vinyl sulfone groups, silyl groups, dienophile groups, dithioester groups, thioester groups, thiocarbonylthio groups, dithiocarbamate groups, cyclopentadienyl groups, sulfonylthioformate groups, epoxy, groups, hydroxyl groups, succinimide groups, pentafluorophenyl groups, carbonylazide groups, azide groups, isocyanate groups and photoreactive groups. Some even more specific embodiments include the polymers above, wherein $R^X$ can independently comprise thiobenzoate groups, dithiobenzoate groups, thiol groups alkene groups, alkyne groups and nitrile groups. Some even more specific embodiments include the polymers above, wherein $R^Z$ has the formula 12a

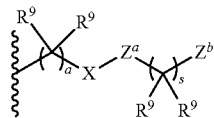

(Formula 12a)

where a is an integer from 0 to 11;
s can be an integer from 2 to 8;
X can be $CH_2$ or $(CH_2CH_2O)_vCH_2CH_2$, where v can be an integer from 1 to 10, 1 to 6, 1 to 4, or even 1 or 2;
$R^9$ can independently be selected from —H or $C_1$-$C_4$ alkyl chain optionally substituted with a heteroatom (e.g., $CH_2OH$);
one and only one of $Z^a$ and $Z^b$ are of a formula 12b

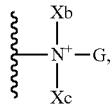

(Formula 12b)

$X^b$ and $X^c$ are independently selected from H, $CH_3$, or a $C_1$-$C_6$ alkyl chain optionally substituted with a heteroatom (e.g., $CH_2OH$); and G is a bond or a terminal group;
and the other of $Z^a$ and $Z^b$ comprise a sulfonate group, a carboxylate group, a phosphate group, a phosphinate group, —$OP(OH)_2O$, or a sulfate group. Some even more specific embodiments include the polymers above, wherein $R^Z$ comprises a quaternary ammonium ion, comprising at least one alkyl chain connected thereto, the alkyl chain terminating in a negatively charged group. Some even more specific embodiments include the polymers above, wherein the negatively charged group comprises a sulfonate group, a carboxylate group, a phosphate group, a phosphinate group, a sulfate group, or —$OP(OH)_2O$. Some even more specific embodiments include the polymers above, wherein $R^Z$ comprises a nitrogen (N) within a cyclic group. Some even more specific embodiments include the polymers above, wherein $R^Z$ has formula 12c

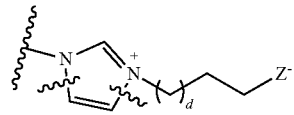

(Formula 12c)

d is an integer from 0 to 6;
$Z^-$ comprises at least one sulfonate group, carboxylate group, phosphate group, phosphinate group, sulfate group, or —$OP(OH)_2O$; and
the sinusoidal lines within the cyclic group indicate that additional carbons, additional heteroatoms, or combinations thereof can be included. Some even more specific embodiments include the polymers above, wherein q is 1. Some even more specific embodiments include the polymers above, wherein L comprises an ester group, an amide group, an aromatic group, or any combination thereof. Some even more specific embodiments include the polymers above, wherein L can comprise heterocyclic aromatics, two or more aromatic groups attached by an alkyl chain, two or more fused aromatic groups, or any combination thereof. Some even more specific embodiments include the polymers above, wherein L comprises a phenyl group.

Some illustrative embodiments include polymers according to any of the formulae 15a, 15b or 15c:

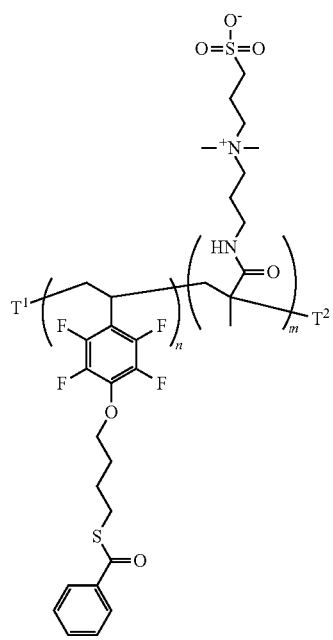
(Formula 15a)

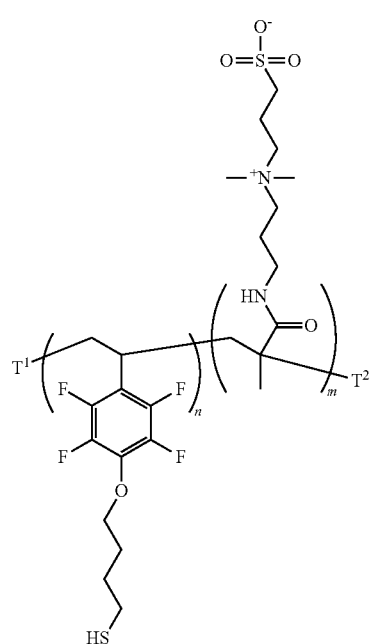
(Formula 15b)

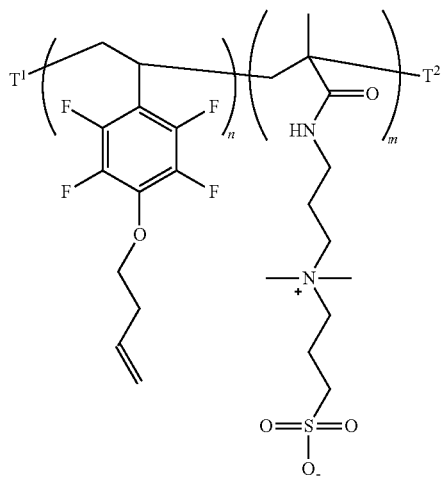
(Formula 15c)

where $T^1$ and $T^2$ can independently be any group;
m can be an integer from 1 to 10,000; and
n can be an integer from 0 to 10,000.

Some illustrative embodiments include polymers according to any of the formulae 15d, 15e or 15f:

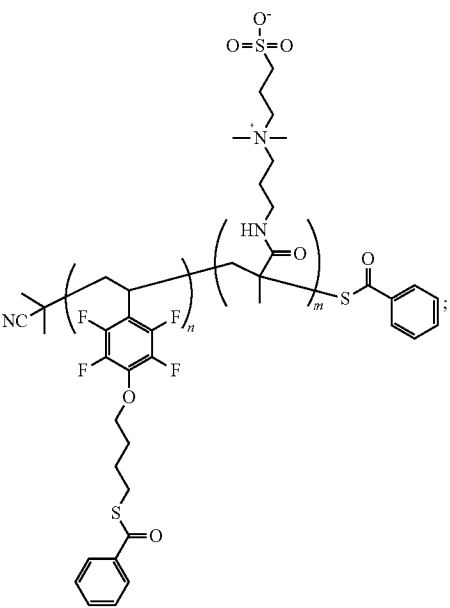
(Formula 15d)

-continued
(Formula 15e)
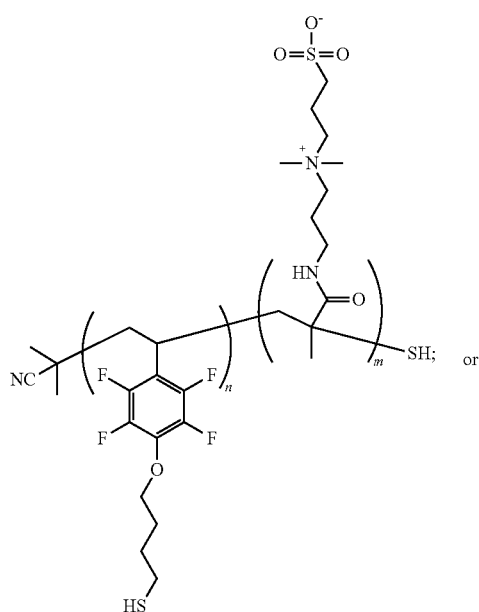
(Formula 15f)
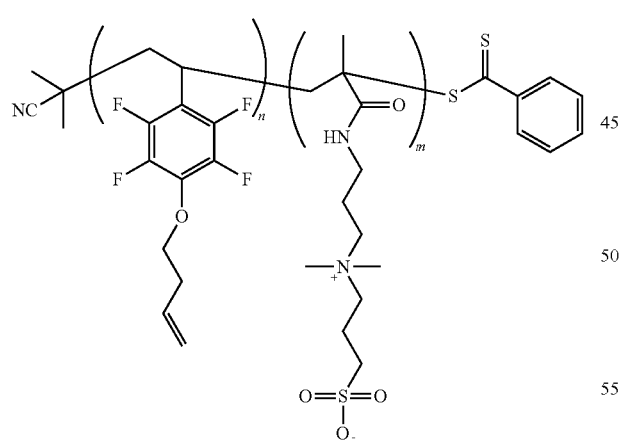
where m can be an integer from 1 to 10,000; and n can be an integer from 0 to 10,000.
Some illustrative embodiments include polymers according to any of formulae 16a, 16b, 16c, 16d, or 16e
(Formula 16a)
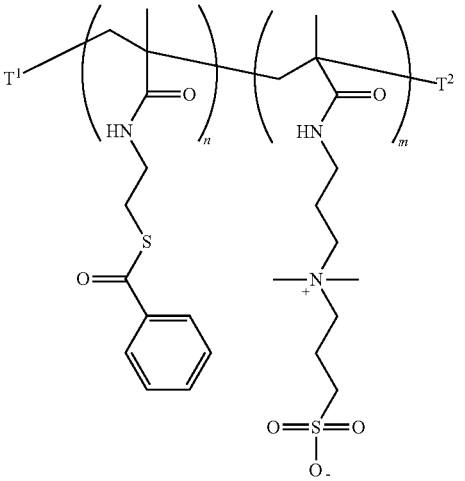
(Formula 16b)
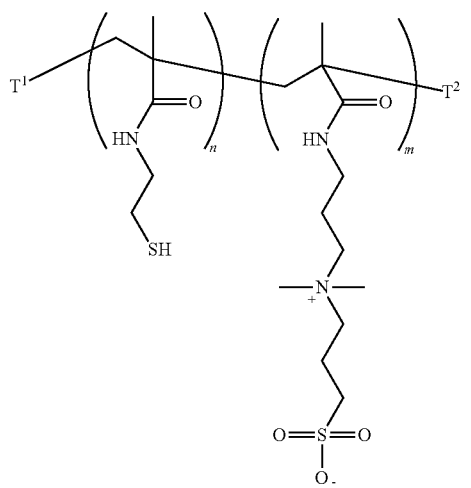
(Formula 16c)
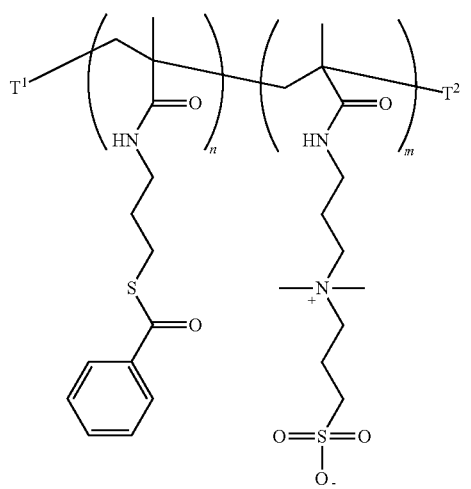

-continued
(Formula 16d)
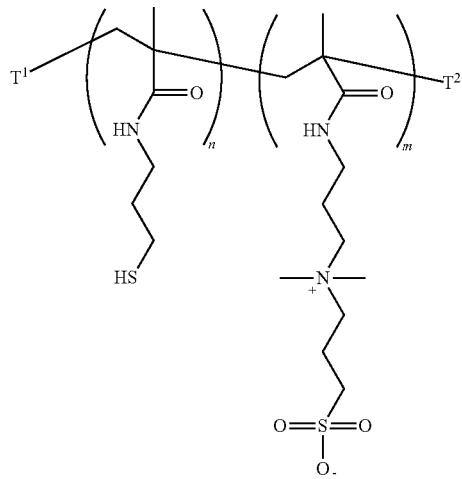
(Formula 16e)
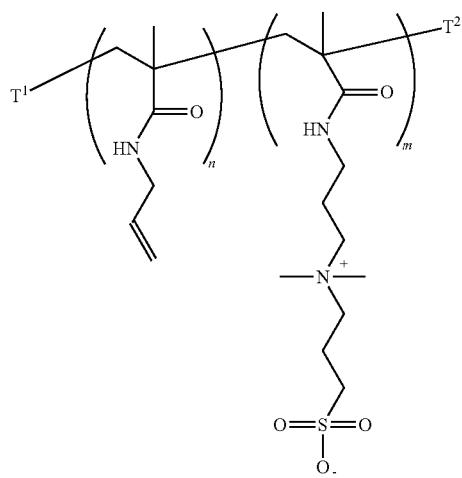
where $T^1$ and $T^2$ can independently be any group; m can be an integer from 1 to 10,000; and n can be an integer from 0 to 10,000.
Some illustrative embodiments include polymers according to any of formulae 16f, 16g, 16h, 16i, or 16j:
(Formula 16f)
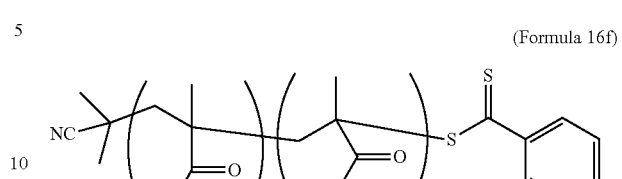
;
(Formula 16g)
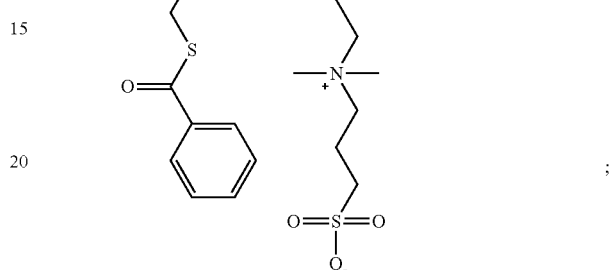
(Formula 16h)
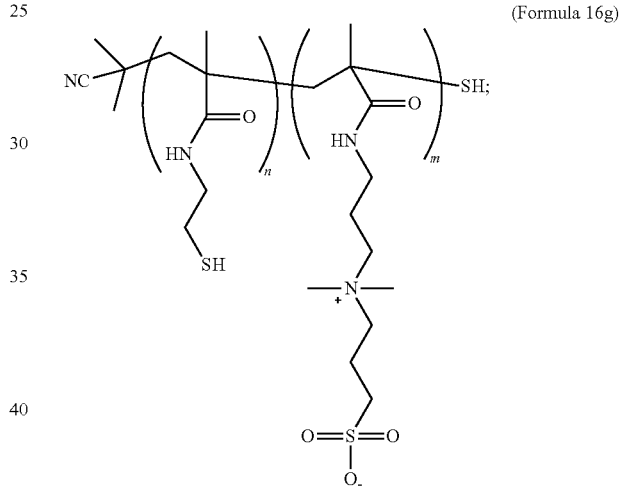
;

(Formula 16i)

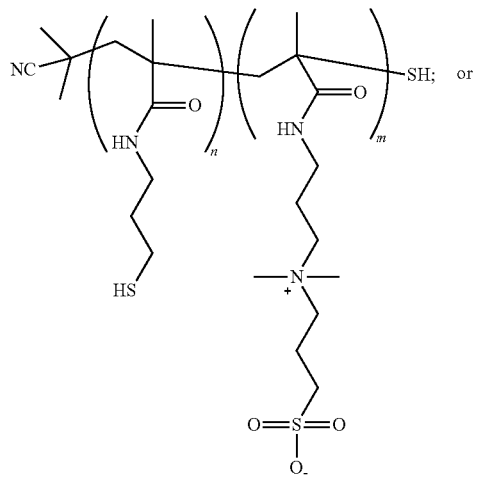

(Formula 16m)

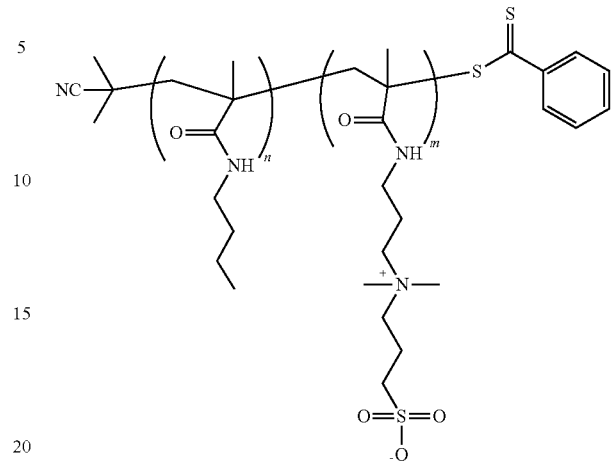

(Formula 16n)

(Formula 16j)

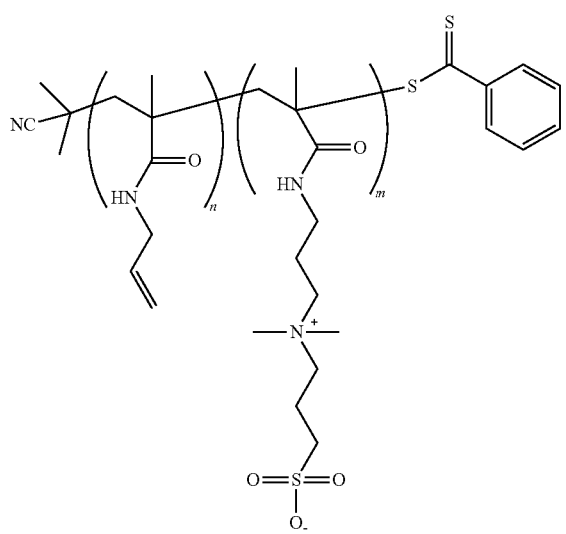

(Formula 16o)

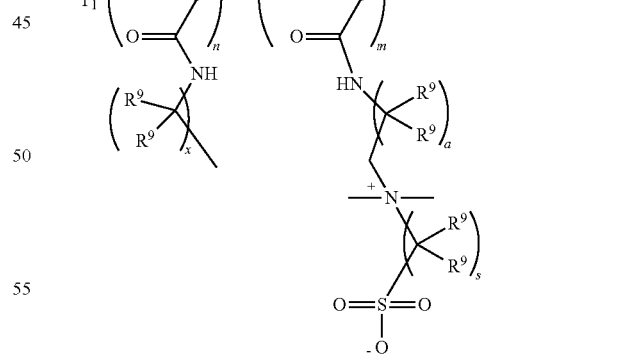

Where m can be an integer from 1 to 10,000; and n can be an integer from 0 to 10,000.

Additional disclosed polymers include those that include at least one zwitterionic monomer and a non-zwitterionic monomer that does not include a reactive group. Illustrative examples of such copolymers include those of formula 16m, 16n and 16o.

Some even more specific embodiments include the polymers above, wherein the ratio of n to m is not more than about 3:1. Some even more specific embodiments include the polymers above, wherein the polymer is a block copolymer, a random copolymer, an alternating copolymer, or any combination thereof.

Some illustrative embodiments include homopolymers according to formula 14:

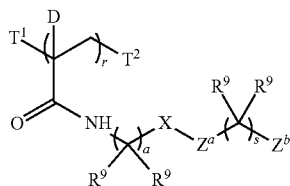
(Formula 14)

where $T^1$ and $T^2$ can independently be any group;
D is H, or alkyl (e.g., methyl);
X can be $CH_2$ or $(CH_2CH_2O)_vCH_2CH_2$, where v can be an integer from 1 to 10, 1 to 6, 1 to 4, or even 1 or 2;
$R^9$ can independently be selected from —H or $C_1$-$C_4$ alkyl chain optionally substituted with a heteroatom (e.g., $CH_2OH$);
r can be an integer from 2 to 10,000;
a can be an integer from 0 to 11;
s can be an integer from 1 to 6;
one and only one of $Z^a$ and $Z^b$ have the formula 12b

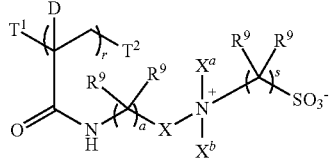
(Formula 12b)

$X^b$ and $X^c$ are independently selected from H, $CH_3$, or a $C_1$-$C_6$ alkyl chain optionally substituted with a heteroatom (e.g., $CH_2OH$); and G is a bond or a terminal group;
and the other of $Z^a$ and $Z^b$ comprise a sulfonate group, a carboxylate group, a phosphate group, a phosphinate group, —$OP(OH)_2O$, or a sulfate group.

Some illustrative embodiments include homopolymers according to formula 14a:

(Formula 14a)

where $T^1$ and $T^2$ can independently be any group;
X can be $CH_2$ or $(CH_2CH_2O)_vCH_2CH_2$, where v can be an integer from 1 to 10, 1 to 6, 1 to 4, or even 1 or 2;
$R^9$ can independently be selected from —H or $C_1$-$C_4$ alkyl chain optionally substituted with a heteroatom (e.g., $CH_2OH$);
$X^b$ and $X^c$ are independently selected from H, $CH_3$, or a $C_1$-$C_6$ alkyl chain optionally substituted with a heteroatom (e.g., $CH_2OH$);
r can be an integer from 2 to 10,000;
each a can independently be an integer from 0 to 11; and
each s can independently be can integer from 2 to 8.

Some even more specific embodiments include the homopolymers above, wherein $T^1$ and $T^2$ can independently comprise one or more reactive groups. Some even more specific embodiments include the homopolymers above, wherein $T^1$ and $T^2$ can independently comprise alkene groups, alkyne groups, nitrile groups, thiol groups, amine groups, carboxylic acid groups, ester groups, biotin groups, phthalimido groups, activated alkyne or alkene groups, Michael acceptor groups, maleimide groups, vinyl sulfone groups, silyl groups, dienophile groups, dithioester groups, thioester groups, thiocarbonylthio groups, dithiocarbamate groups, cyclopentadienyl groups, sulfonylthioformate groups, epoxy, groups, hydroxyl groups, succinimide groups, pentafluorophenyl groups, carbonylazide groups, azide groups, isocyanate groups and photoreactive groups. Some even more specific embodiments include the homopolymers above, wherein $T^1$ and $T^2$ can independently be derived from one or more reversible addition fragmentation chain transfer (RAFT) agents. Some even more specific embodiments include the homopolymers above, wherein $T^1$ and $T^2$ can independently comprise thiobenzoate groups, dithiobenzoate groups, trithiocarbonate groups, thiol groups and nitrile groups. Some even more specific embodiments include the homopolymers above, wherein $T^1$ and $T^2$ can independently be $C_1$ to $C_6$ alkyl groups, aryl groups, or hydrogen.

Some illustrative embodiments include homopolymers having one of the following formulae:

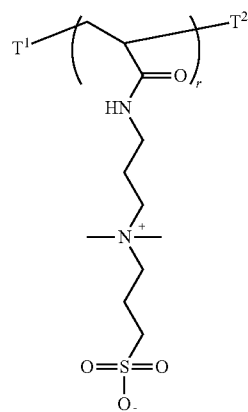
(Formula 14b)

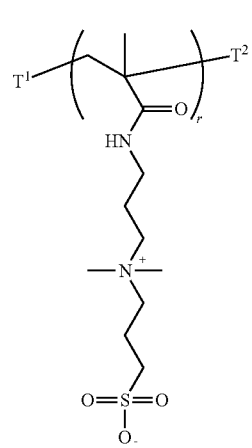
(Formula 14c)

where $T^1$ and $T^2$ can independently be any group; and
r can be an integer from 2 to 10,000.

Some illustrative embodiments include homopolymers having one of the following formulae:
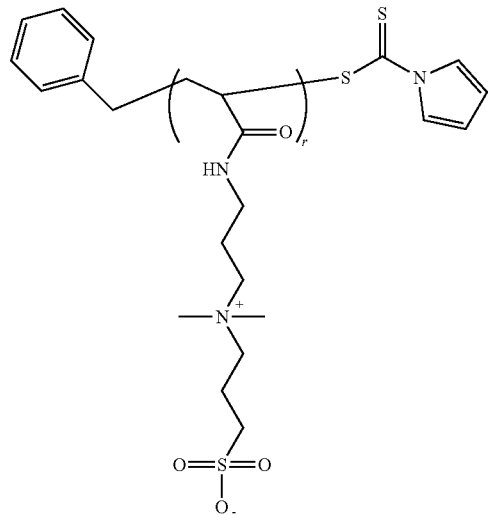
(Formula 14d)
;
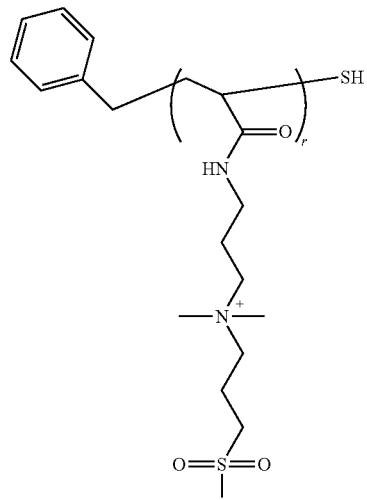
(Formula 14e)
;
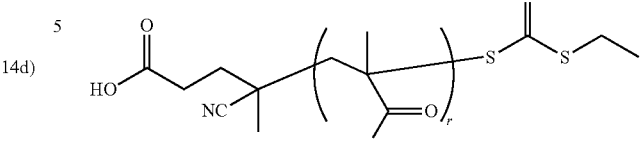
(Formula 14f)
;
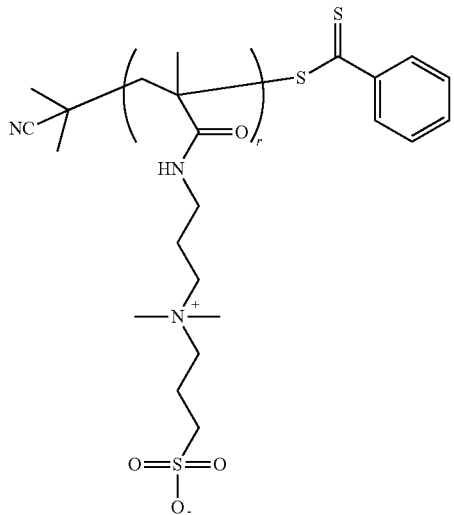
(Formula 14g)
;
(Formula 14h)
; or -continued (Formula 14i)

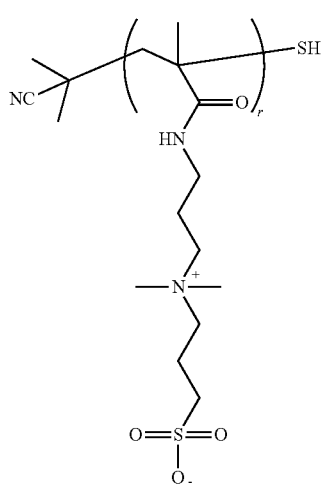

where r can be an integer from 2 to 10,000.

Some illustrative embodiments include methods of forming a polymer comprising:

combining at least one monomer of formula 1a or 1b (Formula 1a)

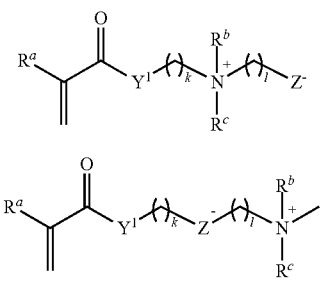

(Formula 1b)

where $R^a$, $R^b$ and $R^c$ are independently H, or alkyl;
$Y^1$ is O or NH;
k is an integer from 2 to 11;
l is an integer from 1 to 6; and
$Z^-$ comprises a sulfonate group, a carboxylate group, a phosphinate group, a phosphate group, a sulfate group, or $-OP(OH)_2O$;
at least one radical source; and
a reversible addition-fragmentation chain-transfer (RAFT) agent.

Some even more specific embodiments include methods, wherein $R^a$ is a $C_1$ to $C_6$ alkyl. Some even more specific embodiments include methods, wherein $R^a$ is $-CH_3$ or $-CH_2CH_3$. Some even more specific embodiments include methods, wherein $Y^1$ is NH. Some even more specific embodiments include methods, wherein $R^b$ and $R^c$ are independently selected from a $C_1$ to $C_6$ alkyl. Some even more specific embodiments include methods, wherein $R^b$ and $R^c$ are independently selected from $-CH_3$ or $-CH_2CH_3$. Some even more specific embodiments include methods, wherein l is an integer from 2 to 4. Some even more specific embodiments include methods, wherein k is an integer from 2 to 6. Some even more specific embodiments include methods, wherein $Z^-$ comprises a sulfate group. Some even more specific embodiments include methods, wherein the monomer of formula 1a or 1b is selected from:

(Formula 2)

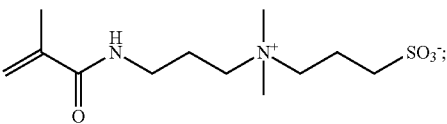

3-(methacryloylamino)propyl]dimethyl(3-sulfopropyl)ammonium hydroxide inner salt (SBMAam)

(Formula 3)

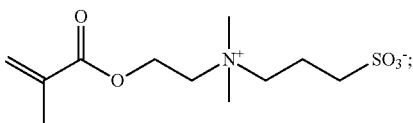

N-(3-Sulfopropyl)N-methacryloyloxyethyl-N,N-dimethyl ammonium betaine (SPE)

(Formula 4)

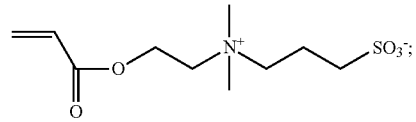

Sulphopropyldimethylammonioethyl acrylate (SPDA)

(Formula 5)

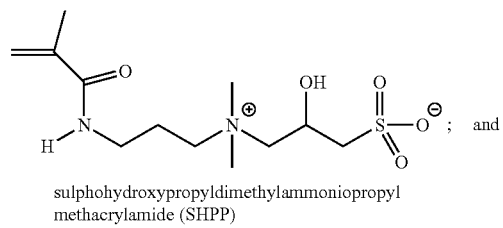

sulphohydroxypropyldimethylammoniopropyl methacrylamide (SHPP)

(Formula 6)

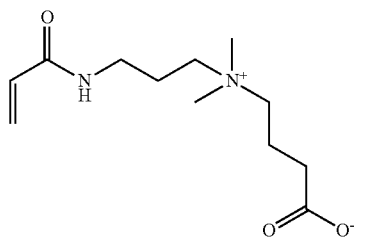

4-((3-acrylamidopropyl)dimethylammonio)butanoate

Some even more specific embodiments include methods, wherein the at least one radical source is selected from diazo initiators, peroxide initiators, or combinations thereof. Some even more specific embodiments include methods, wherein the at least one radical source is selected from azobisisobutyronitrile (AIBN); 4,4'-azobis(4-cyanovaleric acid) (ACVA); and combinations thereof. Some even more specific embodiments include methods, wherein the RAFT agent is selected from dithiobenzoates, dithiocarbamates, trithiocarbonates, or combinations thereof. Some even more specific embodiments include methods, wherein a second monomer is combined with the at least one monomer, the radical source and the RAFT agent. Some even more specific embodiments include methods, wherein the second monomer comprises a second monomer according to formulae 1a or 1b. Some even more specific embodiments include methods, wherein the second monomer comprises a non-zwitterionic monomer. Some even more specific embodiments include methods, wherein the non-zwitterionic monomer comprises a vinyl group, an acryl ester group, a methacryl ester group, an acrylamide group or a methacrylamide group. Some even more specific embodiments include methods, wherein the non-zwitterionic monomer comprises a reactive functional group or a group that can become a reactive functional group. Some even more specific embodiments include methods, wherein the non-zwitterionic monomer is of formula 7:

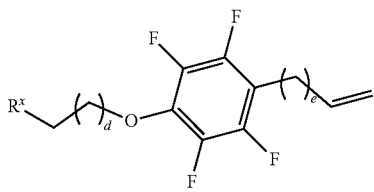

(Formula 7)

where $R^x$ comprises at least one reactive functional group or protected reactive functional group or non-reactive, non-zwitterionic group; d, and e can independently be integers from 0 to 5; and D can be a hydrogen (H) or an alkyl.

Some even more specific embodiments include methods, wherein the non-zwitterionic monomer is of formula 8:

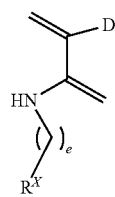

(Formula 8)

where $R^x$ comprises at least one reactive functional group or protected reactive functional group or non-reactive, non-zwitterionic group; e is an integer from 1 to 11; and D can be a hydrogen (H) or an alkyl. Some even more specific embodiments include methods, wherein the non-zwitterionic monomer is of formula 8g:

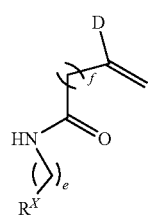

(Formula 8g)

where $R^x$ comprises at least one reactive functional group or protected reactive functional group or non-reactive, non-zwitterionic group; e is an integer from 1 to 11; f is an integer from 0 to 10; and D can be a hydrogen (H) or an alkyl.

Some even more specific embodiments include methods, wherein $R^x$ comprises alkene groups, alkyne groups, nitrile groups, thiol groups, amine groups, carboxylic acid groups, ester groups, biotin groups, phthalimido groups, activated alkyne or alkene groups, Michael acceptors, maleimide groups, vinyl sulfone groups, silyl groups, dienophile groups, thioester groups, dithioester groups, thiocarbonylthio groups, dithiocarbamate groups, diene groups, cyclopentadienyl groups, sulfonylthioformate groups, epoxy groups, hydroxyl groups, succinimide groups, pentafluorophenyl groups, carbonylazide groups, azide groups, isocyanate groups, photoreactive groups, or some combination thereof. Some even more specific embodiments include methods, wherein $R^x$ comprises groups that can be deprotected to form alkene groups, alkyne groups, nitrile groups, thiol groups, amine groups, carboxylic acid groups, ester groups, biotin groups, phthalimido groups, activated alkyne or alkene groups, Michael acceptors, maleimide groups, vinyl sulfone groups, silyl groups, dienophile groups, thioester groups, dithioester groups, thiocarbonylthio groups, dithiocarbamate groups, diene groups, cyclopentadienyl groups, sulfonylthioformate groups, epoxy groups, hydroxyl groups, succinimide groups, pentafluorophenyl groups, carbonylazide groups, azide groups, isocyanate groups, photoreactive groups, or some combination thereof. Some even more specific embodiments include methods, wherein the non-zwitterionic monomer is of formulae 7a or 7b, wherein a is an integer from 0 to 11:

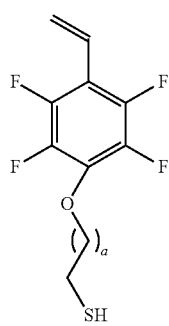

(Formula 7a)

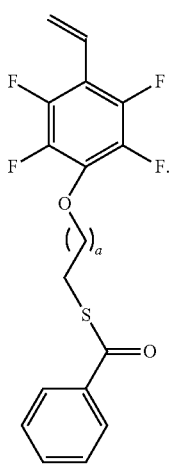

(Formula 7b)

Some even more specific embodiments include methods, wherein the non-zwitterionic monomer is selected from compounds of formulae 7c, 7d or 7e:

(Formula 7c)

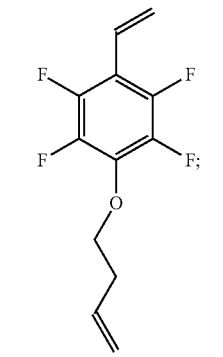

(Formula 7d)

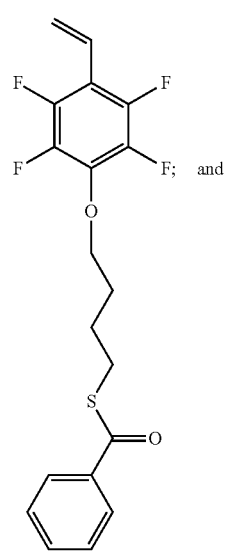
and (Formula 7e)

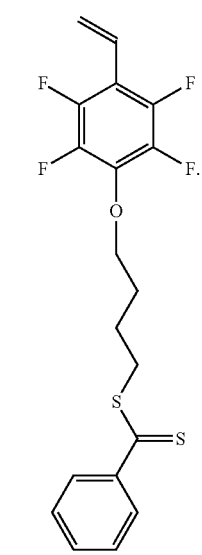

Some even more specific embodiments include methods, wherein the non-zwitterionic monomer is of formulae 8a, 8b or 8c, wherein a is an integer from 0 to 11:

(Formula 8a)

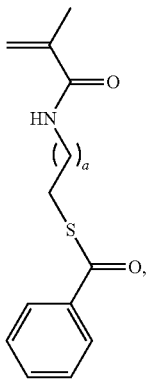

(Formula 8b)

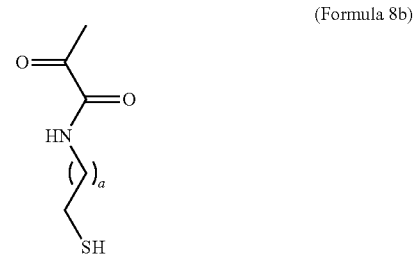

(Formula 8c)

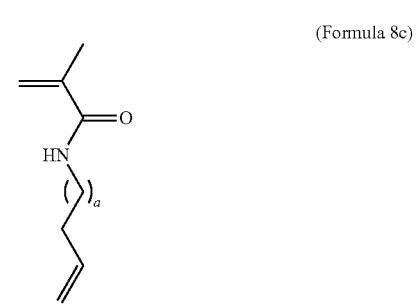

Some even more specific embodiments include methods, wherein the non-zwitterionic monomer is selected from compounds of formulae 8d, 8e or 8f:

(Formula 8d)

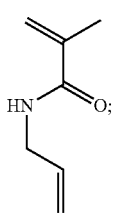

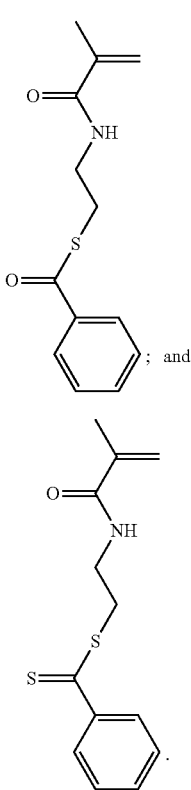

(Formula 8e)

(Formula 8f)

Some illustrative embodiments include articles comprising a portion comprising a polymer according to any of the above illustrative and more specifically illustrative polymer embodiments above. Some illustrative embodiments include articles comprising a surface, the surface having a polymer according to any of the above illustrative and more specifically illustrative polymer embodiments above.

Some illustrative embodiments include articles comprising: a surface comprising a thermoset elastomer; and a residue of a surface reagent that results after a reaction between the thermoset elastomer and surface reagent. The residue of a surface reagent comprises at least one reactive group. In a preferred embodiment the residue of a surface reagent comprises at least one unsaturated bond.

Some illustrative embodiments include methods of functionalizing a thermoset elastomer surface, the method comprising: combining a thermoset elastomer surface with a surface reagent, the surface reagent comprising at least one unsaturated bond that attaches to the thermoset elastomer surface and at least one reactive group that does not attach to the thermoset elastomer surface.

Some even more specific embodiments include some such articles or methods, wherein the thermoset elastomer comprises compounded rubber. Some even more specific embodiments include some such articles or methods, wherein the thermoset elastomer comprises crosslinked and compounded rubber. Some even more specific embodiments include some such articles or methods, wherein the thermoset elastomer comprises natural rubber (NR), synthetic rubber, or combinations thereof. Some even more specific embodiments include some such articles or methods, wherein the thermoset elastomer comprises polyisoprene (IR), styrene-butadiene rubbers (SBR), carboxylated styrene-butadiene (XSBR), polybutadiene (BR), polychloroprene (CR), polysulfide (T), epichlorohydrin (CO), epichlorohydrin-ethyleneoxide, polyacrylate (ACM), chlorinated polyethylene, chlorosulfonated polyethylene (CSM), polyester-polyurethanes (AU), polyether-polyurethanes (EU), isobutylene (methylpropene), ethylene-propylene (EP), ethylene propylene diene monomer (EPDM), butyl (IIR), bromobutyl, chlorobutyl, nitrile (NBR), silicone (MQ), hydrogenated nitrile (HNBR), carboxylated NBR (XNBR), fluorocarbon (FKM), fluorinated silicone (FVMQ), and blends and/or copolymers of any of the rubbers. Some even more specific embodiments include some such articles or methods, wherein the surface reagent comprises at least two double bonds. Some even more specific embodiments include some such articles or methods, wherein the surface reagent comprises at least two triple bonds. Some even more specific embodiments include some such articles or methods, wherein the surface reagent comprises at least two double bonds, three double bonds, at least two triple bonds, three triple bonds, at least one double bond and at least one triple bond, or any combination thereof. Some even more specific embodiments include some such articles or methods, wherein the surface reagent is selected from 1,2,4 trivinyl cyclohexane; 2,4,6 triallyl-1,3,5 triazine; 1,3,5 triazine 2,4,6 (1H,3H, 5H) trione; 1,7 octadiene; N,N'-hexamethylene bis(methacrylamide); 1,4-butanediol diacrylate; 1,4-butanediol dimethacrylate; di(trimethylolpropane) tetraacrylate; pentaerythritol tetraacrylate; pentaerythritol tetramethacrylate; pentaerythritol triacrylate; pentaerythritol allyl ether; pentaerythritol trimethacrylate; trimethylolpropane triacrylate; trimethylolpropane trimethacrylate; dipentaerythritol penta-/hexa-acrylate; pentaerythritol diacrylate monostearate; 1,3-butanediol diacrylate; 1,3-butanediol dimethacrylate; neopentyl glycol diacrylate; neopentyl glycol dimethacrylate; ethylene glycol diacrylate; ethylene glycol dimethacrylate; glycerol diacrylate; glycerol dimethacrylate; 3-(acryloyl oxy)-2-hydroxypropylmethacrylate; N-2-acryloylamino)ethyl acrylamide; N-2-acryloylamino) ethyl methacrylamide; divinyl styrene; 1,4-diacryloylpiperazine; N,N'-(1,2-dihydroxyethylene) bis(acrylamide); and 1,4-di-(2-furoyl)piperazine, polybutadiene (1,2 vinyl content from 28 to 90%), butadiene styrene copolymer, hydroxyl-terminated polybutadiene, maleinized polybutadiene, epoxidized hydroxyl-terminated polybutadiene, pentaerythritol allyl ether; 4,8,12,-trioxapentadeca-1,14-diene, 6,6,10,10,-tetrakis[(allyloxy)methyl]; and 4,8,12,16-tetraoxanonadeca-1,18-diene, 6,6,10,10,14,14-hexakis[(2-propen-1-yloxy)methyl]; and combinations thereof. Some even more specific embodiments include some such articles or methods, wherein the surface reagent is selected from:

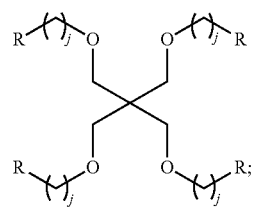

(Formula 17a)

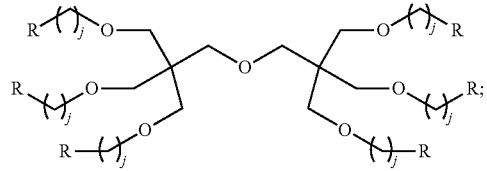

(Formula 17b)

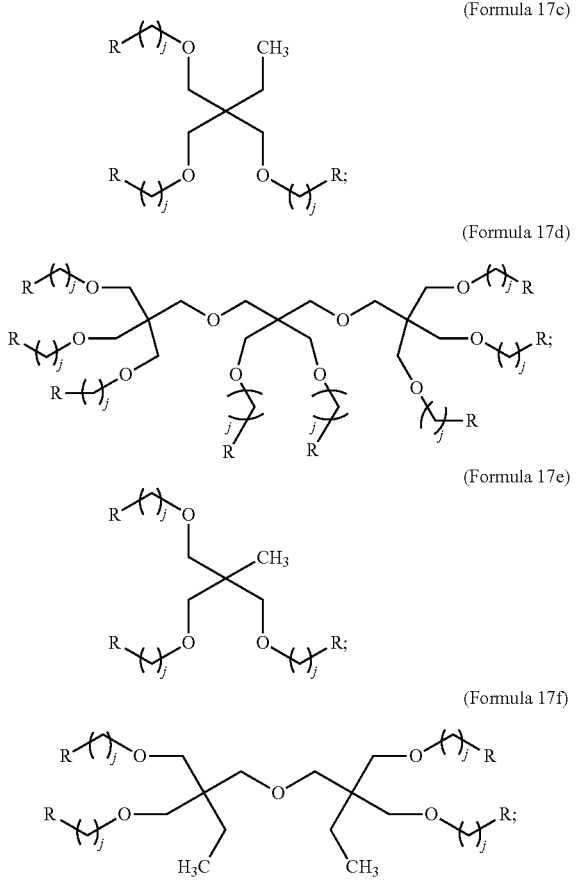

(Formula 17c)
(Formula 17d)
(Formula 17e)
(Formula 17f)

and mixtures thereof,
wherein each R is —CH=CH$_2$ or —C≡CH group; and j is an integer from 1 to 18. Some even more specific embodiments include some such articles or methods, wherein the surface reagent is selected from:

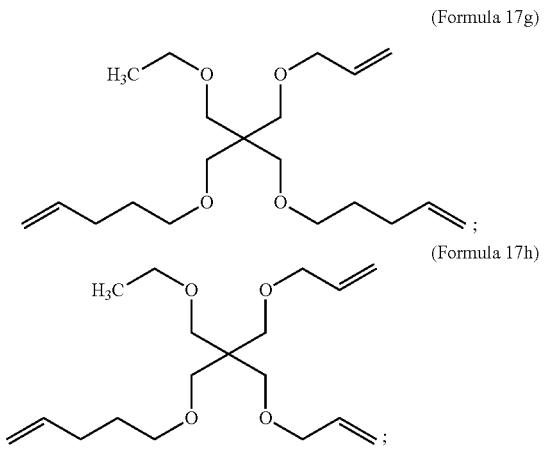

(Formula 17g)
(Formula 17h)

and mixtures thereof.

Some even more specific embodiments include some such articles or methods, further comprising one or more modifiers attached to the residue of the surface reagent. Some even more specific embodiments include some such articles or methods, wherein the modifier comprises a polymeric modifier. Some even more specific embodiments include some such articles or methods, wherein the polymeric modifier comprises a polyzwitterionic or a polysiloxane polymer. Some even more specific embodiments include some such articles or methods, wherein the polyzwitterionic polymer is selected from: a polymer according to any of the illustrative or more specific illustrative embodiments illustrated above. Some even more specific embodiments include some such articles or methods, further comprising a non-polymeric modifier attached to the residue of the surface reagent. Some even more specific embodiments include some such articles or methods, wherein the non-polymeric molecule comprises a perfluorinated compound. Some even more specific embodiments include some such articles or methods, wherein the resulting article is hydrophilic. Some even more specific embodiments include some such articles or methods, wherein the resulting article has a low coefficient of friction. Some even more specific embodiments include some such articles or methods, wherein the resulting article is resistant to biofouling. Some even more specific embodiments include some such articles or methods further comprising reacting the residue of the surface reagent that is attached to a substrate. Some even more specific embodiments include some such articles or methods, wherein the residues for the surface reagent is subjected to electrophilic addition, epoxidation, ozonolysis, oxidative cleavage, dihydroxylation, hydroboration-oxidation, carbene addition, click reactions, olefin metathesis, dimerization and polymerization, or any combination thereof. Some even more specific embodiments include some such articles or methods, wherein the surface reagent comprises at least one double bond or triple bond and at least one alcohol group. Some even more specific embodiments include some such articles or methods, wherein the surface reagent is attached to the surface via the at least one double bond or at least one triple bond. Some even more specific embodiments include some such articles or methods, wherein the least one alcohol group is reacted after the surface reagent is attached to the surface. Some even more specific embodiments include some such articles or methods, wherein the alcohol is converted to an alkene group, an alkyne group, a thiol group, a nitrile group, an azide group, an amine phthalimido group, an activated alkene or alkyne group, a Michael acceptor group, a maleimide group, a vinyl sulfone group, a silyl group, a dienophile group, a dithioester group, a thiocarbonylthio group, a dithiocarbamate group, a diene group, a cyclopentadienyl group, a sulfonylthioformate group, an epoxy group, a succinimide group, an aromatic group, a pentafluorophenyl group, a carbonylazide group, an azide group, an isocyanate group or a photoreactive group.

Some illustrative embodiments include articles comprising: a bulk; a surface; and a modifier attached to the surface, the modifier selected from polymers according to any of the illustrated polymers or even more specific illustrative embodiments above; and mixtures thereof.

Some illustrative embodiments include methods of making a surface hydrophilic, the method comprising: combining a polymer selected from polymers according to any of the illustrated polymers or even more specific illustrative embodiments above and mixtures thereof; and a surface, wherein the polymer attaches to the surface to make the surface hydrophilic.

Some illustrative embodiments include methods of making a surface more resistant to biofouling, the method comprising: combining a polymer selected from polymers according to any of the illustrated polymers or even more specific illustrative embodiments above; and mixtures thereof; and a surface, wherein the polymer attaches to the surface to make the surface more resistant to biofouling than the surface is without the polymer attached thereto.

Some even more specific embodiments include some such methods further comprising combining the surface with a surface reagent, the surface reagent comprising at least one unsaturated bond to attach to the surface before combining the polymeric modifier with the surface. Some even more specific embodiments include some such methods, wherein the surface reagent comprises at least two double bonds. Some even more specific embodiments include some such methods, wherein the surface reagent comprises at least two triple bonds. Some even more specific embodiments include some such methods, wherein the surface reagent comprises at least two double bonds, three double bonds, at least two triple bonds, three triple bonds, at least one double bond and at least one triple bond, or any combination thereof. Some even more specific embodiments include some such methods, wherein the surface reagent is selected from 1,2,4 trivinyl cyclohexane; 2,4,6 triallyl-1,3,5 triazine; 1,3,5 triazine 2,4,6 (1H,3H, 5H) trione; 1,7 octadiene; N,N'-hexamethylene bis(methacrylamide); 1,4-butanediol diacrylate; 1,4-butanediol dimethacrylate; di(trimethylolpropane) tetraacrylate; pentaerythritol tetraacrylate; pentaerythritol tetramethacrylate; pentaerythritol triacrylate; pentaerythritol allyl ether; pentaerythritol trimethacrylate; trimethylolpropane triacrylate; trimethylolpropane trimethacrylate; dipentaerythritol penta-/hexa-acrylate; pentaerythritol diacrylate monostearate; 1,3-butanediol diacrylate; 1,3-butanediol dimethacrylate; neopentyl glycol diacrylate; neopentyl glycol dimethacrylate; ethylene glycol diacrylate; ethylene glycol dimethacrylate; glycerol diacrylate; glycerol dimethacrylate; 3-(acryloyl oxy)-2-hydroxypropylmethacrylate; N-2-acryloylamino)ethyl acrylamide; N-2-acryloylamino) ethyl methacrylamide; divinyl styrene; 1,4-diacryloylpiperazine; N,N'-(1,2-dihydroxyethylene) bis(acrylamide); and 1,4-di-(2-furoyl)piperazine, polybutadiene (1,2 vinyl content from 28 to 90%), butadiene styrene copolymer, hydroxyl-terminated polybutadiene, maleinized polybutadiene, epoxidized hydroxyl-terminated polybutadiene, pentaerythritol allyl ether; 4,8,12,-trioxapentadeca-1,14-diene, 6,6,10,10,-tetrakis[(allyloxy)methyl]; and 4,8,12,16-tetraoxanonadeca-1,18-diene, 6,6,10,10,14,14-hexakis[(2-propen-1-yloxy)methyl]; and combinations thereof. Some even more specific embodiments include some such methods, wherein the surface reagent is selected from:

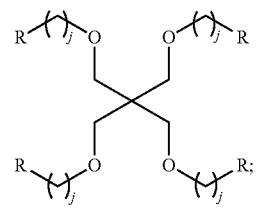

(Formula 17a)

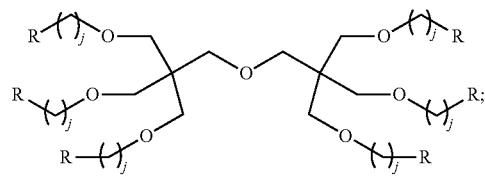

(Formula 17b)

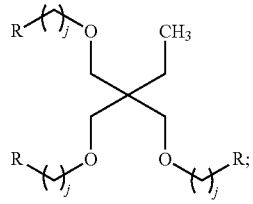

(Formula 17c)

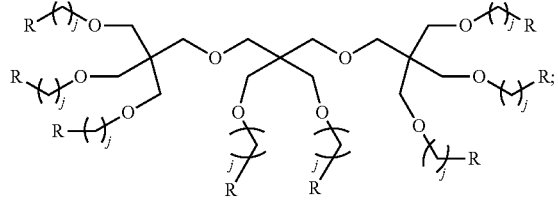

(Formula 17d)

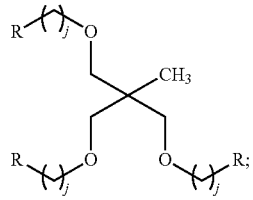

(Formula 17e)

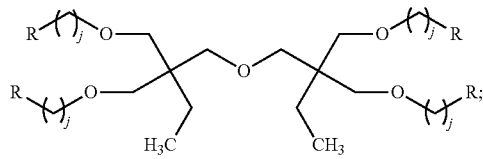

(Formula 17f)

and mixtures thereof,
wherein each R is —CH=CH$_2$ or —C≡CH group; and
each j is independently an integer from 1 to 18. Some even more specific embodiments include some such methods, wherein the surface reagent is selected from:

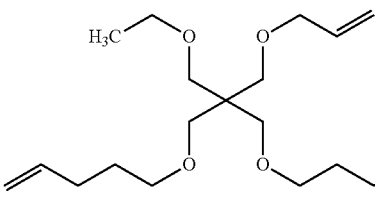

(Formula 17g)

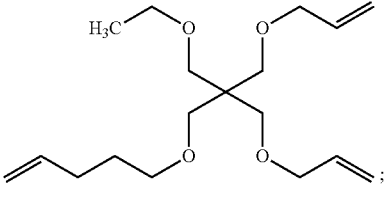

(Formula 17h)

and mixtures thereof.

Some even more specific embodiments include some such methods, wherein the surface reagent comprises at least one double bond or triple bond and at least one alcohol group. Some even more specific embodiments include some such methods, wherein the surface reagent is attached to the surface via the at least one double bond or at least one triple bond. Some even more specific embodiments include some such methods, wherein the least one alcohol group is reacted after the surface reagent is attached to the surface. Some even more specific embodiments include some such methods, wherein the alcohol is converted to an alkene group, an alkyne group, a thiol group, a nitrile group, an azide group, an amine group, a carboxylic acid group, a thioester group, an ester group, an amide group, a Biotin group, a phthalimido group, an activated alkene or alkyne group, a Michael acceptor group, a maleimide group, a vinyl sulfone group, a silyl group, a dienophile group, a dithioester group, a thiocarbonylthio group, a dithiocarbamate group, a diene group, a cyclopentadienyl group, a sulfonylthioformate group, an epoxy group, a succinimide group, an aromatic group, a pentafluorophenyl group, a carbonylazide group, an azide group, an isocyanate group or a photoreactive group. Some even more specific embodiments include some such methods, wherein the surface comprises organic surfaces, inorganic surfaces, or combinations thereof. Some even more specific embodiments include some such methods, wherein the surface comprises glass, ceramics, metals, or combinations thereof. Some even more specific embodiments include some such methods, wherein the surface comprises natural materials, synthetic materials, or combinations thereof. Some even more specific embodiments include some such methods, wherein the surface comprises cellulose. Some even more specific embodiments include some such methods, wherein the surface comprises one or more polymers.

Some even more specific embodiments include some such methods, wherein the surface comprises thermoset elastomer. Some even more specific embodiments include some such methods, wherein the thermoset elastomer comprises compounded rubber. Some even more specific embodiments include some such methods, wherein the thermoset elastomer comprises crosslinked and compounded rubber. Some even more specific embodiments include some such methods, wherein the thermoset elastomer comprises natural rubber (NR), synthetic rubber, or combinations thereof. Some even more specific embodiments include some such methods, wherein the thermoset elastomer comprises polyisoprene (IR), styrene-butadiene rubbers (SBR), carboxylated styrene-butadiene (XSBR), polybutadiene (BR), polychloroprene (CR), polysulfide (T), epichlorohydrin (CO), epichlorohydrin-ethyleneoxide, polyacrylate (ACM), chlorinated polyethylene, chlorosulfonated polyethylene (CSM), polyester-polyurethanes (AU), polyether-polyurethanes (EU), isobutylene (methylpropene), ethylene-propylene (EP), ethylene propylene diene monomer (EPDM), butyl (IIR), bromobutyl, chlorobutyl, nitrile (NBR), silicone (MQ), hydrogenated nitrile (HNBR), carboxylated NBR (XNBR), fluorocarbon (FKM), fluorinated silicone (FVMQ), and blends and/or copolymers of any of the rubbers.

Some illustrative embodiments include articles comprising: a surface comprising a thermoset elastomer; and a surface reagent residue attached to the thermoset elastomer surface, wherein the surface reagent comprises at least two unsaturated bonds.

Some illustrative embodiments include methods of functionalizing a thermoset elastomer surface, the methods comprising: combining a thermoset elastomer surface with a surface reagent, the surface reagent comprising at least two unsaturated bonds and at least one of the unsaturated bonds attaches the surface reagent to the thermoset elastomer surface.

Some even more specific embodiments include some such method or articles, wherein the surface reagent comprises at least two double bonds. Some even more specific embodiments include some such method or articles, wherein the surface reagent comprises at least two triple bonds. Some even more specific embodiments include some such method or articles, wherein the surface reagent comprises at least two double bonds, three double bonds, at least two triple bonds, three triple bonds, at least one double bond and at least one triple bond, or any combination thereof. Some even more specific embodiments include some such method or articles, wherein the surface reagent is selected from 1,2,4 trivinyl cyclohexane; 2,4,6 triallyl-1,3,5 triazine; 1,3,5 triazine 2,4,6 (1H,3H, 5H) trione; 1,7 octadiene; N,N'-hexamethylene bis(methacrylamide); 1,4-butanediol diacrylate; 1,4-butanediol dimethacrylate; di(trimethylolpropane) tetraacrylate; pentaerythritol tetraacrylate; pentaerythritol tetramethacrylate; pentaerythritol triacrylate; pentaerythritol allyl ether; pentaerythritol trimethacrylate; trimethylolpropane triacrylate; trimethylolpropane trimethacrylate; dipentaerythritol penta-/hexa-acrylate; pentaerythritol diacrylate monostearate; 1,3-butanediol diacrylate; 1,3-butanediol dimethacrylate; neopentyl glycol diacrylate; neopentyl glycol dimethacrylate; ethylene glycol diacrylate; ethylene glycol dimethacrylate; glycerol diacrylate; glycerol dimethacrylate; 3-(acryloyl oxy)-2-hydroxypropylmethacrylate; N-2-acryloylamino)ethyl acrylamide; N-2-acryloylamino) ethyl methacrylamide; divinyl styrene; 1,4-diacryloylpiperazine; N,N'-(1,2-dihydroxyethylene) bis(acrylamide); and 1,4-di-(2-furoyl)piperazine, polybutadiene (1,2 vinyl content from 28 to 90%), butadiene styrene copolymer, hydroxyl-terminated polybutadiene, maleinized polybutadiene, epoxidized hydroxyl-terminated polybutadiene, pentaerythritol allyl ether; 4,8,12,-trioxapentadeca-1,14-diene, 6,6,10,10,-tetrakis[(allyloxy)methyl]; and 4,8,12,16-tetraoxanonadeca-1,18-diene, 6,6,10,10,14,14-hexakis[(2-propen-1-yloxy)methyl]; and combinations thereof. Some even more specific embodiments include some such method or articles, wherein the surface reagent is selected from:

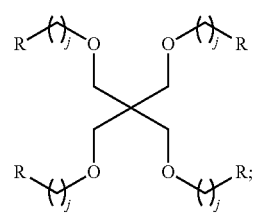

(Formula 17a)

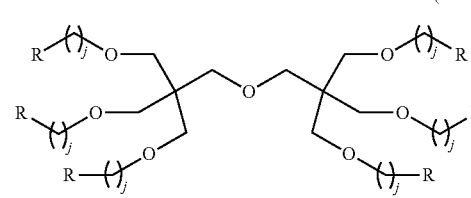

(Formula 17b)

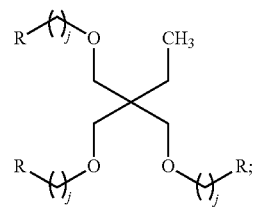

(Formula 17c)

(Formula 17d)

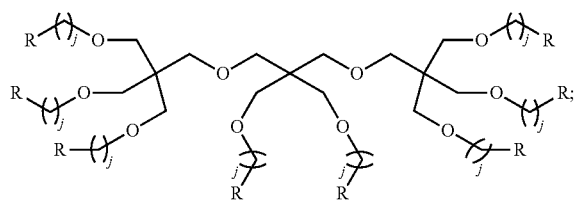

(Formula 17e)

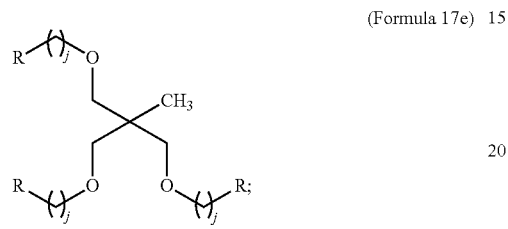

(Formula 17f)

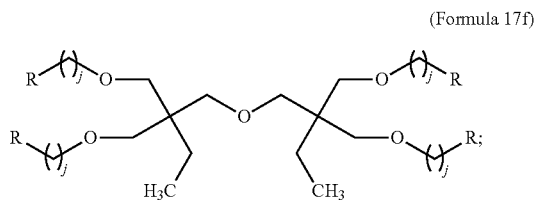

and mixtures thereof, wherein each R is —CH=CH$_2$ or —C≡CH group; and each j is independently an integer from 1 to 18.

Some even more specific embodiments include some such method or articles, wherein the surface reagent is selected from:

(Formula 17g)

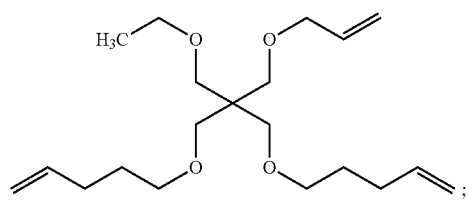

(Formula 17h)

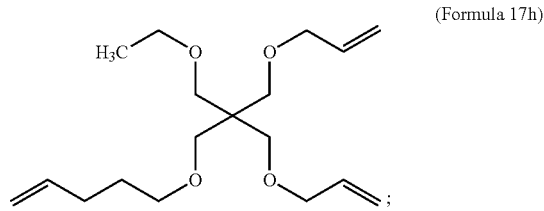

and mixtures thereof.

Some even more specific embodiments include some such method or articles further comprising a modifier attached to the residues of the surface reagent. Some even more specific embodiments include some such method or articles, wherein the modifier comprises a polymeric modifier, a non-polymeric modifier, or a combination thereof. Some even more specific embodiments include some such method or articles, wherein the modifier comprises a polymeric modifier. Some even more specific embodiments include some such method or articles, wherein the polymeric modifier comprises a polyzwitterionic polymer. Some even more specific embodiments include some such method or articles, wherein the polyzwitterionic polymer is selected from a polymer according to any of claims 1 to 6; or mixtures thereof. Some even more specific embodiments include some such method or articles, wherein the resulting article is hydrophilic. Some even more specific embodiments include some such method or articles, wherein the resulting article is resistant to biofouling. Some even more specific embodiments include some such method or articles further comprising reacting the residues of the surface reagent. Some even more specific embodiments include some such method or articles, wherein the residues of the surface reagent are subjected to electrophilic addition, epoxidation, ozonolysis, oxidative cleavage, dihydroxylation, hydroboration-oxidation, carbene addition, click reactions, olefin metathesis, dimerization and polymerization, or any combination thereof.

Some illustrative embodiments include compound of any of formulae 7a, 7b or combinations thereof:

(Formula 7a)

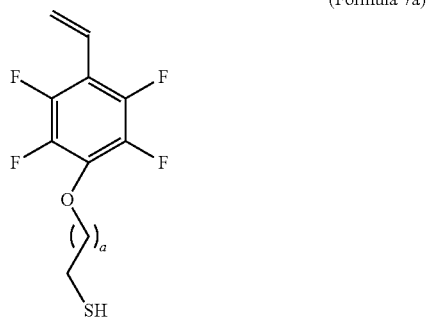

(Formula 7b)

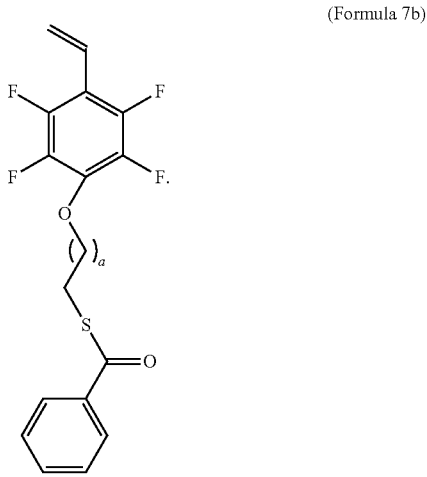

wherein a is an integer from 0 to 11.

Some even more specific embodiments include such compounds, wherein the compound is selected from compounds of formulae 7c, 7d, 7e or combinations thereof:

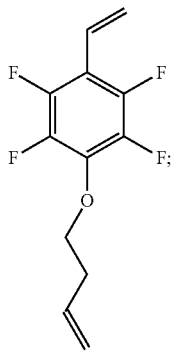

(Formula 7c)

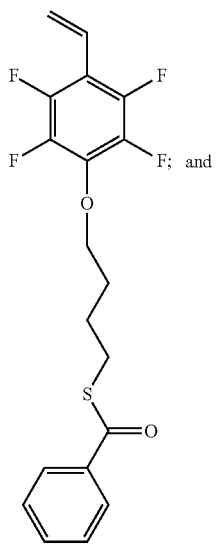

(Formula 7d)

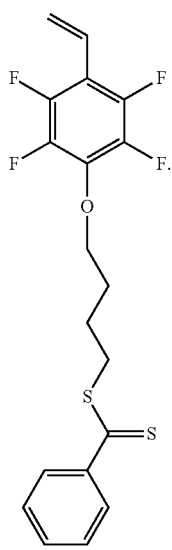

(Formula 7e)

Some illustrative embodiments include compounds of any of formulae 8a, 8b, 8c or combinations thereof:

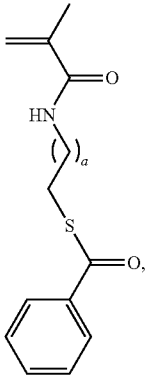

(Formula 8a)

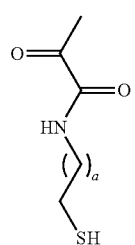

(Formula 8b)

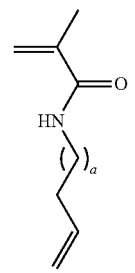

(Formula 8c)

wherein a is an integer from 0 to 11.

Some even more specific embodiments include such compounds, wherein the compound is selected from compounds of formulae 8d, 8e, 8f, or combinations thereof:

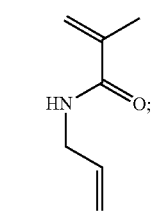

(Formula 8d)

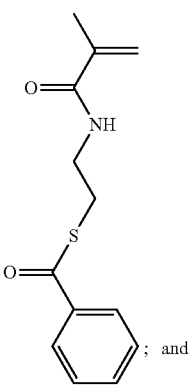

(Formula 8e)

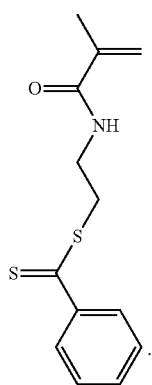

(Formula 8f)

EXAMPLES

Objects and advantages are further illustrated by the following examples, but the particular materials and amounts thereof recited in these examples, as well as other conditions and details, should not be construed to unduly limit this disclosure.

Materials

All reagents and solvents utilized herein were purchased from Millipore-Sigma and Fisher Scientific and were used without modification unless noted otherwise.

All rubbers used in the Examples were thermoset elastomer unless otherwise indicated.

Methods

Procedure to Determine the Weight Percent of the Sulfur Containing Monomer in the Polymer A solution of 3.0:0.15 v/v 0.2 M NaOH:CH$_3$NH$_2$ (33 wt % in EtOH) was degassed under Ar for several hours. 3.15 ml of this solution was then transferred to a vial containing 180 mg of the polymer to be analyzed and the solution stirred at room temperature under argon. Aliquots of this solution were removed from the reaction at various time points and subjected to the Ellman's test described below. The weight percent of the sulfur containing monomer in the polymer was calculated based on the absorbance reading acquired once the aliquots taken at different time points resulted in identical absorbances.

Ellman's Assay Procedure to Determine Sulfhydryl Concentration of a Solution

A 0.1M phosphate buffer (pH 8.0) w/1 mM EDTA was prepared (Reaction Buffer). A solution of 4 mg 5,5'-dithiobis-(2-nitrobenzoic acid) in 1 mL of reaction buffer was prepared (Ellman's Reagent).

50 μL of Ellman's Reagent and 2.5 mL of Reaction Buffer were placed in a separate vial for each unknown to be tested as well as an additional vial that was used as a blank. A 250 microliter aliquot of each unknown solution (lesser amounts were used if sulfhydryl concentration was above 1.0 mM) was placed in each of the vials containing the Ellman's Reagent/Reaction Buffer solution. For the blank 250 μL of Reaction Buffer was placed in a vial with the Ellman's Reagent/Reaction Buffer solution. Each vial was mixed and incubated at room temperature for 15 minutes. A UV/Vis Spectrophotometer (Spectramax Plus 384, Molecular Devices, LLC.) set at 412 nm was zeroed with the blank. The absorbance at 412 nm was then measured for each sample. The concentration of sulfhydryl in the sample was calculated based on the molar extinction coefficient value.

Procedure for Determining Concentration of Double Bonds on Surface of Modified and Unmodified Rubber A procedure from Han, J.; Story, T.; Han G. "A Spectrometric Method for Quantitative Determination of Bromine Using Tris(2-carboxyethyl)phosphine" J. Chem. Ed. 1999 (76) 7 976-977, was modified to determine the procedure herein. First, a 0.003M tris(2-carboxyethyl)phosphine TCEP solution was prepared by dissolving 0.086 g TCEP in 100 ml 50 mM phosphate buffer (pH 7.5) containing 50 μM EDTA. A 0.001M 5,5'-dithiobis(2-nitrobenzoic acid) DTNB solution was prepared, also in phosphate buffer. These solutions were stored in the refrigerator. A 0.0625 M bromine solution in chloroform or ethyl acetate was prepared by dissolving 80 μL of bromine in 25 ml chloroform or ethyl acetate. Using a pipette, 2 ml of this solution was measured via pipette into a clear vial with Teflon-lined cap. The test rubber coupon (1 cm×1.5 cm×0.18 cm) was soaked in 2 ml of bromine/chloroform or ethyl acetate solution for 10 minutes. A glass pipette was used transfer ½ ml from the 2 ml bromine/chloroform or ethyl acetate solution to 5 ml of TCEP in a 7-ml vial and was shaken. 800 μl of 0.001M DTNB solution was added to a cuvette. The absorbance of this at 412 nm was used as a "reference." 10 μl of the TCEP/bromine solution was added to the same cuvette, was shook well and the absorbance was measured at 412 nm. The molar extinction coefficient of TNB was 14,150 cm$^{-1}$ M$^{-1}$.

A calibration curve for the surface reagent was generated in order to determine the concentration of double bond on the rubber surface. The chloroform solution was used where applicable herein. The ethyl acetate solvent was used where applicable herein.

Procedure for Determining % CFU/cm$^2$ Reduction for Modified Rubber Surfaces Using Biofilm Reactor Test Method All biofilm reactor test results for modified and unmodified coupons were obtained with a drip flow biofilm reactor (Biosurface Technologies Corporation, Bozeman, MT). Coupons were fixed to standard microscope slides with glue (Loctite Epoxy Clear) 2 hours before being placed in the reactor. Each coupon was disinfected by soaking in 70% ethanol/water for 20 minutes followed by soaking in sterile phosphate buffered saline (PBS) for 21 minutes prior to being placed in the sterilized biofilm reactor. 15 mL of flow media (sterilized PBS with 2.7 mg Tryptic Soy Broth (TSB)/L) is placed in each chamber immersing the coupons. 1 mL of inoculum (8,000 CFU/mL P. aeruginosa ATCC 9027) is introduced into each chamber. After 4 hrs flow media is dripped over each coupon at a rate of 0.8 mL/min for 20 hrs. Each coupon is aseptically removed and dipped into 45 mL of sterile PBS in a 50 mL centrifuge tube. The coupon is then scraped 3×15 sec with a sterile policeman, over 40 mL of sterile PBS, dipping the policeman after each scraping. 1 mL of sterile PBS is used to rinse off the coupon, this is repeated twice for a total of 3 mL of PBS. The biofilm is homogenized at 20,500+/−5,000 rpm for 30 seconds with a sterile homogenizing prob. The sample is then serially diluted and plated on Reasoner's 2A (R2A) Agar, incubated at 35° C. for 17 hrs. Colony Forming Units (CFUs) are counted and used to calculate the CFUs/cm² on the coupon surface. Results for modified coupons are reported as a reduction in CFUs/cm² compared to an unmodified piece of rubber of the same formulation, coming from the same lot of rubber.

Example 1

Zwitterionic Copolymer Containing SBMAam and 4-(3'-buten-1'-oxy)-2,3,5,6,-tetrafluorostyrene Synthesis of 4-(3'-buten-1'-oxy)-2,3,5,6,-tetrafluorostyrene

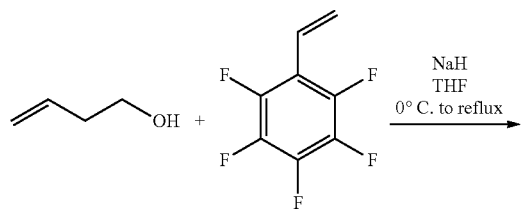

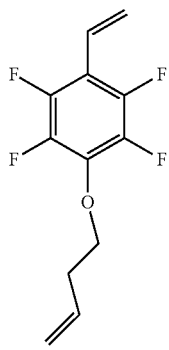

3-buten-1-ol (3.27 g, 45.25 mmol, 1.25 equiv.) was added to a round bottom flask and dissolved in 30 ml of THF. NaH (2.26 g, 56.5 mmol, 1.56 equiv., 60% dispersion in mineral oil) was added in small portions over 20 minutes at 0° C. Pentafluorostyrene (7.05 g, 36.2 mmol, 1.00 equiv.) was added as a solution in THF (15 ml). The reaction mixture was refluxed for 3 hours and then cooled to room temperature. Saturated NH₄Cl (35 ml) was added and the reaction mixture transferred to a separatory funnel. The aqueous layer was then extracted with CH₂Cl₂ (35 ml×3). The combined organic extracts were washed with water (35 ml), dried over Na₂SO₄ and concentrated under reduced pressure. The crude reaction mixture was purified by flash column chromatography (19:1 hexanes:CH₂Cl₂) to yield 4-(3'-buten-1'-oxy)-2,3,5,6,-tetrafluorostyrene (7.55 g, 30.7 mmol, 85%) as a colorless liquid.

Synthesis of zwitterionic copolymer containing SBMAam and 4-(3'-buten-1'-oxy)-2,3,5,6,-tetrafluorostyrene

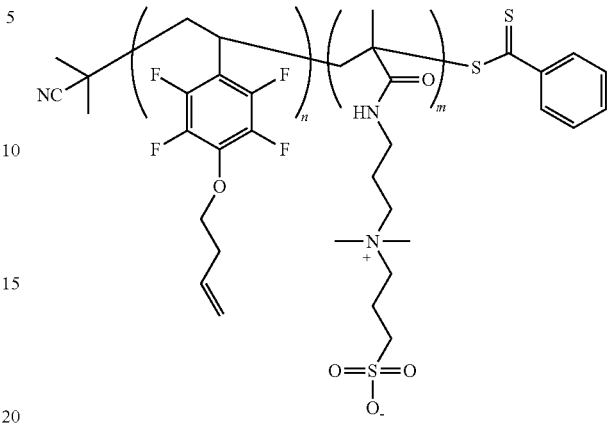

Referring to Scheme 3b above, a zwitterionic copolymer was synthesized by copolymerization of SBMAam monomer with 3-buten-1-oxy derivatized pentafluorostyrene. 4-(3'-buten-1'-oxy)-2,3,5,6-tetrafluorostyrene (187 mg, 0.760 mmol) from Example 11, SBMAam (2.00 g, 6.840 mmol), 2-cyanoprop-2-yl-dithiobenzoate (56.1 mg, 0.253 mmol), and AIBN (37.4 mg, 0.228 mmol, recrystallized from MeOH) were combined in a polymerization tube. The mixture was dissolved in a solution of 5:7 H₂O:DMF (12 ml). The reaction mixture was slowly purged with argon over a period of 6 hours at room temperature. The tube was then sealed and the reaction mixture heated at 70° C. for twenty hours. After cooling, the reaction mixture was concentrated under reduced pressure. The resulting amorphous solid was thrice washed centrifugally in methanol for 15 minutes at 4° C. The amorphous solid was then dissolved in a minimal amount of water and precipitated out using isopropanol. After filtration the solid was oven dried overnight to deliver the polymer as pink flakes (1.134 g). The structure of the polymer, as seen above, was confirmed by NMR analysis (D₂O). The mole % of the 3-buten-1-oxy derivatized pentafluorostyrene monomer in the copolymer was determined to be 3 mole %.

The presence of the fluorostyrene-derived monomer and SBMAam in the copolymer was confirmed by the combination of:

1) Peaks observed in the ¹H NMR and ¹⁹F NMR spectra.
2) The copolymers were completely water soluble and a homopolymer of the fluorostyrene-derived monomer is water insoluble.

Many of the peaks from the 4-(3'-buten-1'-oxy)-2,3,5,6,-tetrafluorostyrene monomer were located underneath the peaks corresponding to SBMAam and therefore were not visible. The visible peaks for the 4-(3'-buten-1'-oxy)-2,3,5,6,-tetrafluorostyrene monomer along with the peaks for SBMAam are reported: ¹H NMR (D₂O, 300 MHz) δ SBMAam peaks: 0.60-1.90 (m, 5H, —CH₃ and —CH₂ on/in backbone), 1.90-2.10 (m, 2H, —CON—C—CH₂—C—N⁺), 2.10-2.30 (m, 2H, N⁺—C—CH₂—C—SO₃), 2.90-3.03 (m, 2H, CH₂—SO₃), 3.03-3.24 (m, 8H, N⁺—CH₃, CON—CH₂), 3.24-3.41 (m, 2H, CON—C—C—CH₂—N⁺), 3.41-3.60 (m, 2H, N⁺—CH₂—C—C—SO₃).

4-(3'-buten-1'-oxy)-2,3,5,6,-tetrafluorostyrene peaks: 2.44-2.56 (m, 2H, O—C—CH₂), 4.14-4.42 (m, 2H, O—CH₂), 5.04-5.28 (m, 2H, O—C—C—C=CH₂ (cis and trans)), 5.77-6.00 (m, 1H, O—C—C—CH═C), 7.40-8.10 (m, arom from CTA). $^{19}$F NMR (D$_2$O, 471 MHz) δ −157.87, −140.96.

Example 2

Zwitterionic Copolymer Containing N-allylmethacrylamide

Synthesis of N-allylmethacrylamide monomer

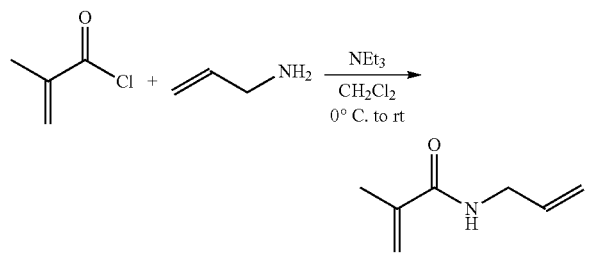

Allylamine (3.21 g, 56.30 mmol, 1.1 equiv.) and triethylamine (7.45 g, 73.7 mmol, 1.44 equiv) were added to a roundbottom flask and dissolved in CH$_2$Cl$_2$ (83 ml). The reaction mixture was cooled to 0° C. and methacryloyl chloride (5.35 g, 51.2 mmol, 1 equiv.) was added dropwise. After stirring overnight at room temperature, the reaction was judged by TLC (KMnO$_4$ stain) to be complete. The reaction mixture was transferred to a separatory funnel and the organic layer was washed with 0.5N HCl, H$_2$O, and saturated NaCl. After drying over Na$_2$SO$_4$, the reaction mixture was concentrated under reduced pressure and purified by flash column chromatography (100:0→80:20 hexanes:EtOAc→90:10 CHCl$_3$:MeOH) to yield N-allylmethacrylamide (3.33 g, 26.6 mmol, 52%) as a yellow oil.

Synthesis of Zwitterionic Copolymer Containing N-allylmethacrylamide

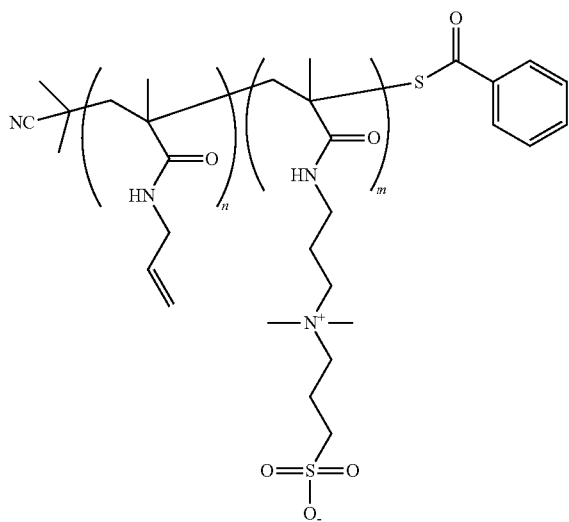

Referring to Scheme 3d above, to a polymerization tube was added SBMAam (2.00 g, 6.84 mmol), N-allylmethacrylamide (95.1 mg, 0.760 mmol) from example 14, 2-cyanoprop-2-yl-dithiobenzoate (56.1 mg, 0.253 mmol), and AIBN (37.4 mg, 0.228 mmol, recrystallized from methanol). To the SBMAam, N-allylmethacrylamide from example 14, CTA and AIBN was added a 5:7 H$_2$O:DMF solution (12 ml) and the polymerization tube was capped with a Teflon™ screwcap having gas inlet/outlet hose connectors and the solution was stirred at room temperature using a hotplate stirrer. After argon was gently streamed through the tube for 6 hours at room temperature, the tube was sealed with a solid Teflon™ screwcap and the reaction mixture was heated at 70° C. for 16 hours using an oil bath with stirring. When the heating period was complete, the stirring was stopped and a viscous orange solution separated out as a lower layer. The entire reaction mixture was transferred to a round bottom flask (viscous layer in the tube was transferred by rinsing with water). The solvents were evaporated under reduced pressure and the resulting viscous liquid was transferred to a centrifuge tube. The crude polymer was centrifuged at 4° C., 3 times using fresh methanol portions that were decanted each time, each centrifuge run lasted 15 minutes. When centrifuging was complete, the material was transferred to round bottom flask and redissolved in a minimal amount of water. Once dissolution was complete, isopropanol was added and the polymer precipitated out. The precipitated polymer, adhered to the inside of the flask, was rinsed several times with isopropanol and dried in a vacuum oven. The polymer had a pink color, and the yield of this process was usually 1.00-1.50 g. The mole % of the N-allylmethacrylamide monomer in the copolymer was determined to be 4 mole % by NMR analysis. The presence of the N-allyl methacrylamide monomer and SBMAam in the copolymer was confirmed by the combination of: 1) Peaks observed in the $^1$H NMR spectrum; and 2) The copolymers were completely water soluble and a homopolymer of the N-allyl methacrylamide monomer is water insoluble.

Many of the peaks from the N-allyl methacrylamide monomer were located underneath the peaks corresponding to SBMAam and therefore were not visible. The visible peaks for the N-allyl methacrylamide monomer along with the peaks for SBMAam are reported: $^1$H NMR (D$_2$O, 300 MHz) δ SBMAam peaks: 0.60-1.90 (m, 5H, —CH$_3$ and —CH$_2$ on/in backbone), 1.90-2.09 (m, 2H, —CON—C—CH$_2$—C—N$^+$), 2.09-2.37 (m, 2H, N$^+$—C—CH$_2$—C—SO$_3$), 2.90-3.04 (m, 2H, CH$_2$—SO$_3$), 3.04-3.27 (m, 8H, N$^+$—CH$_3$, CON—CH$_2$), 3.27-3.41 (m, 2H, CON—C—CH$_2$—N$^+$), 3.41-3.60 (m, 2H, N$^+$—CH$_2$—C—C—SO$_3$). N-allyl methacrylamide peaks: 3.69-3.86 (m, 2H, N—CH$_2$), 5.11-5.31 (m, 2H, N—C—C═CH$_2$, cis and trans), 5.71-5.93 (m, 1H, N—C—CH═C) 7.31-8.40 (m, arom from CTA).

Example 3

Zwitterionic Copolymer Containing SBMAam and 4-(4'-benzoylmercaptobutane-1'-oxy)-2,3,5,6-tetrafluorostyrene

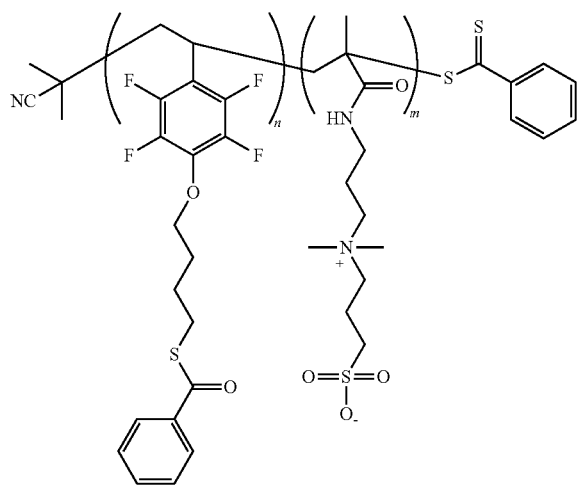

Synthesis of 4-(benzoylmercapto)-butan-1-ol

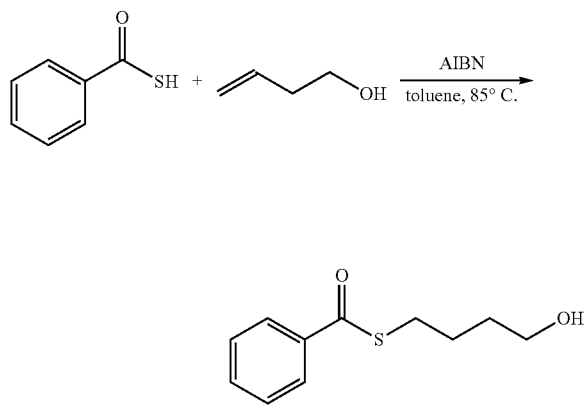

3-buten-1-ol (1.67 g, 23.2 mmol, 1 equiv.) and thiobenzoic acid (9.64 g, 69.7 mmol, 3.00 equiv) were added to a round bottom flask and dissolved in toluene (55 ml). The reaction mixture was purged overnight with argon. The following day, the reaction mixture was heated to 85° C. and AIBN (0.382 g, 2.32 mmol 0.100 equiv., recrystallized from MeOH, in 0.095 g increments every hour over 4 hours) was added while maintaining an argon atmosphere. After a total of 6 hours at 85° C., the reaction mixture was allowed to cool and then poured into a separatory funnel containing 9 g of $NaHCO_3$ in 170 ml $H_2O$ and extracted several times with chloroform (57 ml) and dried over $Na_2SO_4$. The reaction mixture was then concentrated under reduced pressure and purified by flash column chromatography (100:0→50:50 hexanes:EtOAc) to yield 4-(benzoylmercapto)-butan-1-ol (3.22 g, 15.3 mmol, 66%) as a yellow oil.

Synthesis of 4-(4'-benzoylmercaptobutane-1'-oxy)-2,3,5,6-tetrafluorostyrene monomer

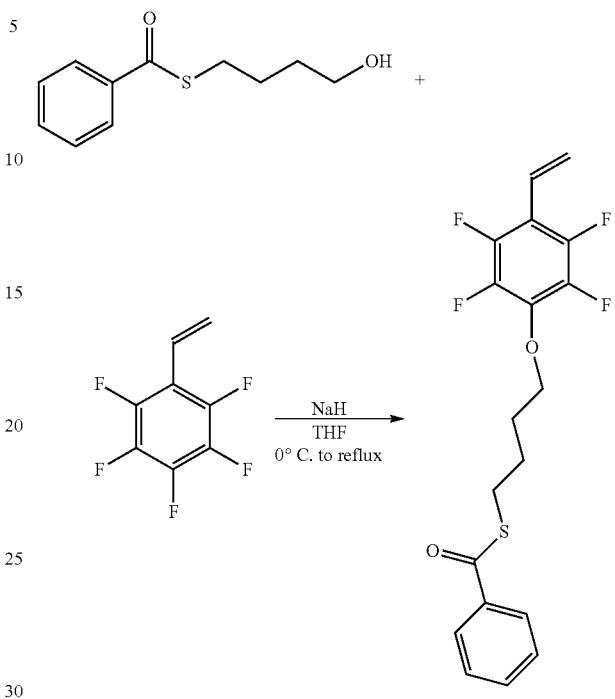

4-(benzoylmercapto)-butan-1-ol (2.00 g, 9.51 mmol, 1.25 equiv.) synthesized as above was added to a round bottom flask and dissolved in 30 ml of THF. NaH (0.47 g, 1.87 mmol, 1.56 equiv., 60% dispersion in mineral oil) was added in small portions over 20 minutes at 0° C. Pentafluorostyrene (1.48 g, 7.61 mmol, 1.00 equiv.) was added as a solution in THF (3.15 ml). The reaction mixture was refluxed for 3 hours and then cooled to room temperature. Saturated $NH_4Cl$ (10.5 ml) was added and the reaction mixture transferred to a separatory funnel. The aqueous layer was then extracted with $CH_2Cl_2$ (8 ml×3). The combined organic extracts were washed with water (8 ml), dried over $Na_2SO_4$ and concentrated under reduced pressure. The crude reaction mixture was purified by flash column chromatography (100:0→80:20 hexanes:EtOAc) to yield the product (1.32 g, 3.43 mmol, 45%) as a yellow solid.

Synthesis of Zwitterionic Copolymer Containing SBMAam and 4-(4'-benzoylmercaptobutane-1'-oxy)-2,3,5,6-tetrafluorostyrene Referring to Scheme 3a above, to a polymerization tube was added SBMAam (2.00 g, 6.84 mmol), fluorine-containing S-benzoyl monomer (292 mg, 0.760 mmol) synthesized as above, 2-cyanoprop-2-yl-dithiobenzoate (56.1 mg, 0.253 mmol), and AIBN (37.4 mg, 0.228 mmol, recrystallized from methanol). To the SBMAam, fluorine-containing S-benzoyl monomer, CTA and AIBN was added a 5:7 $H_2O$:DMF solution (12 ml) and the polymerization tube was capped with a Teflon™ screwcap having gas inlet/outlet hose connectors and the solution was stirred at room temperature using a hotplate stirrer. After argon was gently streamed through the tube for 6 hours at room temperature, the tube was sealed with a solid Teflon™ screwcap and the reaction mixture heated at 70° C. for 16 hours using an oil bath with stirring. When the heating period was complete, the stirring was stopped and a viscous orange solution separated out as a lower layer. The entire reaction mixture was transferred to a round bottom flask (viscous layer in the tube was transferred by rinsing with water). The solvents were evaporated under reduced pressure and the resulting viscous liquid was transferred to a centrifuge tube. The crude polymer was centrifuged at 4° C., 3 times using fresh methanol portions that were decanted each time, each centrifuge run lasting 15 minutes. When centrifuging was complete, the material was transferred to round bottom flask and redissolved in a minimal amount of water. Once dissolution was complete, isopropanol was added and the polymer precipitated out. The precipitated polymer, adhered to the inside of the flask, was rinsed several times with isopropanol and dried at elevated temperature under atmospheric pressure until it became flaky. The polymer had a pink color, and the yield of this process was 1.04 g. The procedure to determine the weight percent of the sulfur containing monomer in the polymer and the Ellman's assay procedure to determine sulfhydryl concentration of a solution, both of which were provided above in the Methods, were used to determine that the polymer contained 3.9 weight percent of the Fluorine-Containing S-Benzoyl Monomer.

The presence of the fluorostyrene-derived monomer and SBMAam in the copolymer was confirmed by the combination of: 1) Differences between the ¹H NMR spectra of the copolymer and SBMAam homopolymer. In the NMR spectrum of the SBMAam homopolymer, the aromatic protons from the leftover chain transfer agent, CTA, on the terminus of the polymer integrate cleanly in a 2:1:2 ratio as expected. An NMR spectrum of the copolymer containing the fluorostyrene-derived monomer and SBMAam showed greatly increased complexity and increased integration values in the aromatic region, due to the presence of aromatic protons in the S-benzoyl moiety; 2) Aminolysis and Ellman assay demonstrated that the copolymer prepared with 10 mol % fluorostyrene-derived monomer contained 3.9 weight % of the fluorostyrene-derived monomer; 3) Peaks observed in the fluorine NMR spectrum; and 4) The copolymers were completely water soluble and a homopolymer of the fluorostyrene-derived monomer is water insoluble.

Most of the peaks in the copolymer ¹H NMR spectrum from the fluorostyrene-derived monomer were located underneath the peaks corresponding to SBMAam and therefore were not visible. The only peaks in the copolymer ¹H NMR spectrum observed for the fluorostyrene-derived monomer were in the aromatic region. ¹H NMR (D₂O, 300 MHz) δ 0.60-1.90 (m, 5H, —CH₃ and —CH₂ on/in backbone), 1.90-2.10 (m, 2H, —CON—C—CH₂—C—N⁺), 2.10-2.30 (m, 2H, N⁺—C—CH₂—C—SO₃), 2.75-3.05 (m, 4H, CH₂—SO₃, CON—CH₂), 3.05-3.25 (m, 6H, N⁺—CH₃), 3.25-3.41 (m, 2H, CON—C—C—CH₂—N⁺), 3.41-3.60 (m, 2H, N⁺—CH₂—C—C—SO₃), 6.80-8.20 (m, arom from CTA and S-benzoyl groups). ¹⁹F NMR (D₂O, 471 MHz) δ −140.8, −134.5.

Example 4

Synthesis of Zwitterionic Copolymer Containing SBMAam and S-Benzoyl-N-Methacryloyl Cysteamine
Synthesis of S-Benzoyl-N-Methacryloyl Cysteamine Monomer
Synthesis of S-Benzoyl-N-Boc Cysteamine

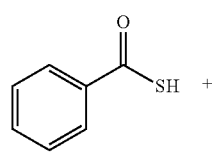

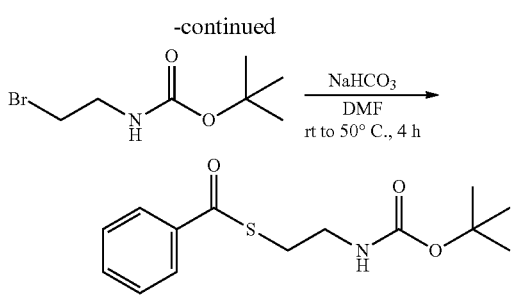

To a solution of N-Boc-2-bromoethylamine (1.00 g, 4.46 mmol, 1 equiv.) in DMF (17 ml) were added thiobenzoic acid (1.23 g, 8.93 mmol, 2 equiv.) and NaHCO₃ (1.00 g, 11.9 mmol, 2.67 equiv.). The solution was stirred at room temperature until CO₂ effervescence ceased and then at 50° C. for 4 hours. The reaction mixture was then poured into a separatory funnel containing 15 ml of H₂O. The mixture was then extracted with CHCl₃ (5×23 ml) and the combined organic extracts washed with H₂O (5×23 ml) and brine (1×23 ml). The organic layer was then dried over Na₂SO₄ and concentrated under reduced pressure. The crude reaction mixture was purified by flash column chromatography (100:0→50:50 hexanes:EtOAc) to yield S-Benzoyl-N-Boc cysteamine (0.725 g, 2.58 mmol, 58%) as an orange oil.

Synthesis of S-Benozyl Cysteamine Hydrochloride:

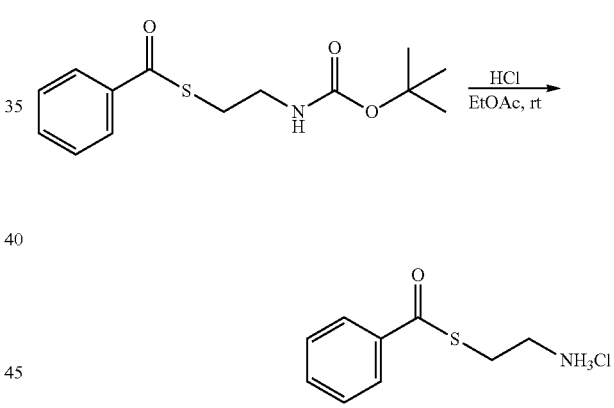

S-Benzoyl-N-Boc cysteamine (0.700 g, 2.48 mmol, 1.00 equiv.) was dissolved in ethyl acetate (30 ml). HCl gas was bubbled through the solution until the reaction was judged by TLC to be complete. The reaction mixture was concentrated under reduced pressure. The resultant solid was filtered and washed with ethyl acetate to yield S-Benzoyl cysteamine hydrochloride (0.437 g, 2.01 mmol, 81%) as a white powder.

Synthesis of S-Benzoyl-N-Methacryloyl Cysteamine

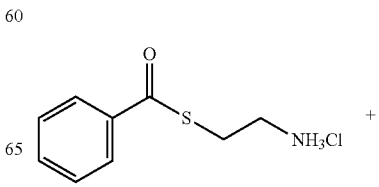

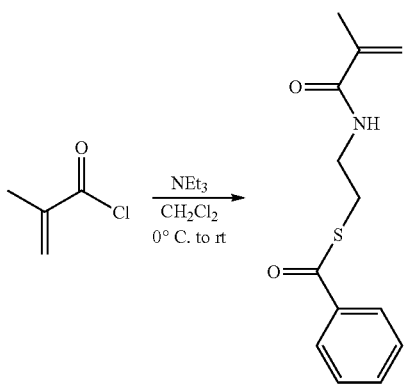

S-Benozyl cysteamine hydrochloride (0.400 g, 1.84 mmol, 1.00 equiv.) was suspended in CH$_2$Cl$_2$ (10 ml) and the suspension cooled to 0° C. Triethylamine (0.559 g, 5.51 mmol, 3 equiv.) was added, followed by dropwise addition of methacryloyl chloride (0.214 g, 2.02 mmol, 1.10 equiv.). After stirring overnight at room temperature, the reaction was judged by TLC (KMnO$_4$ stain) to be complete. The reaction mixture was transferred to a separatory funnel and the organic layer was washed with 0.5N HCl, H$_2$O, and saturated NaCl. After drying over Na$_2$SO$_4$, the reaction mixture was concentrated under reduced pressure and purified by flash column chromatography (100:0→80:20 hexanes:EtOAc) to yield S-Benzoyl-N-Methacryloyl cysteamine (0.252 g, 1.01 mmol, 55%) as a yellow oil.

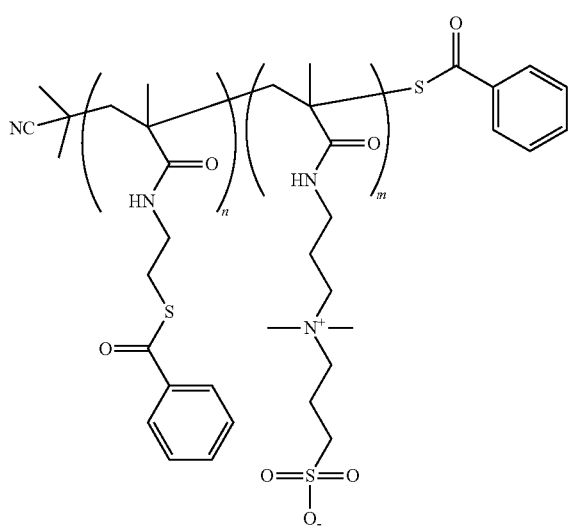

Referring to Scheme 3c above, to a polymerization tube was added SBMAam (2.00 g, 6.84 mmol), S-Benzoyl-N-Methacryloyl cysteamine (190 mg, 0.760 mmol) from example 15, 2-cyanoprop-2-yl-dithiobenzoate (56.1 mg, 0.253 mmol), and AIBN (37.4 mg, 0.228 mmol, recrystallized from methanol). To the SBMAam, S-Benzoyl-N-Methacryloyl cysteamine, CTA and AIBN was added a 5:7 H$_2$O:DMF solution (12 ml) and the polymerization tube was capped with a Teflon™ screwcap having gas inlet/outlet hose connectors and the solution was stirred at room temperature using a hotplate stirrer. After argon was gently streamed through the tube for 6 hours at room temperature, the tube was sealed with a solid Teflon™ screwcap and the reaction mixture heated at 70° C. for 16 hours using an oil bath with stirring. When the heating period was complete, the stirring was stopped and a viscous orange solution separated out as a lower layer. The entire reaction mixture was transferred to a round bottom flask (viscous layer in the tube was transferred by rinsing with water). The solvents were evaporated under reduced pressure and the resulting viscous liquid was transferred to a centrifuge tube. The crude polymer was centrifuged at 4° C., 3 times using fresh methanol portions that were decanted each time, each centrifuge run lasting 15 minutes. When centrifuging was complete, the material was transferred to round bottom flask and redissolved in a minimal amount of water. Once dissolution was complete, isopropanol was added and the polymer precipitated out. The precipitated polymer, adhered to the inside of the flask, was rinsed several times with isopropanol and dried at elevated temperature under atmospheric pressure until it became flaky. The polymer had a pink color, and the yield of this process was 1.19 g. The procedure to determine the weight percent of the sulfur containing monomer in the polymer and the Ellman's assay procedure to determine sulfhydryl concentration of a solution, both of which were provided above in the Methods, were used to determine that the polymer contained 11 weight percent S-Benzoyl-N-Methacryloyl cysteamine.

The presence of S-benzoyl-N-methacryloyl cysteamine monomer and SBMAam in the copolymer was confirmed by the combination of: 1) Differences between the $^1$H NMR spectra of the copolymer and SBMAam homopolymer. In the NMR spectrum of the SBMAam homopolymer, the aromatic protons from the leftover chain transfer agent, CTA, on the terminus of the polymer integrate cleanly in a 2:1:2 ratio as expected. The NMR spectrum of the copolymer containing S-benzoyl-N-methacryloyl cysteamine and SBMAam showed greatly increased complexity and increased integration values in the aromatic region, due to the presence of aromatic protons in the S-benzoyl monomer; 2) Aminolysis and Ellman assay demonstrated that copolymers prepared with 10 mol % S-benzoyl-N-methacryloyl cysteamine monomer contained 11 weight % of the S-benzoyl-N-methacryloyl cysteamine monomer; and 3) The copolymers were completely water soluble and a homopolymer of S-benzoyl-N-methacryloyl cysteamine monomer is water insoluble.

Most of the peaks in the copolymer $^1$H NMR spectrum from the S-benzoyl-N-methacryloyl cysteamine monomer were located underneath the peaks corresponding to SBMAam and therefore were not visible. The only peaks in the copolymer $^1$H NMR spectrum observed for the S-benzoyl-N-methacryloyl cysteamine monomer were in the aromatic region. $^1$H NMR (D$_2$O, 300 MHz) δ 0.60-1.80 (m, 5H, —CH$_3$ and —CH$_2$ on/in backbone), 1.90-2.08 (m, 2H, —CON—C—CH$_2$—C—N$^+$), 2.08-2.32 (m, 2H, N$^+$—C—CH$_2$—C—SO$_3$), 2.90-3.03 (m, 2H, CH$_2$—SO$_3$), 3.03-3.24 (m, 8H, N$^+$—CH$_3$, CON—CH$_2$), 3.29-3.41 (m, 2H, CON—C—C—CH$_2$—N$^+$), 3.41-3.60 (m, 2H, N$^+$—CH$_2$—C—C—SO$_3$), 7.40-8.20 (m, arom from CTA and S-benzoyl groups).

Example 5

Synthesis of Zwitterionic Copolymer Containing SBMAam and S-Benzoyl-N-Methacryloyl Propylamine Synthesis of S-Benzoyl-N-Methacryloyl propylamine Synthesis of S-Benzoyl-N-Boc propylamine

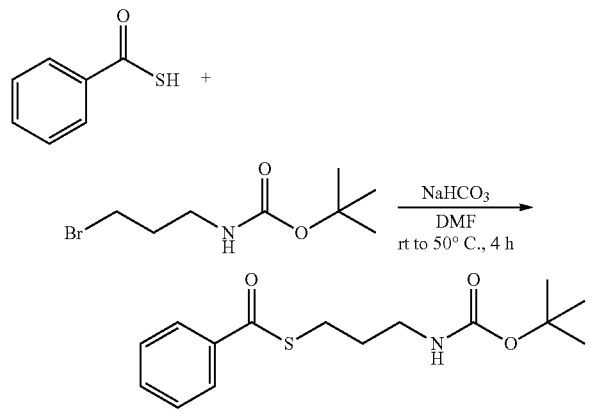

To a solution of N-Boc-3-bromopropylamine (2.00 g, 8.40 mmol, 1 equiv.) in DMF (35 ml) were added thiobenzoic acid (2.32 g, 16.80 mmol, 2 equiv.) and NaHCO$_3$ (1.88 g, 22.43 mmol, 2.67 equiv.). The solution was stirred at room temperature until CO$_2$ effervescence ceased and then at 50° C. for 4 hours. The reaction mixture was then poured into a separatory funnel containing 40 ml of H$_2$O. The mixture was then extracted with CHCl$_3$ (5×20 ml) and the combined organic extracts washed with H$_2$O (5×40 ml) and brine (1×40 ml). The organic layer was then dried over Na$_2$SO$_4$ and concentrated under reduced pressure. The crude reaction mixture was purified by flash column chromatography (100:0→60:40 hexanes:EtOAc) to yield S-Benzoyl-N-Boc propylamine (2.35 g, 7.96 mmol, 95%) as a pink oil.

Synthesis of S-Benozyl propylamine hydrochloride:

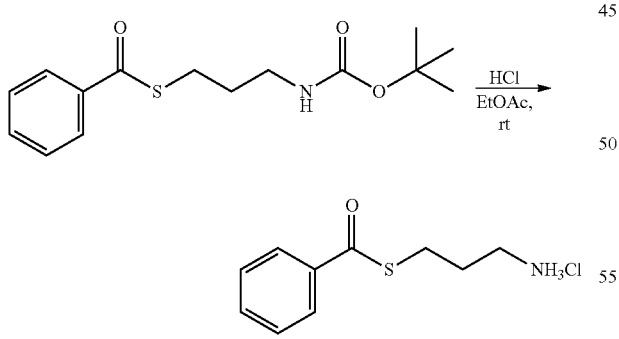

S-Benzoyl-N-Boc propylamine (2.13 g, 7.23 mmol, 1.00 equiv.) was dissolved in ethyl acetate (50 ml). HCl gas was bubbled through the solution until the reaction was judged by TLC to be complete. The reaction mixture was concentrated under reduced pressure. The resultant solid was filtered and washed with ethyl acetate to yield S-Benozyl propylamine hydrochloride (1.50 g, 6.91 mmol, 96%) as a white powder.

Synthesis of S-Benzoyl-N-Methacryloyl propylamine

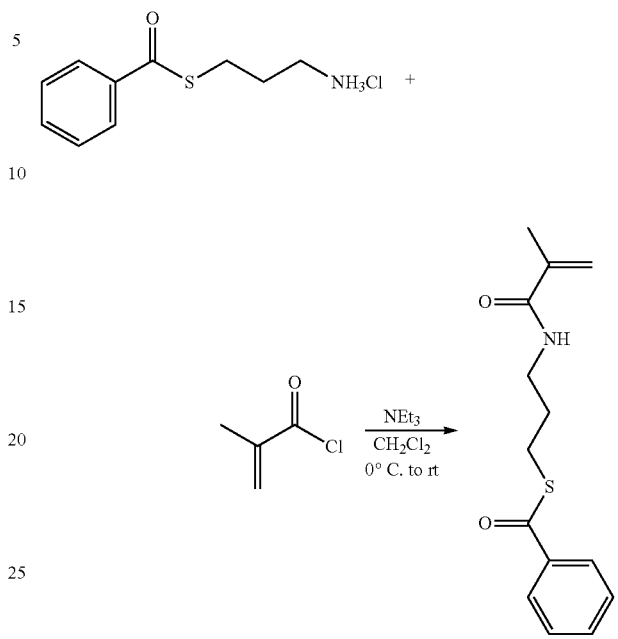

S-Benozyl propylamine hydrochloride (1.25 g, 5.74 mmol, 1.00 equiv.) was suspended in CH$_2$Cl$_2$ (31 ml) and the suspension cooled to 0° C. Triethylamine (1.28 g, 12.63 mmol, 2.2 equiv.) was added, followed by dropwise addition of methacryloyl chloride (0.660 g, 6.32 mmol, 1.10 equiv.). After stirring overnight at room temperature, the reaction was judged by TLC (KMnO$_4$ stain) to be complete. The reaction mixture was transferred to a separatory funnel and the organic layer was washed with H$_2$O and saturated NaCl. After drying over Na$_2$SO$_4$, the reaction mixture was concentrated under reduced pressure and purified by flash column chromatography (100:0→20:80 hexanes:EtOAc) to yield S-Benzoyl-N-Methacryloyl propylamine (1.11 g, 4.20 mmol, 73%) as a pink oil.

Synthesis of zwitterionic copolymer containing SBMAam and S-Benzoyl-N-Methacryloyl propylamine

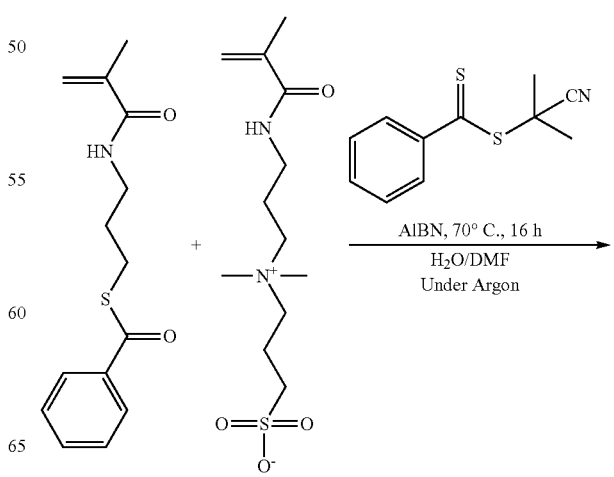

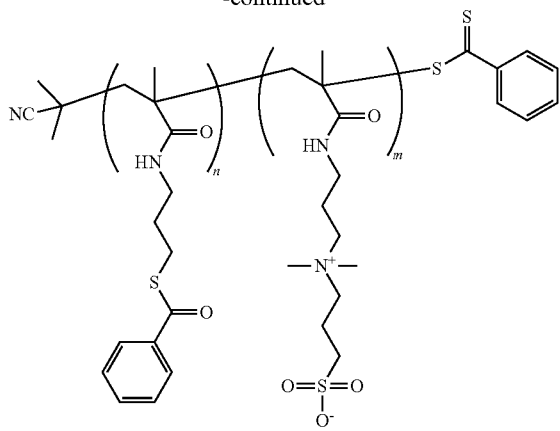

To a polymerization tube was added SBMAam (4.00 g, 13.68 mmol), S-Benzoyl-N-Methacryloyl propylamine (400 mg, 1.520 mmol), 2-cyanoprop-2-yl-dithiobenzoate (112 mg, 0.507 mmol), and AIBN (74.8 mg, 0.455 mmol, recrystallized from methanol). To the SBMAam, S-Benzoyl-N-Methacryloyl propylamine, CTA and AIBN was added a 5:7 $H_2O$:DMF solution (24 ml) and the polymerization tube was capped with a Teflon™ screwcap having gas inlet/outlet hose connectors and the solution was stirred at room temperature using a hotplate stirrer. After argon was gently streamed through the tube for 6 hours at room temperature, the tube was sealed with a solid Teflon™ screwcap and the reaction mixture heated at 70° C. for 16 hours using an oil bath with stirring. When the heating period was complete, the stirring was stopped and a viscous orange solution separated out as a lower layer. The entire reaction mixture was transferred to a round bottom flask (viscous layer in the tube was transferred by rinsing with water). The solvents were evaporated under reduced pressure and the resulting viscous liquid was transferred to a centrifuge tube. The crude polymer was centrifuged at 4° C., 3 times using fresh methanol portions that were decanted each time, each centrifuge run lasting 15 minutes. When centrifuging was complete, the material was transferred to round bottom flask and redissolved in a minimal amount of water. Once dissolution was complete, isopropanol was added and the polymer precipitated out. The precipitated polymer, adhered to the inside of the flask, was rinsed several times with isopropanol and dried at elevated temperature under atmospheric pressure until it became flaky. The polymer had a pink color, and the yield of this process was 2.44 g. The procedure to determine the weight percent of the sulfur containing monomer in the polymer and the Ellman's assay procedure to determine sulfhydryl concentration of a solution, both of which were provided above in the Methods, were used to determine that the polymer contained 12.6 weight percent S-Benzoyl-N-Methacryloyl propylamine.

The presence of S-benzoyl-N-methacryloyl propylamine monomer and SBMAam in the copolymer was confirmed by the combination of: 1) Differences between the $^1$H NMR spectra of the copolymer and SBMAam homopolymer. In the NMR spectrum of the SBMAam homopolymer, the aromatic protons from the leftover chain transfer agent, CTA, on the terminus of the polymer integrate cleanly in a 2:1:2 ratio as expected. The NMR spectrum of the copolymer containing S-benzoyl-N-methacryloyl propylamine and SBMAam showed greatly increased complexity and increased integration values in the aromatic region, due to the presence of aromatic protons in the S-benzoyl monomer; 2) Aminolysis and Ellman assay demonstrated that copolymers prepared with 10, 20, and 30 mol % S-benzoyl-N-methacryloyl propylamine monomer contained 12.6, 23, and 33 weight % of the monomer, respectively; 3) A trend of decreasing water solubility was observed with increasing proportions of S-benzoyl-N-methacryloyl propylamine monomer in the copolymer. Decreasing water solubility was shown by more time and energy needed to dissolve the copolymer in water. 4) The copolymers were completely water soluble and a homopolymer of S-benzoyl-N-methacryloyl propylamine monomer is water insoluble.

Most of the peaks in the copolymer $^1$H NMR spectrum from the S-benzoyl-N-methacryloyl propylamine monomer were located underneath the peaks corresponding to SBMAam and therefore were not visible. The only peaks in the copolymer $^1$H NMR spectrum observed for the S-benzoyl-N-methacryloyl propylamine monomer were in the aromatic region. $^1$H NMR ($D_2O$, 300 MHz) δ 0.60-1.80 (m, 5H, —$CH_3$ and —$CH_2$ on/in backbone), 1.90-2.08 (m, 2H, —CON—C—$CH_2$—C—$N^+$), 2.08-2.32 (m, 2H, $N^+$—C—$CH_2$—C—$SO_3$), 2.90-3.03 (m, 2H, $CH_2$—$SO_3$), 3.03-3.24 (m, 8H, $N^+$—$CH_3$, CON—$CH_2$), 3.29-3.41 (m, 2H, CON—C—C—$CH_2$—$N^+$), 3.41-3.60 (m, 2H, $N^+$—$CH_2$—C—C—$SO_3$), 7.40-8.20 (m, arom from CTA and S-benzoyl groups).

Example 6

Synthesis of Zwitterionic Polymer Containing SBAam

Synthesis of [3-(acryloylamino)propyl]dimethyl(3-sulfopropyl)ammonium hydroxide inner salt

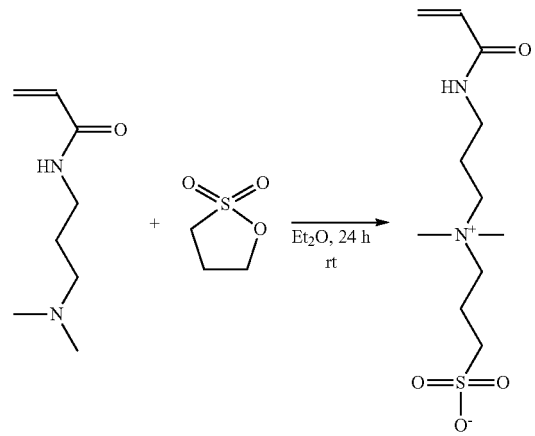 [SMILES: C=CC(=O)NCCCN(C)C ; O=S1(=O)CCCO1 ; C=CC(=O)NCCC[N+](C)(C)CCCS(=O)(=O)[O-]]

N-[3-(Dimethylamino)propyl] acrylamide (5.52 g, 35.33 mmol, 1 equiv.) was added to an oven-dried roundbottom flask and dissolved in diethyl ether (40 ml). To the reaction mixture was added 1,3-propane sultone (4.32 g, 35.33 mmol, 1 equiv.) and the reaction mixture stirred for 24 hours at room temperature. The resulting solid was filtered, washed with acetone and dried by pulling air through the filter to furnish [3-(acryloylamino)propyl]dimethyl(3-sulfopropyl)ammonium hydroxide inner salt (7.57 g, 27.19 mmol, 77%) as a white powder.

133
Synthesis of Zwitterionic Polymer Containing SBAam

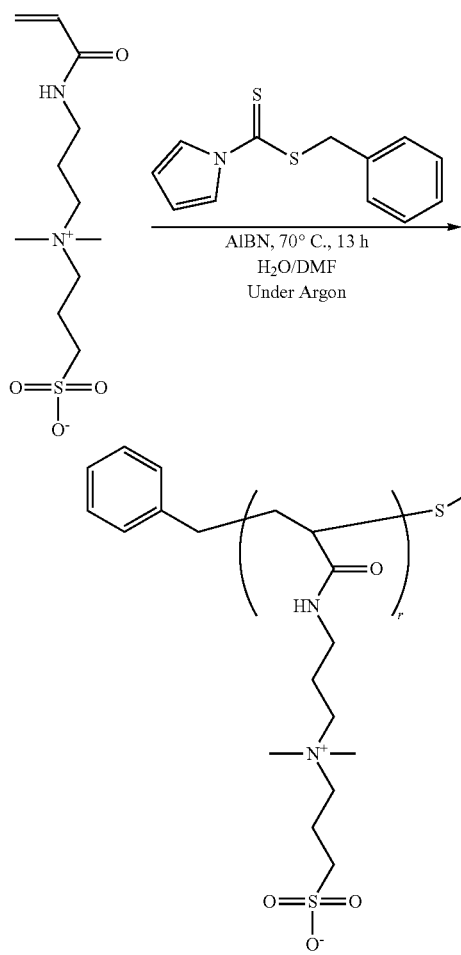

To a polymerization tube was added sulfobetaine acrylamide, SBAam (3.81 g, 13.68 mmol), Benzyl 1H-pyrrole-1-carbodithioate (121 mg, 0.517 mmol), and AIBN (74.8 mg, 0.455 mmol, recrystallized from methanol). To the SBAam, CTA and AIBN was added a 5:7 $H_2O$:DMF solution (24 ml) and the polymerization tube capped with a Teflon™ screwcap having gas inlet/outlet hose connectors and the solution stirred at room temperature using a hotplate stirrer. After argon was gently streamed through the tube for 6 hours at room temperature, the tube was sealed with a solid Teflon™ screwcap and the reaction mixture heated at 70° C. for 13 hours using an oil bath with stirring. When the heating period was complete, the stirring was stopped and a viscous yellow solution separated out as a lower layer. The entire reaction mixture was transferred to a round bottom flask (viscous layer in the tube was transferred by rinsing with water). The solvents were evaporated under reduced pressure and the resulting flakes were transferred to a centrifuge tube. The crude polymer was centrifuged at 4° C., 3 times using fresh methanol portions that were decanted each time, each centrifuge run lasting 15 minutes. When centrifuging was complete, the material was transferred to a round bottom flask and redissolved in a minimal amount of water. Once dissolution was complete, methanol was added and the polymer precipitated out. The precipitated polymer, adhered to the inside of the flask, was rinsed several times with methanol and dried at 50° C. in a vacuum oven. The polymer had a yellow color, and the yield of this process was 2.11 g.

$^1$H NMR ($D_2O$, 300 MHz) δ 1.07-1.84 (m, 2H, $CH_2$ in backbone), 1.84-2.33 (m, 5H, CH in backbone, CON—C—$CH_2$—C—N+, N+-C—$CH_2$—C—SO3), 2.87-3.03 (m, 2H, CH2-SO3), 3.03-3.29 (m, 8H, N+-CH3, CON—CH2), 3.28-3.42 (m, 2H, CON—C—C—CH2-N+), 3.42-3.60 (m, 2H, N+-CH2-C—C—SO3). CTA peaks: 6.46-6.64 (m, 2H, pyrrole 3,4-H), 7.14-7.55 (m, 5H, all phenyl-H), 7.87-7.97 (m, 2H, pyrrole 2,5-H).

Example 7

Synthesis of Zwitterionic Copolymer Containing SBMAam and N-acryloylcysteamine
Synthesis of SBMAam-co-BAC hydrogel:

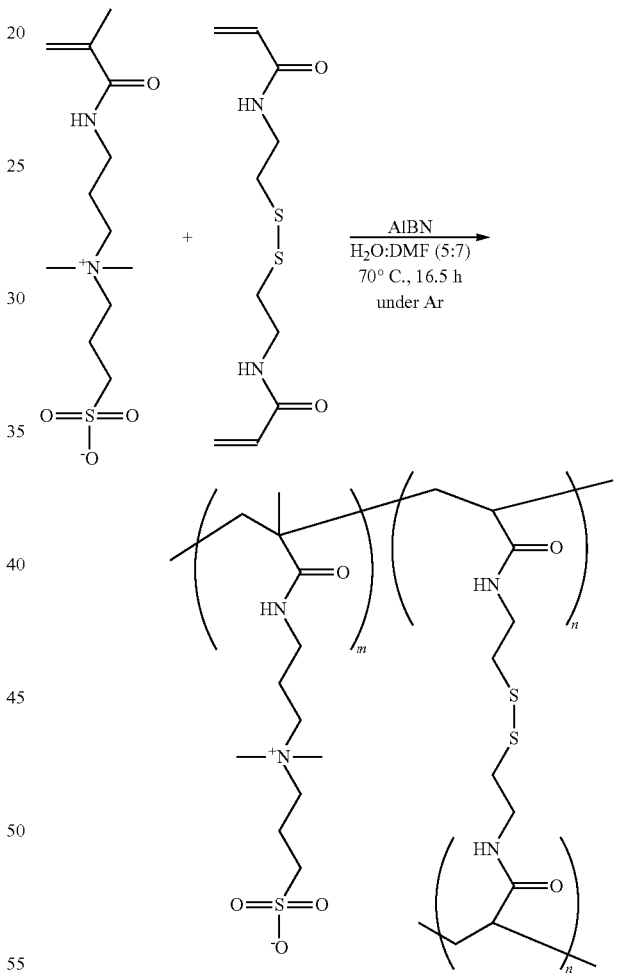

Formula 16k

To a polymerization tube was added SBMAam (4.00 g, 13.68 mmol), N,N'-Bis(acryloyl)cystamine (BAC, Alfa Aesar) (178 mg, 0.684 mmol), and AIBN (22.5 mg, 0.136 mmol, recrystallized from methanol). To the SBMAam, BAC, and AIBN was added a 5:7 $H_2O$:DMF solution (24 ml) and the polymerization tube was capped with a Teflon™ screwcap having gas inlet/outlet hose connectors and the solution was stirred at room temperature using a hotplate stirrer. After argon was gently streamed through the tube for 4 hours at room temperature, the tube was sealed with a solid Teflon™ screwcap and the reaction mixture was heated at 70° C. for 16.5 hours using an oil bath with stirring. When the heating period was complete, two separate phases had formed—a gelatinous phase and a liquid phase. The liquid phase was removed and the gelatinous phase transferred to 3.5 kD MWCO tubing and dialyzed against deionized water for 72 hours. After the dialysis period was complete, the reaction mixture was concentrated under reduced pressure, furnishing the SBMAam-co-BAC, Formula 16k (3.36 g, 80%) as a white solid. The white solid was insoluble in all polar and non-polar solvents but swelled in water which is evidence that a crosslinked hydrogel was formed.

Cleavage of the disulfide to form SBMAam-co-N-acryloylcysteamine:

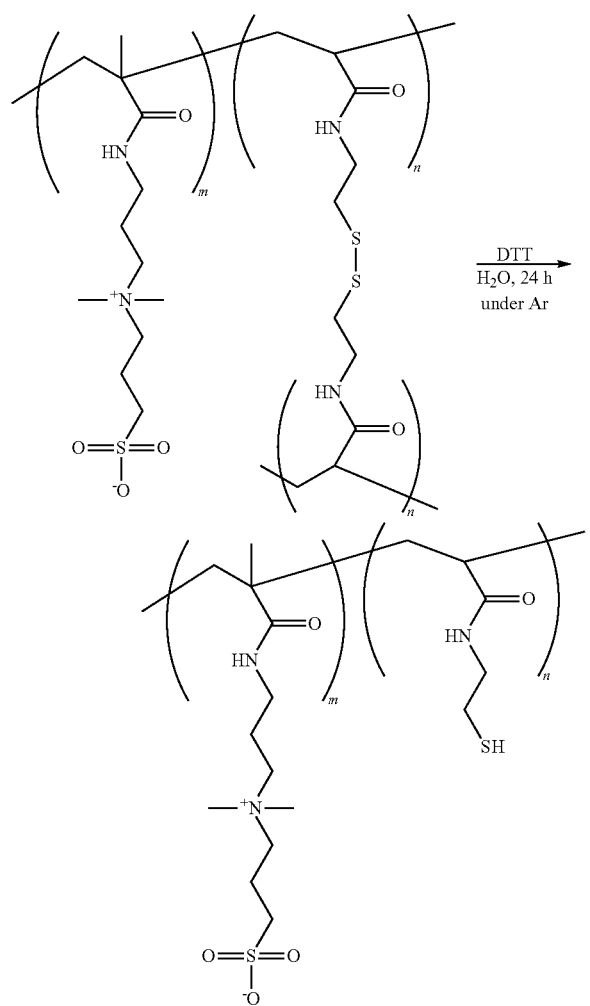

Formula 16l

SBMAam-co-BAC hydrogel (1.00 g) and dithiothreitol (DTT) (500 mg) were added to a roundbottom flask followed by the addition of 50 ml of deionized water. The flask was sealed with a silicone sleeve stopper and the solution was stirred at room temperature for one hour while argon was streamed through the flask, followed by a 24 hour stirring period after ceasing argon flow. The crude reaction mixture was concentrated under reduced pressure. Isopropanol was added to precipitate the polymer and the liquid was decanted. Water was then added to dissolve the precipitate and the solution was again concentrated under reduced pressure and reprecipitated twice more. The resulting solid was dried in vacuum, furnishing SBMAam-co-N-acryloylcysteamine (0.400 g, 40%) as a white solid. The NMR spectra of the polymer matched previous literature spectra of the polymer that was made by other methods.

Example 8

Synthesis of a Zwitterionic Homopolymer Containing SBMAam

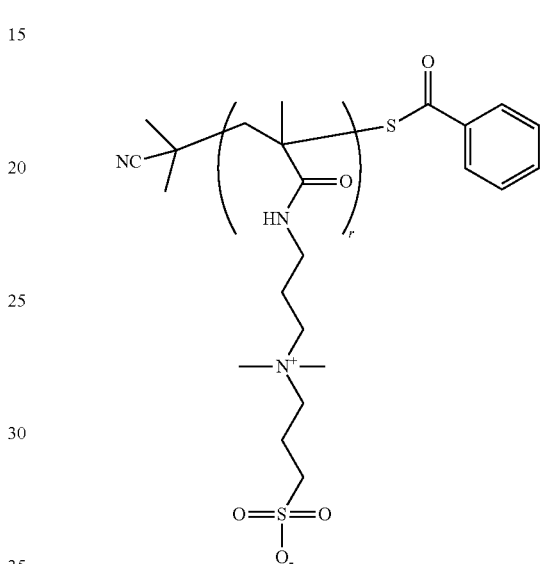

Referring to Scheme 2 above, To a polymerization tube was added SBMAam (4.00 g, 13.68 mmol), 2-cyanoprop-2-yl-dithiobenzoate (112 mg, 0.507 mmol), and AIBN (15.0 mg, 0.092 mmol, recrystallized from methanol). To the SBMAam, CTA and AIBN was added a 5:7 H2O:DMF solution (24 ml) and the polymerization tube capped with a Teflon™ screwcap having gas inlet/outlet hose connectors and the solution stirred at room temperature using a hotplate stirrer. After argon was gently streamed through the tube for 6 hours at room temperature, the tube was sealed with a solid Teflon™ screwcap and the reaction mixture heated at 70° C. for 16 hours using an oil bath with stirring. When the heating period was complete, the stirring was stopped and a viscous orange solution separated out as a lower layer. The entire reaction mixture was transferred to a round bottom flask (viscous layer in the tube was transferred by rinsing with water). The solvents were evaporated under reduced pressure and the resulting flakes were transferred to a centrifuge tube. The crude polymer was centrifuged at 4° C., 3 times using fresh methanol portions that were decanted each time, each centrifuge run lasting 15 minutes. When centrifuging was complete, the material was transferred to a round bottom flask and redissolved in a minimal amount of water. Once dissolution was complete, methanol was added and the polymer precipitated out. The precipitated polymer, adhered to the inside of the flask, was rinsed several times with methanol and dried at 50° C. in a vacuum oven. The polymer had a pink color, and the yield of this process was 1.59 g.

Example 9

Characterization of Monomers and Intermediates

Various intermediates in above syntheses and monomers produced from above syntheses were characterized using $^1$H NMR and $^{19}$F NMR where applicable. The compound characterized and the results thereof are given below.

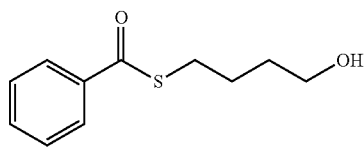 [SMILES: O=C(SCCCCO)c1ccccc1]

$^1$H NMR (CDCl$_3$, 300 MHz) δ 1.62-1.85 (m, 5H), 3.10 (t, J=7.0 Hz, 2H), 3.70 (t, J=6.0 Hz, 2H), 7.44 (dd, J=8.4, 7.5 2H), 7.56 (t, J=7.5 Hz, 1H), 7.96 (d, J=8.4 Hz, 2H).

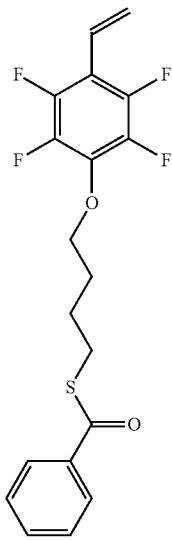 [SMILES: C=Cc1c(F)c(F)c(OCCCCSC(=O)c2ccccc2)c(F)c1F]

$^1$H NMR (CDCl$_3$, 300 MHz) δ 1.65-2.00 (m, 4H), 3.01 (t, J=7.2 Hz, 2H), 4.33 (t, J=6.3 Hz, 2H), 5.73 (d, J=12 Hz, 1H), 6.12 (d, J=18 Hz, 1H), 6.68 (dd, J=18, 12 Hz, 1H), 7.43 (dd, J=9.0, 7.4 Hz, 2H), 7.56 (t, J=7.4 Hz, 1H), 8.00 (d, J=9.0 Hz, 2H). $^{19}$F NMR (CDCl$_3$, 376 MHz) δ −143.37 (q, J=11.3 Hz, 2F), −135.44 (q, J=11.3 Hz, 2F).

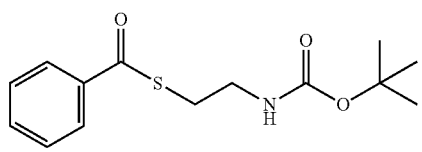 [SMILES: CC(C)(C)OC(=O)NCCSC(=O)c1ccccc1]

$^1$H NMR (CDCl$_3$, 300 MHz) δ 1.43 (s, 9H), 3.21 (t, J=6.3 Hz, 2H), 3.31-3.48 (m, 2H), 4.89 (br s, 1H), 7.45 (dd, J=9.0, 7.4 Hz, 2H), 7.58 (t, J=7.4 Hz, 1H), 7.96 (d, J=9.0 Hz, 2H).

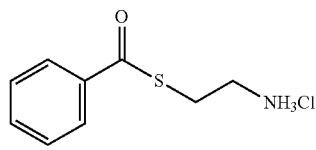

$^1$H NMR (DMSO, 300 MHz) δ 3.05 (t, J=7.0 Hz, 2H), 3.27-3.40 (m, 2H), 7.58 (dd, J=8.7, 7.4 Hz, 2H), 7.72 (t, J=7.4 Hz, 1H), 7.94 (d, J=8.7 Hz, 2H), 8.29 (br s, 3H).

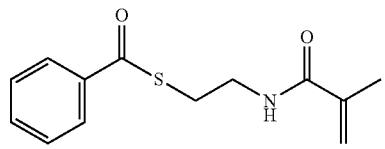 [SMILES: C=C(C)C(=O)NCCSC(=O)c1ccccc1]

$^1$H NMR (CDCl$_3$, 300 MHz) δ 1.94 (s, 3H), 3.23-3.34 (m, 2H), 3.56-3.66 (m, 2H), 5.30-5.36 (m, 1H), 5.68-5.74 (m, 1H), 6.35 (br s, 1H), 7.46 (dd, J=9.0, 7.4 Hz, 2H), 7.60 (t, J=7.4 Hz, 1H), 7.96 (d, J=9.0 Hz, 2H).

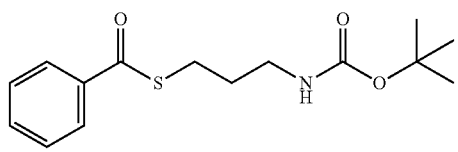 [SMILES: CC(C)(C)OC(=O)NCCCSC(=O)c1ccccc1]

$^1$H NMR (CDCl$_3$, 300 MHz) δ 1.44 (s, 9H), 1.78-1.92 (m, 2H), 3.10 (t, J=6.9 Hz, 2H), 3.21 (q, J=6.3 Hz, 2H), 4.90 (br s, 1H), 7.43 (dd, J=9.6, 7.4 Hz, 2H), 7.56 (t, J=7.4 Hz, 1H), 7.95 (d, J=9.6 Hz, 2H).

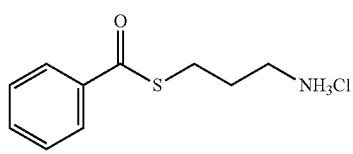

$^1$H NMR (DMSO, 300 MHz) δ 1.86-2.00 (m, 2H), 2.86 (br s, 2H), 3.14 (t, J=7.2 Hz, 2H), 7.57 (dd, J=9.0, 7.4 Hz, 2H), 7.70 (t, J=7.4 Hz, 1H), 7.93 (d, J=9.0 Hz, 2H), 8.14 (br s, 3H).

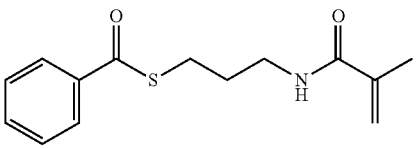 [SMILES: C=C(C)C(=O)NCCCSC(=O)c1ccccc1]

$^1$H NMR (CDCl$_3$, 300 MHz) δ 1.81-1.95 (m, 2H), 1.96 (s, 3H), 3.13 (t, J=6.8 Hz, 2H), 3.37 (q, J=6.3 Hz, 2H), 5.30-5.37 (m, 1H), 5.76-5.82 (m, 1H), 6.53-6.76 (br s, 1H), 7.43 (dd, J=8.3, 7.4 Hz, 2H), 7.56 (t, J=7.4 Hz, 1H), 7.94 (d, J=8.3 Hz, 2H).

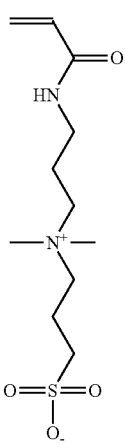

$^1$H NMR (D$_2$O, 300 MHz) δ 1.89-2.10 (m, 2H), 2.10-2.26 (m, 2H), 2.95 (t, J=7.0 Hz, 2H), 3.08 (s, 6H), 3.29-3.40 (m, 4H), 3.40-3.50 (m, 2H), 5.75 (dd, J=9.0, 2.4 Hz, 1H), 6.11-6.33 (m, 2H).

Example 10

Synthesis of tripentaerythritol allyl ether (compound 17 d, j=1)

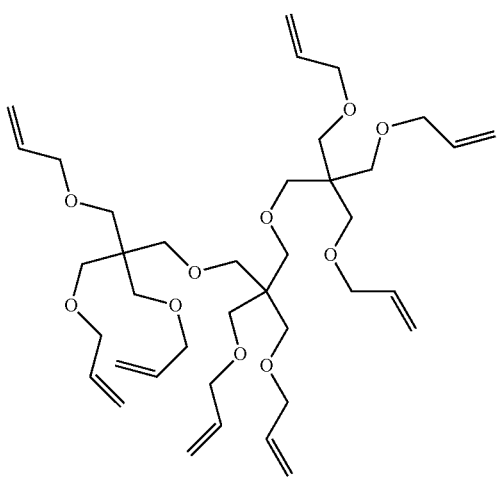 [SMILES: C=CCOCC(COCC=C)(COCC=C)COCC(COCC=C)(COCC=C)COCC(COCC=C)(COCC=C)COCC=C]

Synthesis of 6,6,10,10,14,14-hexakis((allyloxy)methyl)-4,8,12,16-tetraoxanonadeca-1,18-diene The compound of Formula 17d, where j=1 provides the compound 6,6,10,10,14,14-hexakis((allyloxy)methyl)-4,8,12,16-tetraoxanonadeca-1,18-diene. This compound can be synthesized from tripentaerythritol and allyl bromide Tripentaerythritol, allyl bromide, sodium hydride, and anhydrous dimethylformamide were purchased from Millipore-Sigma. Chloroform, Hexane, (HPLC grade), hydrochloric acid, sodium chloride and methanol were purchased from Fisher Scientific. Tripentaerythritol was dried overnight in a vacuum oven before use and all other reagents were used as received.

Tripentaerythritol (4.00 g, 0.0107 moles) was dissolved into 20 mL of dimethylformamide in a clear vial. In a 500 mL round bottom flask, sodium hydride (3.44 g, 0.143 moles) was added to 200 mL of 90:10 hexane:dimethylformamide. A stir bar was added to the reaction flask, the flask was capped with a septa and flushed with Argon. Tripentaerythritol in DMF solution was slowly added into the reaction flask using a syringe. The reaction was stirred for 30 minutes with slow Argon flow. The reaction was cooled in an ice bath, then allyl bromide (11 mL, 0.127 moles) was added into the flask slowly using a syringe. The reaction was stirred for 1 hour at 0° C. The ice bath was removed and the reaction stirred for an additional 3 hours. After 3 hours, the reaction was cooled to 0° C. and 20 mL of methanol was slowly added to quench any unreacted sodium hydride. Hexane was removed from the reaction flask by rotary evaporation, 300 mL chloroform was added and was transferred to a 500 mL reparatory funnel. The chloroform layer was washed successively with 100 mL 0.1M hydrochloric acid, 100 mL deionized water containing 5 mL hexanes, then twice with 50 mL saturated sodium chloride, and twice more with 100 mL deionized water containing 5 mL hexanes. The chloroform layer was dried over sodium sulfate, filtered and the chloroform was removed by rotatory evaporation. The crude reaction mixture was analyzed by $^1$H NMR analysis. In this or similar reactions wherein dimethylformamide was still present, it was removed by use of a vacuum pump and dry ice trap. The crude reaction mixture was purified by flash column chromatography over silica gel. The eluents used were first 300 mL of 80:20 hexane:ethyl acetate, followed by 300 mL of 50:50 hexane:ethyl acetate. This process yielded 1.5 g of desired product and indicated by $^1$H NMR spectrum.

Tripentaerythritol allyl ether: $^1$H NMR (CDCl$_3$, 300 MHz) δ 3.34-3.44 (m, 24H, C—CH$_2$—O), 3.93 (dt, 16H, J (H$_D$—H$_{AB}$)=1.2 Hz, J (H$_D$—H$_C$)=5.4 Hz], O—CH$_2$—CH=CH$_2$), 5.118 (dt, 8H, J (H$_B$—H$_D$)=1.7 Hz, J (H$_B$—H$_C$)=10.5 Hz, —CH=CH$_A$H$_B$), 5.232 (dt, 8H, J (H$_A$—H$_D$)=1.8 Hz, J (H$_A$—H$_C$)=17.2 Hz], —CH=CH$_A$H$_B$), 5.79-5.94 (m, 8H, CH$_2$—CH=CH$_2$)

Example 11

Surface Functionalization of Butyl Rubber with Dipentaerythritol Allyl Ether (Compound 17 b, j=1)

Coupon #1 (Control)

dipentaerythritol allyl ether 4.73 g was dissolved into 20 mL CHCl$_3$ to obtain a 0.36M solution. A butyl rubber coupon (487KE.TR-G, 1 cm×1.5 cm×0.18 cm Lot #201611620018) was soaked in this solution for 60 minutes. The coupon was removed from this solution and tested for concentration of carbon-carbon double bonds by the method for determining concentration of double bonds. The absorbance was measured to be 0.863 which indicates a high concentration of double bonds had adsorbed to the rubber.

Coupons #2 and #3

Two butyl rubber coupons (487KE.TR-G, 1 cm×1.5 cm×0.18 cm Lot #201611620018) were added to a vial containing 5 mL of 0.36M dipentaerythritol allyl ether (compound 17b, j=1) solution with 2,2'-Azobis(2-methylpropionitrile) (AIBN), (0.000054 mole). The vial was heated heated at 72° C. for 4 hours while the rubber coupon was soaked in the solution. Coupon #2 was not washed and coupon #3 was washed with CHCl$_3$. The wash procedure consisted of placing coupon #3 into 20 mL of CHCl$_3$, capping the vial with Teflon® lined cap and shaking the vial for 5 minutes while on an orbital shaker on medium speed. This wash procedure was repeated twice with fresh CHCl$_3$ for a total of three washes. The coupons were tested for concentration of carbon-carbon double bonds using the method for determining concentration of double bonds. The absorbance was measured to be 0.92 for the unwashed coupon #2 and 0.853 for the washed coupon #3. This example indicates that surface reagent (compound 17b, j=1) is attached to the rubber at a high concentration and that double bonds on the rubber surface are available for further reaction.

Example 12

Quantitation of Double Bonds on Unmodified Butyl Rubber

An unmodified Butyl Rubber coupon (1.5×1 cm) was washed with chloroform (3×10 mL, 4 minutes each) and subjected to the test protocol outlined in the method for determining concentration of double bonds. The concentration of double bonds on the surface of unmodified rubber was determined to be 0.006 millimoles per 1.5×1 cm coupon.

Example 13

Attachment of dipentaerythritol allyl ether (Compound 17b, j=1) to Butyl

Rubber and Quantitation of Double Bonds on Surface Modified Rubber

A Butyl Rubber coupon (1.5×1 cm) was placed in a 20-mL vial. To the vial was added 2 mL of 0.25 M dipentaerythritol allyl ether (compound 17b, j=1) in chloroform. To this solution was added 30 mg of AIBN. The vial was heated at 70° C. for 15 hrs. After 15 hours, the coupon was removed and washed with chloroform (3×10 mL) for 4 minutes each. The coupon was left to dry in ambient conditions overnight. The concentration of double bonds on the rubber surface was measured using the test outlined in the method for determining concentration of double bonds above to be 0.017 millimoles per 1.5×1 cm coupon

Example 14

Attachment of tripentaerythritol allyl ether (Compound 17d, j=1) to EPDM Rubber and Quantitation of Double Bonds on Surface Modified Rubber An EPDM coupon (1.5×1 cm) was placed in a 20-mL vial, to the vial was added 2 mL of 0.25 M tripentaerythritol allyl ether (compound 17d, j=1) in chloroform. To this solution was added 30 mg of AIBN. The vial was heated at 70° C. for 15 hours. After 15 hours, the EPDM coupon was removed and washed with chloroform (3×10 mL) for 4 minute each. The coupons were left to dry in ambient conditions. The concentration of double bonds on the rubber surface was measured using the test outlined in the method for determining concentration of double bonds above to be 0.016 millimoles per 1.5×1 cm coupon. The concentration of double bonds on unmodified EPDM coupon was determined to be 0.002 mmol per 1.5×1.0 cm coupon, using the procedure to quantify double bonds.

Example 15

Surface Functionalization of Butyl Rubber with 1,2,4 trivinyl cyclohexane (TVCH)

Two 1.5×1 cm coupons of Butyl Rubber were each placed in 10 mL of a 1:1 TVCH/CHCl3 solution. To one solution was added 3 mg (0.06 mol %) AIBN. Both solutions were heated for 4 hours at 72° C. The coupons were then each washed with chloroform (3×10 mL) for 5 minutes each time. The coupons were left to dry in ambient conditions overnight. The coupons were subjected to analysis using the method for determining concentration of double bonds, with a bromine/chloroform solution. The absorbance obtained from the coupon modified with TVCH/AIBN was 1.375, the absorbance obtained from the coupon modified with TVCH/ no AIBN was 1.133, while the absorbance obtained from the unmodified rubber coupon was 0.243. The high absorbance after washing with chloroform, indicates that TVCH is attached to the butyl rubber coupon regardless of whether or not AIBN was used in the attachment reaction.

Example 16

Surface Functionalization of Butyl Rubber with 1,4-butanediol diacrylate, 1,7-octadiene and N,N'-hexamethylenebis(methacrylamide)

The same procedure for surface reagent functionalization of butyl rubber, in Example 12 was followed to attach a diacrylate, a dimethacrylamide, or a diene. Each of the 3 corresponding coupons were washed with chloroform (3×10 mL) for 5 minutes each and left to dry overnight. The coupons were analyzed using FTIR-ATR. The spectrum of the modified rubber coupon was compared to that of an unmodified butyl rubber coupon and the results are summarized 1,4-butanediol diacrylate: after treatment as described above, a peak appeared at 1734 cm$^{-1}$ which is indicative of C=O stretching of an ester. The presence of an ester after washing indicated 1,4-butanediol diacrylate was attached to the butyl rubber coupon.

1,7-octadiene: The changes in the FTIR of butyl rubber modified with 1,7-octadiene were subtle, subtraction of the neat butyl rubber spectrum revealed an increase in absorbance at 991 and 1097 cm-1 which are frequencies associated with vinyl C—H bending. Their presence after washing indicated that 1,7-octadiene was attached to the butyl rubber coupon.

N,N'-hexamethylene bis(methacrylamide): modified rubber was compared to neat butyl rubber, when the IR spectrum of neat butyl rubber was subtracted from the spectrum of modified butyl rubber two peaks in the carbonyl region appear; one at 1651 cm$^{-1}$ corresponding to the C=O amide I band and the other at 1613 cm$^{-1}$ corresponding to the N—H bending amide II band. A peak at 1526 cm$^{-1}$ corresponds to C—N stretching and two peaks at 1049 and 996 cm$^{-1}$ corresponds to vinylic C—H bending. All peaks corresponded to the presence of methacrylamide groups, their presence after washing with chloroform indicated attachment of N,N'-hexamethylene bis(methacrylamide) to the butyl rubber coupon.

Example 17

Surface Functionalization of Rubber Coupons with dipentaerythritol allyl ether (Compound 17b, j=1)

A 2.5 cm×2.5 cm×0.08" coupon of butyl rubber was washed with an IPrOH-saturated texwipe and allowed to dry for 20 minutes. The coupon was then added to a 4 oz jar containing dipentaerythritol allyl ether (0.43 g, 1.15 mmol), AIBN (144 mg, 0.877 mmol, recrystallized from methanol) and hexanes (35 ml). The jar was sealed with a PTFE-lined phenolic cap and heated overnight at 70° C. in an oil bath. In the morning, the coupon was washed in 20 mL of CHCl$_3$ (three times each for 5 minutes) on an orbital shaker and then dried for several hours under vacuum at 50° C.

Example 18

Synthesis of Zwitterionic Copolymer Containing SBMAam and N-butylmethacrylamide with Free Thiol, Formula 16n Synthesis of N-butylmethacrylamide:

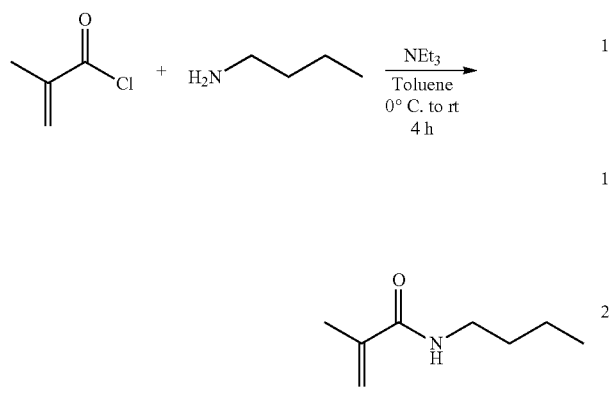

Formula 8h

To a solution of methacryloyl chloride (5.00 ml, 51.25 mmol, 1.0 equiv.) in toluene (20.5 ml) at 0° C. was added dropwise a mixture of N-butylamine (6.08 ml, 61.5 mmol, 1.2 equiv.) and triethylamine (10.0 ml, 71.75 mmol, 1.4 equiv.). The solution was warmed slowly to room temperature over 4 hours while stirring. The reaction mixture was filtered and the filtrate transferred to a separatory funnel. The organic layer was washed with 0.5N HCl (×2), saturated NaHCO$_3$ (×2), H$_2$O (×2) and brine (×2) and then dried over Na$_2$SO$_4$ and then concentrated under reduced pressure. The crude reaction mixture was purified by flash column chromatography (80:20 hexanes:EtOAc to 90:10 CHCl$_3$:MeOH) gradient to yield N-butylmethacrylamide (Formula 8h) (3.55 g, 25.1 mmol, 49%) as a yellow oil. $^1$H NMR (CDCl$_3$, 300 MHz) δ 0.88 (t, J=7.4 Hz, 3H), 1.24-1.39 (m, 2H), 1.41-1.54 (m, 2H), 1.91 (s, 3H), 3.20-3.30 (m, 2H), 5.22-5.28 (m, 1H), 5.60-5.66 (m, 1H), 6.01 (br s, 1H).

Synthesis of Zwitterionic Copolymer Containing SBMAam and N-butylmethacrylamide, Formula 16m.

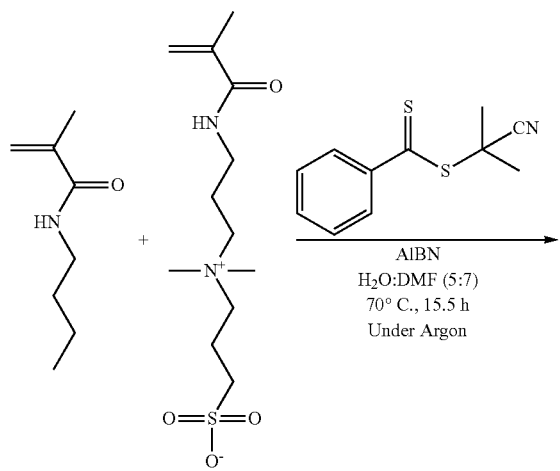

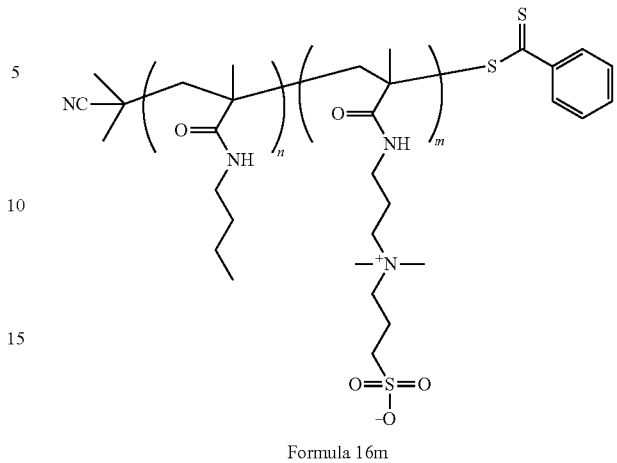

Formula 16m

To a polymerization tube was added SBMAam (3.111 g, 10.64 mmol), N-butylmethacrylamide (Formula 8h) (64.4 mg, 4.56 mmol), 2-cyanoprop-2-yldithiobenzoate (112.2 mg, 0.507 mmol), and AIBN (74.8 mg, 0.455 mmol, recrystallized from methanol). To the SBMAam, N-butylmethacrylamide, CTA and AIBN was added a 5:7 H$_2$O:DMF solution (24 ml) and the polymerization tube was capped with a Teflon™ screwcap having gas inlet/outlet hose connectors and the solution was stirred at room temperature using a hotplate stirrer. After argon was gently streamed through the tube for 4 hours at room temperature, the tube was sealed with a solid Teflon™ screwcap and the reaction mixture was heated at 70° C. for 15.5 hours using an oil bath with stirring. When the heating period was complete, the entire reaction mixture was transferred to 3.5 kD MWCO tubing and dialyzed against deionized water for 72 hours. After the dialysis period was complete, the reaction mixture was concentrated under reduced pressure, furnishing the polymer (2.89 g, 75%) (Formula 16m) as a pink solid. The structure of the polymer, as seen above, was confirmed by NMR analysis (D$_2$O). The presence of N-butylmethacrylamide and SBMAam in the copolymer was confirmed by the combination of 1) Peaks observed in the $^1$H NMR spectrum and 2) the copolymer was very water soluble even more readily water soluble than the zwitterionic homopolymer. A homopolymer of N-butylmethacrylamide would be water insoluble. Many of the peaks from N-butylmethacrylamide were located underneath peaks corresponding to SBMAam and therefore were not visible. The visible peaks for the N-butylmethacrylamide monomer along with peaks for SBMAam are reported: $^1$H NMR (D$_2$O, 300 MHz) δ SBMAam peaks: 0.60-1.90 (—CH$_3$ and —CH$_2$ on/in backbone), 1.90-2.08 (—CON—C—CH$_2$—C—N$^+$), 2.08-2.33 (N$^+$—C—CH$_2$—C—SO$_3$), 2.91-3.01 (CH$_2$—SO$_3$), 3.02-3.25 (N$^+$—CH$_3$, CON—CH$_2$), 3.27-3.40 (CON—C—C—CH$_2$—N$^+$), 3.40-3.57 (N$^+$—CH$_2$—C—C—SO$_3$). N-butylmethacrylamide peaks: 1.19-1.34 (N—C—C—CH$_2$—C), 1.39-1.52 (N—C—CH$_2$—C—C). Due to peak overlaps of the monomers, a molar ratio cannot be perfectly calculated, but integration of the butyl peaks against the CH$_2$—SO$_3$ peak shows a 20-30% incorporation of N-butylmethacrylamide.

Aminolysis of SBMAam-co-N-butylmethacrylamide:

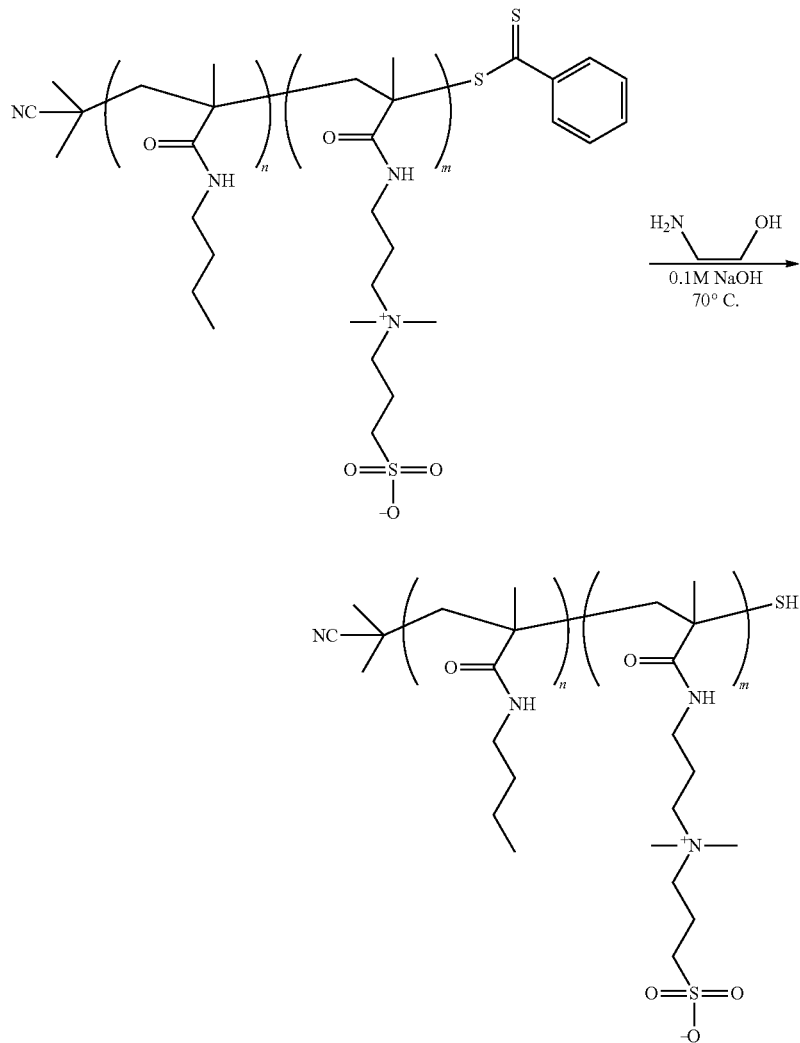

Formula 16n

To a round bottom flask containing SBMAam-co-N-butylmethacrylamide (2.00 g) (Formula 16m) was added 0.1M NaOH (33 ml). The flask was sealed with a silicone sleeve stopper and the solution stirred at room temperature for 30 minutes while argon was streamed through the flask via needles penetrating the stopper. Ethanolamine (1.6 ml, 26.50 mmol) was added and the solution stirred for another 30 minutes at room temperature under streaming argon. The needles were then removed and the flask placed in an oil bath preheated to 70° C. The reaction progress was monitored hourly by Ellman assay. Once Ellman assay readings were unchanging over time, the reaction mixture was concentrated under reduced pressure and reprecipitated (×7) from IPrOH/H$_2$O, decanting the mother liquor after each reprecipitation to yield zwitterionic copolymer, Formula 16n. Many of the peaks from N-butylmethacrylamide were located underneath peaks corresponding to SBMAam and therefore were not visible. The visible peaks for the N-butylmethacrylamide monomer along with peaks for SBMAam are reported: $^1$H NMR (D$_2$O, 300 MHz) δ SBMAam peaks: 0.60-1.90 (—CH$_3$ and —CH$_2$ on/in backbone), 1.90-2.09 (—CON—C—CH$_2$—C—N$^+$), 2.08-2.45 (N$^+$—C—CH$_2$—C—SO$_3$), 2.88-3.01 (CH$_2$—SO$_3$), 3.02-3.26 (N$^+$—CH$_3$, CON—CH$_2$), 3.27-3.41 (CON—C—C—CH$_2$—N$^+$), 3.41-3.59 (N$^+$—CH$_2$—C—C—SO$_3$). N-butylmethacrylamide peaks: 1.21-1.37 (N—C—C—CH$_2$—C), 1.37-1.53 (N—C—CH$_2$—C—C).

Example 19

Modification of Butyl Rubber by Polyzwitterion Homopolymer, (Formula 14f) and FTIR Surface Analysis of the Modified Coupon.

Surface functionalization of Butyl Rubber with dipentaerythritol allyl ether (compound 17b, j=1 2 mL of a 0.25M solution of dipentaerythritol allyl ether in chloroform was added to a 20 mL vial along with 2.5 mg of AIBN. A 1×1.5 cm butyl rubber coupon was added to the vial and heated at 70° C. for 4 hrs. The coupons were removed and washed with chloroform (3×10 mL) for 4 minutes on a shaker (speed 4). The coupon was left to dry overnight before attaching polymer.

Attachment of Polyzwitterion Homopolymer (Formula 14f) to Butyl Rubber Treated with dipentaerythritol allyl ether (compound 17b, j=1)

0.120 g of SBMAam polyzwitterion, (Formula 14f) that was synthesized using the RAFT agent 4-cyano-4-[(ethyl sulfanylthiocarbonyl)sulfanyl]pentanoic acid (Formula 11c) was dissolved in 2 mL of 0.1M NaOH in deionized water. The mixture was stirred while purging with argon for 30 minutes. 0.1 mL of methylamine (33 wt % in ethanol) was added via syringe to the reaction mixture. The mixture was stirred for 1 hour at room temperature, the sulfhydryl concentration was quantified as described above in the Ellman's Assay procedure. The sulfhydryl concentration was 13.0 mM.

The aqueous reaction mixture was then washed with n-hexanes (3×3 mL) to eliminate low molecular weight (MW) thiols that may have been produced. The sulfhydryl concentration was again tested (as described above in the Ellman's Assay procedure) and determined to be 12.4 mM, showing that a negligible amount of low MW thiols were produced. The aqueous layer was transferred to a vial and 0.06 g of AIBN and a 1×1.5 cm butyl rubber coupon previously treated with the dipentaerythritol allyl ether was added to the vial. The vial was purged with argon for 30 minutes. The vial was capped and heated at 100° C. for 15 hrs, after which time the Sulfhydryl concentration had dropped to 5.5 mM. The coupon was removed and washed three times with deionized water (10 mL) in a vial placed on a shaker (4 minutes, speed 5).

The rubber coupon was readily wettable when removed from the wash water (coupon was completely wet, no beading of water). The coupon was dried with a paper towel and a 15 µl drop of deionized water was placed on the rubber coupon; the water droplet spread out and had a contact angle of <10°. The water contact angle for a control coupon which has not been surface modified was much higher and the surface was not wetted by the water. The coupon was placed in an oven at elevated temperature for 4 hours and upon removal the coupon was no longer wet when dipped in water. The coupon was submerged in deionized water overnight and was once again readily wet when dipped in water. The coupon remained readily wet after being scraped with a razorblade to remove the residue and also after being bent and manipulated.

The surface modified rubber was analyzed using Attenuated Total Reflection—Fourier Transform Infrared spectroscopy, ATR FTIR.

Spectra of untreated butyl rubber and polyzwitterion homopolymer surface modified rubber were obtained and after subtracting the IR spectrum of untreated butyl rubber, the appearance of several peaks were noted. A peak at 1644 corresponded to the C=O stretching of amide groups in the polyzwitterion homopolymer backbone. A shoulder peak at 1203 cm$^{-1}$ was indicative of S=O stretching in the SBMAam units as well as the shoulder peak at 1052 cm$^{-1}$ which was due to the SO3$^-$ vibrations. Sharp peaks at 1082 cm$^{-1}$ and 915 cm$^{-1}$ were observed, indicating C—H bending of unreacted vinylic groups on the coupon.

Example 20

Modification of Butyl Rubber with Sulfur Containing Polyzwitterionic Copolymers (Formula 16b) without Prior Functionalization with a Surface Reagent.

A 1.5 cm×1.0 cm coupon of unmodified butyl rubber was washed forcefully under hot tap water and then placed in a vial. To the same vial were added the polymer (Formula 16b) (0.180 g) and AIBN (0.101 g, 0.615 mmol). The vial was sealed with an inverted rubber septum and the air atmosphere replaced with argon. In a separate vial was prepared a stock solution of 0.2M NaOH (9 ml) and CH3NH2 (0.45 ml of a 33 wt % solution in ethanol) that was purged with argon for several hours. 3.15 ml of this solution were transferred to the vial containing the rubber coupon, polymer prepared according to Scheme 3c and AIBN. The vial containing the rubber coupon was then placed on a shaker for 1 hour, after which the septum was quickly replaced with a PTFE-lined cap. This vial was heated at 100° C. for 14 hours and then allowed to cool. The coupon of rubber was removed, sprayed with isopropanol, and placed in a new 20 ml scintillation vial, which was filled completely with deionized water and placed on a shaker for 10 minutes. The water was then removed and the coupon sprayed with deionized water. After the wash process was repeated twice more, the coupon was removed from the vial, sprayed with deionized water, and placed on end in a new vial, which was placed in a vacuum oven for four hours at 70° C.

After drying, the coupon was swirled in deionized water for 30 seconds and then removed and held in a vertical position. On one side of the coupon, the water did not bead in comparison to a control coupon. The wettability of this side indicated successful attachment of the polymer.

Example 21

Modification of Butyl Rubber by Polyzwitterion Copolymer, SBMAam-co-N-acryloylcysteamine Formula 16l, after Functionalization with Dipentaerythritol Allyl Ether (Compound 17b, j=1) and Anti-Biofilm Results.

A 2.5 cm×2.5 cm×0.08" coupon of butyl rubber (XF487KE.TR-G172890146) was modified using the procedure described in example 17.

Attachment of polyzwitterion copolymer SBMAam-co-N-acryloylcysteamine (Formula 16l) to butyl rubber modified with dipentaerythritol ally ether (compound 17b, j=1)

To a 50 ml Erlenmeyer flask were added 100 mg of SBMAam-co-N-acryloylcysteamine (Formula 16l) and AIBN (66 mg) and the UCC modified butyl rubber coupon above. A silicone sleeve stopper was placed upside down atop the Erlenmeyer and held securely in place using copper wire. 19.9 ml of deionized water were added via syringe while argon was streaming through the flask. Argon was streamed through the flask for 1 hour. After the argon supply was removed, the Erlenmeyer flask was lowered into an oil bath which was preheated to 85° C. The following morning, the coupon was removed from the Erlenmeyer flask and placed in a 4 oz jar with 35 ml of deionized water. The jar was placed in a preheated oil bath at 70° C. and left to sit for 24 hours. This soaking period was followed by washing 3×10 minutes in deionized water on the shaker. After drying for several minutes, a water drop placed on the surface of the rubber quickly spread across a very large area. The zwitterionic modified coupon was tested according to the procedure for determining % CFU/cm$^2$ reduction and showed a 90% reduction in *P. aeruginosa* compared to a control.

Example 22

Modification of Butyl Rubber by Zwitterionic Copolymer Containing SBMAam and N-butylmethacrylamide, Formula 16n after Functionalization with Dipentaerythritol Allyl Ether (Compound 17b, j=1) and Anti-Biofilm Results.

A 2.5 cm×2.5 cm×0.08" coupon of butyl rubber (XF487KE.TR-G172890146) was modified according to the procedure described in example 17.

Attachment of polyzwitterion copolymer containing SBMAam and N-butylmethacrylamide, (Formula 16n) to butyl rubber modified with dipentaerythritol ally ether (compound 17b, j=1)

The above UCC modified coupon was soaked for 20 minutes in a solution of AIBN in acetone (10 mg/ml) and then dried in air for 20 minutes. A viscous solution of SBMAam-co-N-butylmethacrylamide, Formula 16n, in water was then spread on the surface of the coupon. The thin film was rubbed with a pipet until it became glassy. The coupon was then placed in the oven overnight at 111° C. in a non-humid environment. In the morning, the coupon was washed 3 times for 10 minutes on the shaker in deionized water. After the washings, it was observed that water could sheet well on the surface of the coupon, but a sessile drop test showed a high water contact angle. The zwitterion modified coupon was tested according to the procedure for determining % CFU/cm$^2$ reduction and showed a 48% reduction in *P. aeruginosa* compared to a control.

Example 23

Modification of Butyl Rubber by Zwitterionic SBMAam Polymer, Formula 14i, after Functionalization with Polybutadiene and Anti-Biofilm Results.

1 g of polybutadiene (90 wt % 1,2-vinyl, Sigma Aldrich) was dissolved in 35 mL of hexane in a 4 oz jar. 0.150 g of AIBN was added along with a 2.5×2.5 cm×0.2 cm coupon of butyl rubber (487KE.TR.G Lot #1728920146). The solution was heated at 70° C. overnight. The coupon was rinsed 3 times with chloroform then dried under vacuum in an oven at 50° C. for 4 hrs.

The polybutadiene modified coupon was soaked in a solution of AIBN/Acetone (10 mg/mL) for 20 minutes, removed and dried in ambient air for 20 minutes. A viscous gel of zwitterionic SBMAam polymer (Formula 14i) in water was spread over the surface and the coupon was heated at 110° C. for 15 hrs. The coupon was rinsed 3×10 mins with deionized water (20 mL). The zwitterion modified coupon was tested according to the procedure for determining % CFU/cm$^2$ reduction and showed an 89.0% reduction in *P. aeruginosa* compared to a control.

Example 24

Modification of Butyl Rubber by Zwitterionic SBMAam Homopolymer, Formula 14i, after Functionalization with Butadiene Styrene Copolymer (Ricon 100) and Anti-Biofilm Results.

1 g of Ricon 100 (Total Petrochemicals & Refining USA, Cray Valley,) was dissolved in 35 mL of hexane in a 4 oz jar. 0.150 g of AIBN was added along with a 2.5×2.5 cm×0.2 cm coupon of butyl rubber (487KE.TR.G Lot #1728920146). The solution was heated at 70° C. overnight. The coupon was rinsed 3 times with chloroform then dried under vacuum in an oven at 50° C. for 4 hrs.

The Ricon 100 modified coupon was soaked in a solution of AIBN/Acetone (10 mg/mL) for 20 minutes, removed and dried in ambient air for 20 minutes. A viscous gel of SBMAam polymer in water was spread over the surface and the coupon was heated at 110° C. for 15 hrs. The coupon was rinsed 3×10 mins with deionized water (20 mL). The zwitterion modified coupon was tested according to the procedure for determining % CFU/cm$^2$ reduction and showed a 72.3% reduction in *P. aeruginosa* compared to a control.

Example 25

Modification of Nitrile Rubber by Polyzwitterion Copolymer, SBMAam-co-N-acryloylcysteamine Formula 16l, after Functionalization with Dipentaerythritol Allyl Ether (Compound 17b, j=1) and Anti-Biofilm Results.

A coupon of NBR (S536EG lot 201633520006 2.5 cm×2.5 cm×0.2 cm) was modified according to the procedure described in example 22. A solution of 80:20 v/v hexanes:toluene (35 ml) was used instead of hexanes as the reaction solution.

The dipentaerythritol ally ether coupon described above was added to a 50 ml Erlenmeyer flask which contained SMBA-co-N-acryloyl cysteamine (100 mg) and AIBN (66 mg, 0.402 mmol). The Erlenmeyer flask was sealed with an upside down silicone sleeve stopper, which was tied on tightly with copper wire. H$_2$O (19.9 ml) was added via syringe with argon was streamed through the flask. After streaming argon through the flask for one hour at room temperature, the argon flow was stopped and the flask placed in an oil bath preheated to 85° C. The reaction was left in the oil bath overnight. In the morning, the coupon was moved to a 4 Oz jar containing 35 ml of deionized water and the jar sealed with a PTFE-lined phenolic cap. The jar was then placed in at oil bath preheated to 70° C., where it remained for 24 hours. The coupon was then washed three times for 10 minutes each in deionized water on the shaker. After it was allowed to dry, a water drop placed on the surface spread out quickly. The zwitterion modified coupon was tested according to the procedure for determining % CFU/cm$^2$ reduction and showed a 74.7% reduction in *P. aeruginosa* compared to a control.

Example 26

Modification of EPDM Rubber by Zwitterionic SBMAam Homopolymer, Formula 14i after Functionalization with Dipentaerythritol Allyl Ether (DPA) (Compound 17b, j=1) and Anti-Biofilm Results.

A 2.5×2.5 cm×0.2 cm EPDM coupon (XS558CH.LS-A Lot #201726820091) was modified according to the procedure described in example 22, except 6:1 methyl ethyl ketone/methanol replaced hexanes as the reaction solution.

The DPA modified coupon was placed in a solution of AIBN/Acetone (10 mg/mL) and soaked for 20 minutes, removed and left to dry in ambient air for 20 minutes. The coupon was then coated with a thin film of a viscous SBMAam polymer/water solution. Coupon was heated at 110° C. for 15 hrs. The coupon was washed 3 times 10 minutes each with deionized water (20 mL) on an orbital shaker. The antibiofilm properties were tested using the biofilm reactor method, An EPDM coupon modified with DPA and zwitterionic SBMAam homopolymer gave a 48.9% reduction in bacterial growth compared to a control.

Example 27

Modification of Butyl Rubber with Sulfur Containing Polyzwitterionic Copolymers (Formula 16b) with Prior Functionalization with a Surface Reagent.

A 1.5 cm×1.0 cm coupon of dipentaerythritol allyl ether treated butyl rubber prepared as described in Example 10, polymer (Formula 16b) (0.180 g, prepared according to Scheme 3c), and AIBN (0.101 g, 0.615 mmol) were added to a 20 ml scintillation vial. The vial was sealed with an inverted rubber septum and the air atmosphere replaced with argon. In a separate vial was prepared a stock solution of 0.2M NaOH (9 ml) and $CH_3NH_2$ (0.45 ml of a 33 wt % solution in ethanol) that was purged with argon for several hours. 3.15 ml of this solution were transferred to the vial containing the rubber coupon, polymer and AIBN. The vial containing the rubber coupon was then placed on a shaker for 1 hour, after which the septum was quickly replaced with a PTFE-lined cap. This vial was heated at 100° C. for 14 hours and then allowed to cool. The coupon of rubber was removed, sprayed with isopropanol, and placed in a new 20 ml scintillation vial, which was filled completely with deionized water and placed on a shaker for 10 minutes. The water was then removed and the coupon sprayed with deionized water. After the wash process was repeated twice more, the coupon was removed from the vial, sprayed with deionized water, and placed on end in a new vial, which was placed in a vacuum oven for four hours at 70° C.

After drying, the coupon was swirled in deionized water for 30 seconds and then removed and held in a vertical position. On one side of the coupon, the water did not bead in comparison to a control coupon. The wettability of this side indicated successful attachment of the polymer. Additionally, application of the bromine test, from the method for determining concentration of double bonds, to this coupon after attachment demonstrated that approximately 0.0148 millimoles of double bonds were present on the coupon. A control coupon bore approximately 0.0253 millimoles of double bonds. The reduced number of double bonds after the attachment reaction indicated polymer attachment.

Example 28

Modification of Glass with Polyzwitterion Homopolymer 0.120 g of SBMAam homopolymer, that was synthesized using the RAFT agent 4-cyano-4-[(ethylsulfanylthiocarbonyl)sulfanyl]pentanoic acid (Formula 11c) was dissolved in 2 mL of 0.1M NAOH in deionized water. The mixture was stirred while purging with argon for 30 minutes. 0.1 mL of methylamine (33 wt % in Ethanol) was added via syringe to the reaction mixture. The mixture was stirred for 1 hr at room temperature, the sulfhydryl concentration was quantified by reacting 10 μL of the reaction mixture with excess DTNB and analyzing the color change using a UV-vis spectrometer. The sulfhydryl concentration was 11.4 mM.

A 19×8×1 mm glass coupon was cut from a 3"×1"×1 mm glass microscope slide (Propper manufacturing co., Inc.) The glass coupon was washed in with IPA (10 mL) left to dry for 20 minutes in ambient air. The glass coupon was then placed in the vial containing aminolyzed polymer along with 60 mg of AIBN. The vial was purged with argon for 30 minutes, then capped and heated @85° C. for 16 hours. The coupon was removed and washed three times with deionized water (10 mL) in a vial placed on a shaker (4 minutes, speed 5) to remove unbound polyzwitterion.

The glass coupon showed a slight color change, showing a yellowish hue. The coupon was dried with a paper towel and a 5 μl drop of deionized water was placed on the modified glass coupon; the water droplet spread out and had a low contact angle The water contact angle for a control glass coupon which has not been surface modified was higher and the surface was not wetted by the water.

Example 29

Biofilm Testing 3 butyl rubber coupons (487KE.TR-G, 2.5×2.5 cm×0.18 cm Lot #1629820014 NPC) were modified with polyzwitterion homopolymer as in Example 16, except the amount of reagents and volume of solvents were increased by 4×. The modified butyl rubber coupons were washed with cold tap water and placed in 8"×6"×2" (1.5 L) pyrex dish. 20 unmodified butyl rubber coupons (487KE.TR-G, 2.5×2.5 cm×0.18 cm Lot #1629820014 NPC) were washed with isopropyl alcohol, then washed with cold tap water, then placed in the pyrex dish as controls. 600 mL of cold tap water (Saint Paul Regional Water Services, obtained Feb. 24, 2017) was treated with 36 μL of 3% hydrogen peroxide (Target Corp.) to dechlorinate the tap water. The treated tap water was then gently poured into the pyrex dish containing modified butyl rubber coupons and unmodified butyl rubber coupons. The modified butyl rubber coupons were dispersed among the unmodified coupons in the aqueous system and incubated at 35° C. for 6 days. The biofilm formation was then tested according to the ATP test procedure outlined below. The average relative amount of ATP given in Relative Light Units (RLU) was 71 RLUs for the unmodified butyl rubber coupons and 6 RLUs for the modified butyl rubber coupons, showing greater than a 10-fold reduction on the modified coupons. The amount of ATP gave a measure of the amount of biological material on the surface of the coupon, the decrease of ATP on the modified coupons suggested a corresponding decrease in the amount of biofilm on the coupon.

ATP Test Procedure:

ATP test swabs (Hygiena UltraSnap™) were removed from the refrigerator and allowed to warm to r.t.

Flame sterilized forceps were used to remove a coupon from the aqueous solution

A coupon was dipped into 20 mL of sterilized 0.05 M pH 7.5 phosphate buffer in a sterile conical centrifuge tube to remove unattached cells, and immediately removed.

The coupon was then place on a paper towel, with the water facing surface placed facing up An ATP test swab was then used swab the top surface of the coupon, the swab is continuously rotated, swabbing vertically across the coupon and then horizontally, covering the entire face of the coupon.

The ATP test was then conducted per the manufactures instructions using a luminometer (Hygiena SystemSURE Plus™).

The ATP test results were given in relative light units (RLU)

TABLE 1

RLU values for 2.5 × 2.5 cm butyl rubber coupons that are unmodified, modified in the brush configuration and modified in the network configuration with polyzwitterions. RLU gives an indication of the amount of ATP on the surface of the coupons, which is correlated with biological content

| Sample | RLU |
| --- | --- |
| Unmodified | 67 |
| Unmodified | 222 |
| Unmodified | 65 |
| Unmodified | 80 |
| Modified - Brush Configuration | 6 |
| Modified - Brush Configuration | 5 |
| Modified - Network Configuration | 23 |

Figure 4:
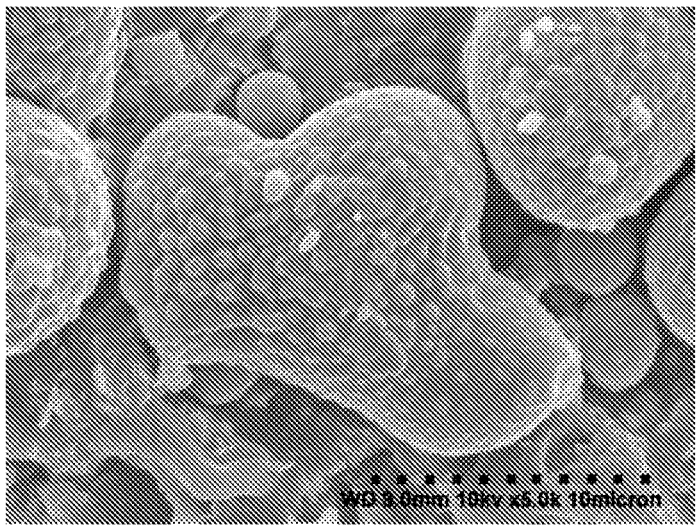
FIG. 4 is a SEM photograph of a butyl rubber coupon that was unmodified

FIG. 4 shows formation of bubbles on the surface of unmodified butyl rubber coupons and the lack of bubbles on modified coupons submerged in water after 5 days of incubation. Butyl rubber coupons modified with polyzwitterion in the brush configuration showed at least a 10 fold decrease in the amount of biofilm formed after 6 days of incubation compared to unmodified butyl rubber. The butyl rubber coupons that were modified with polyzwitterion in the network configuration showed a 67% decrease in biofilm compared to unmodified butyl rubber.

Example 30

Biocompatibility of Butyl Rubber Modified by Zwitterionic SBMAam Homopolymer, Formula 14g, after Functionalization with Dipentaerythritol Allyl Ether (DPA) (Compound 17b, j=1).

Four 2.5×2.5×0.2 cm butyl rubber coupons (487KE.TR-G, lot #162982001411) were each placed in a separate 4 oz Jar. To each Jar was added 12 mL of 0.17 M dipentaerythritol allyl ether (compound 17b, j=1) in hexane. To this solution was added 40 mg of AIBN. The jar was heated at 70° C. for 15 hrs. After 15 hours, the coupon was removed and washed with chloroform (3×20 mL) for 5 minutes each. The coupon was dried under vacuum in a vacuum oven at 50° C. for at least 4 hours prior to further treatment.

1.92 g of SBMAam polyzwitterion, (Formula 14f) that was synthesized using the RAFT agent 4-cyano-4-[(ethylsulfanylthiocarbonyl)sulfanyl]pentanoic acid (Formula 11c) was dissolved in 32 mL of 0.1M NaOH in deionized water. The mixture was stirred while purging with argon for 30 minutes. 0.4 mL of methylamine (33 wt % in ethanol) was added via syringe to the reaction mixture. The mixture was stirred for 1 hr at room temperature. 8 mL of the solution was transferred to 4 separate Erlenmeyer flasks, each containing 240 mg AIBN and a butyl rubber coupon modified with dipentaerythritol allyl ether (compound 17b, j=1) as described above. The Erlenmeyer flask was purged with argon for 30 minutes. The flask was then heated at 80° C. for 15 hrs. The coupons were removed and washed three times with deionized water (20 mL) in a 7 oz Jar placed on a shaker (5 minutes, speed 5).

The above described modified butyl rubber coupons were submitted for Biocompatibility testing (WuXi AppTec, St. Paul, MN) ISO MEM Elution Using L-929 Mouse Fibroblast Cells (Cytotoxicity). The results demonstrated that butyl rubber modified with dipentaerythritol allyl ether followed by attachment of zwitterionic SBMAam homopolymer is not cytotoxic per ISO 10993-5: 2009.

Example 31

Physical Properties of Butyl Rubber Modified by Zwitterionic SBMAam Polymer, Formula 14i, after Functionalization Dipentaerythritol Allyl Ether (DPA) (Compound 17b, j=1).

A 4 cm×13.5 cm coupon of butyl rubber (487KE.TR-G 201721520171) was cut, washed with an IPrOH-saturated texwipe, and left to dry for 20 minutes. The coupon was placed in a stainless steel vessel which contained dipentaerythritol allyl ether (14 g, 37.37 mmol), AIBN (560 mg, 3.41 mmol), and hexanes (350 ml). The vessel was sealed and placed in a water bath preheated to 70° C. An aluminum foil covering was placed atop the water bath containing the stainless steel vessel. After heating overnight at 70° C., the coupon was removed from the stainless steel vessel and washed three times each for 5 minutes in CHCl₃ on an orbital shaker. The coupon was then dried for several hours in a vacuum oven at 50° C.

The DPA-modified coupon was soaked for 20 minutes in a solution of AIBN in acetone (10 mg/ml) and dried for 20 minutes. A viscous thin film of aminolyzed zwitterionic SBMAam polymer, was spread on the surface of the coupon. The film was rubbed back and forth with a pipet until it became glassy. It was then placed in a pan, along with a beaker of water. A sheet of aluminum foil was placed atop the pan and the pan placed in an oven overnight at 111° C. In the morning, the coupon was washed three times each for 10 minutes in deionized water on an orbital shaker and allowed to dry. It was stored wrapped in aluminum foil until the time came for testing of the physical properties.

Original Property Test Results

| Variable Tested | Unmodified rubber | Zwitterionic SBMAam modified butyl rubber |
|---|---|---|
| Hardness (ASTM D 2240), Shore A | 65 | 65 |
| Tensile Strength (ASTM D 412) MPa (psi) | 6.1 (881) | 6.2 (897) |
| Elongation (ASTM D 412), % | 603 | 613 |
| Specific Gravity (ASTM D 297) | 1.35 | 1.37 |

Example 32

Coefficient of Friction, CoF, of Butyl Rubber Modified by Dipentaerythritol Allyl Ether (DPA) (Compound 17b, j=1) and Modified by Zwitterionic SBMAam polymer, Formula 14i, after Functionalization with Dipentaerythritol Allyl Ether (DPA) (Compound 17b, j=1).

Dipentaerythritol allyl ether (DPA) (compound 17b, j=1) functionalization procedure Two 3"×3"×0.078" coupons of butyl rubber (487KE.TR-G 1728920146) were cut and washed with an IPrOH-saturated texwipe and left to dry for 20 minutes. Each coupon was placed in a separate glass reaction vessel along with dipentaerythritol allyl ether (6.80 g, 18.16 mmol), AIBN (2.263 g, 13.78 mmol) and hexanes (550 ml). The reaction vessel was fitted with a reflux condenser, which was sealed with a silicone sleeve stopper. The reaction vessels were placed in a water bath preheated to 70° C., where they remained at 70° C. overnight. In the morning, the coupons were removed and washed three times each for 5 minutes in CHCl₃ on an orbital shaker and then dried in a vacuum oven for several hours at 50° C.

Zwitterionic SBMAam, Formula 14i, Modification Procedure

One of the two DPA-modified coupons, above, was soaked for 20 minutes in a solution of AIBN in acetone (10 mg/ml) and dried for 20 minutes. A viscous thin film of aminolyzed zwitterionic SBMAam polymer was spread on the surface of the coupon. The film was rubbed back and forth with a pipet until it became glassy. It was then placed in a pan, along with a beaker of water. A sheet of aluminum foil was placed atop the pan and the pan placed in an oven overnight at 111° C. In the morning, the coupon was washed three times each for 10 minutes in deionized water on an orbital shaker and allowed to dry. It was stored wrapped in aluminum foil until the time came for testing of CoF.

CoF Testing:

Three butyl rubber coupons along with a sheet of Teflon™ were subjected to CoF testing: A DPA-modified coupon, and a zwitterionic SBMAam polymer modified coupon that were prepared above and an unmodified coupon. Coupons were die cut into 2.5"×2.5"×0.08" squares and subjected in triplicate to ASTM D1894 under dry conditions against anodized aluminum, generating the following data:

| Modification or sheet type | Avg. Static CoF (kgf) | Avg. Dynamic CoF (kgf) |
|---|---|---|
| None | 0.89 | 0.85 |
| DPA | 0.09 | 0.04 |
| Teflon ™ sheet | 0.11 | 0.02 |
| Polyzwitterion | 0.27 | 0.26 |

Low static and dynamic coefficient of friction achieved for polyzwitterion modified butyl rubber. Very low coefficient of friction similar to Teflon™ achieved for DPA modified butyl rubber.

Example 33

Functionalization of Butyl Rubber by Dipentaerythritol Allyl Ether (DPA) (Compound 17b, j=1) and Anti-Biofilm Results.

A 2.5×2.5 cm butyl rubber coupon (487KE.TR.G Lot #201728920146) was modified according to the procedure described in example 22. The DPA-modified coupon was tested according to the procedure for determining % CFU/cm2 reduction and showed a 75.7% reduction in bacterial growth compared to a control.

Example 34

Modification of Butyl Rubber by Perfluorodecanethiol after Functionalization with Dipentaerythritol Allyl Ether (DPA) (Compound 17b, j=1)

A 2.5 cm×2.5 cm×0.2 cm coupon of butyl rubber was cut and washed with an IPrOH-saturated texwipe and allowed to dry for 20 minutes. The coupon was then added to a 4 oz jar containing dipentaerythritol allyl ether (1 g, 2.67 mmol), AIBN (40 mg, 0.243 mmol), and hexanes (25 ml). The jar was sealed with a PTFE-lined phenolic cap and placed in an oil bath which was preheated to 70° C. After sitting in the oil bath overnight, the coupon was washed in CHCl$_3$ (3×5 minutes) on an orbital shaker and dried in a vacuum oven at 50° C. for several hours.

Attachment of Perfluorodecanethiol under Thermal Conditions:

The DPA-modified coupon was added to a 50 ml round-bottom flask containing 1H, 1H, 2H, 2H-perfluorodecanethiol/benzotrifluoride (10% v/v) (20 ml) and AIBN (20 mg, 0.122 mmol). A reflux condenser was placed atop the flask and the condenser sealed with a silicone sleeve stopper. After argon was streamed through the system for approximately two hours, the reaction was stirred for 16 hours at 60° C. The coupon was then removed from the reaction mixture and washed in CHCl$_3$ (3×5 minutes) on an orbital shaker and dried in a vacuum oven at 50° C. for several hours. When the coupon was dipped vertically in deionized H$_2$O and removed, water sheeted well on the coupon. However, when a drop of water was applied with a micropipetter, the contact angle of the drop was incredibly high and the drop could not be spread with a pipet. ATR-FTIR: $\lambda_{max}$ 1142, 1194. The peaks were observed when the spectrum of UCC rubber was subtracted from the rubber with the perfluorodecane thiol attached. These correspond to the CF$_3$ peaks in the perfluorodecanethiol.

Attachment of Perfluorodecanethiol under Photochemical Conditions:

The UCC-modified coupon was soaked for 20 minutes in the dark in a solution of DMPA dissolved in acetone (10 mg/ml) and subsequently dried in the dark for 20 minutes. A thin film of 1H, 1H, 2H, 2H-perfluorodecanethiol/benzotrifluoride (10% v/v) was then spread across the surface of the rubber. The coupon was placed under UV light (365 nm) for 40 minutes. At the end of the reaction period, a glassy film was present on the surface of the coupon. The coupon was washed in CHCl$_3$ (3×5 minutes) on an orbital shaker and dried for several hours in the vacuum oven at 50° C. When the coupon was dipped in deionized H$_2$O and removed, water did not sheet on it. A water drop applied with a micropipetter had a very high contact angle and did not spread. ATR-FTIR: $\lambda_{max}$ 1137, 1182. The peaks were observed when the spectrum of UCC rubber was subtracted from the rubber with the perfluorodecane thiol attached. These correspond to the CF$_3$ peaks in the perfluorodecanethiol.

Example 35

Modification of Butyl Rubber by [4-6% (mercaptopropyl) methylsiloxane-dimethylsiloxane copolymer] after Functionalization by Dipentaerythritol Allyl Ether (DPA) (Compound 17b, j=1)

DPA Functionalization:

A 2.5 cm×2.5 cm×0.2 cm coupon of butyl rubber (XF487KE.TR-G201802420062) was modified according to the procedure described in example 22.

SMS-042 Modification

A solution comprising 50 weight % of [4-6% (mercaptopropyl)methylsiloxane-dimethylsiloxane copolymer] (SMS-042 Gelest Inc), 0.5 weight % lauroyl peroxide, and 49.5 weight % hexanes was spread across the surface of the above DPA-modified coupon. The coupon was placed in an oven overnight at 111° C. In the morning, it was cooled and washed in CHCl$_3$ (3×5 minutes) on an orbital shaker and allowed to dry at 50° C. in a vacuum oven for several hours. Examination with a gloved finger revealed the SMS-042-modified rubber to have increased lubricity compared to a control. When the coupon was dipped in deionized H$_2$O and removed, water did not sheet on it. A water drop applied with a micropipetter had a very high contact angle and did not spread, even with the aid of mechanical force. ATR-FTIR: $\lambda_{max}$ 802, 998, 1087, 1259, 1467. These peaks were observed when the spectrum of DPA modified rubber was subtracted from the rubber with the SMS-042 attached. The noted peaks also correspond to peaks visible in pure SMS-042.

Example 36

Modification of Butyl Rubber by [4-6% (mercaptopropyl) methylsiloxane-dimethylsiloxane copolymer] after Functionalization with Dipentaerythritol Allyl Ether (DPA) (Compound 17b, j=1)

Functionalization of a 3 inch×3 inch butyl rubber coupon with dipentaerythritol allyl ether.

A 3.0 inch×3.0 inch coupon of butyl rubber was washed with an IPrOH-soaked Texwipe and the allowed to dry for 20 minutes. It was then placed in a reaction vessel with dipentaerythritol allyl ether (6.80 g, 13.75 mmol) and AIBN (2.26 g, 13.78 mmol, recrystallized from MeOH). The reaction vessel was then placed in a water bath preheated to 70° C., where it remained overnight while argon was streamed through the reaction vessel. The coupon was then washed in $CHCl_3$ (3×5 minutes) on an orbital shaker and then left to dry for several days at room temperature.

Modification of the Dipentaerythritol Allyl Ether-Modified 3 Inch×3 Inch Coupon with [4-6% (mercaptopropyl)methylsiloxane-dimethylsiloxane copolymer].

A solution comprising 50 weight % of [4-6% (mercaptopropyl)methylsiloxane-dimethylsiloxane copolymer] (SMS-042 Gelest Inc), 0.5 weight % lauroyl peroxide, and 49.5 weight % hexanes was spread across the surface of the above DPA-modified coupon. The coupon was placed in an oven overnight at 111° C. In the morning, it was cooled and washed in $CHCl_3$ (three times each for 5 minutes) on an orbital shaker and allowed to dry at 50° C. in a vacuum oven for several hours.

CoF Testing:

Two butyl rubber coupons were subjected to CoF testing: A polysiloxane modified coupon that was prepared above and an unmodified coupon. Coupons were die cut into 2.5"×2.5"×0.08" squares and subjected in triplicate to ASTM D1894 under dry conditions against anodized aluminum, generating the following data:

| Modification or sheet type | Avg. Static CoF (kgf) | Avg. Dynamic CoF (kgf) |
| --- | --- | --- |
| None | 1.16 | 1.06 |
| polysiloxane | 0.14 | 0.13 |

Low static and dynamic coefficient of friction achieved for polysiloxane modified butyl rubber.

Example 37

Scanning Electron Microscopy (SEM) Images for Butyl Rubber with and without Surface Functionalization with Dipentaerythritol Ally Ether (DPA) (Compound 17b, j=1)

DPA Functionalization:

A 2.5 cm×2.5 cm×0.2 cm coupon of butyl rubber (XF487KE.TR-G201714520032) was modified according to the procedure described in example 22.

Figure 5:
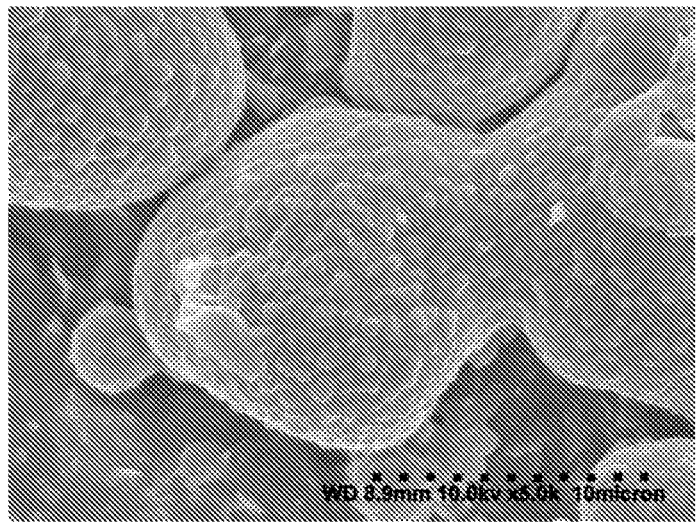
FIG. 5 is a SEM photograph of a butyl rubber coupon that was modified according to the procedure described in example 22

The unmodified coupon A and modified coupon B images at 5000× magnification are shown in FIG. 4 (unmodified) and FIG. 5 (modified). The surface of both coupons show surface globules, some with diameters of larger than 18 microns, along with cracks between the globules. The features look unchanged after surface modification.

Example 38

Modification of Butyl Rubber by Polyzwitterion Copolymer, SBMAam-co-N-acryloylcysteamine Formula 16l, after Functionalization with Dipentaerythritol Propargyl Ether and Anti-Biofilm Results Synthesis of dipentaerythritol propargyl ether. Formula 17b where R=—C≡CH Sodium hydride (2.27 g, 94.5 mmol) was suspended in 100 ml of DMF and stirred under streaming argon for 10 minutes at room temperature. Dipentaerythritol (2 g, 7.845 mmol) was dissolved in 10 ml of DMF and added dropwise to the reaction mixture at room temperature. The reaction mixture was stirred for 30 minutes under streaming argon. The reaction mixture was then cooled to 0° C., followed by the addition of propargyl bromide (15.2 ml, 141.1 mmol, 80% solution in toluene). The reaction mixture was then stirred for 1 hour at 0° C., followed by 3 hours of stirring at room temperature. Streaming argon was maintained throughout the entire process. After cooling to 0° C., methanol was added to quench the reaction mixture. The DMF was removed under reduced pressure while the flask was submerged in a water bath heated to 33° C. 200 ml of $CHCl_3$ was added and the crude reaction mixture transferred to a separatory funnel. The crude reaction mixture was washed with 100 ml of 0.5M HCl, 100 ml of DI $H_2O$ (with 5 ml hexanes), 2×50 ml of saturated NaCl, 2×100 ml of DI $H_2O$ (5 ml of hexanes added each time), and then filtered through $Na_2SO_4$. After the solvents were removed under reduced pressure, the crude reaction mixture was purified by flash column chromatography (100% hexanes to 50:50 hexanes:EtOAc) to yield dipentaerythritol propargyl ether (3.49 g, 7.23 mmol, 92%) as an orange oil. $^1H$ NMR ($CDCl_3$, 300 MHz) δ 2.41 (t, J=2.4 Hz, 6H), 3.37 (s, 4H), 3.50 (s, 12H), 4.11 (d, J=2.4 Hz, 12H).

Functionalization of a butyl rubber coupon with dipentaerythritol propargyl ether.

A 2.5 cm×2.5 cm×0.08" coupon of butyl rubber was washed with an IPrOH-saturated texwipe and allowed to dry for 20 minutes. The coupon was then added to a 4 oz jar containing dipentaerythritol propargyl ether (0.42 g, 1.15 mmol), AIBN (100 mg, 0.609 mmol, recrystallized from methanol) and hexanes (35 ml). The jar was sealed with a PTFE-lined phenolic cap and heated overnight at 70° C. in an oil bath. In the morning, the coupon was washed in 20 mL of $CHCl_3$ (three times each for 5 minutes) on an orbital shaker and then dried for several hours under vacuum at 50° C.

Attachment of SBMAam-co-N-acryloylcysteamine to Butyl Rubber Modified with Dipentaerythritol Propargyl Ether.

To a 50 ml Erlenmeyer flask were added 100 mg of SBMAam-co-N-acryloylcysteamine (Formula 16l) and AIBN (66 mg) and the dipentaerythritol propargyl ether modified butyl rubber coupon above. A silicone sleeve stopper was placed upside down atop the Erlenmeyer and held securely in place using copper wire. 20 ml of deionized water were added via syringe while argon was streaming through the flask. Argon was streamed through the flask for 1 hour. After the argon supply was removed, the Erlenmeyer flask was lowered into an oil bath which was preheated to 85° C. The following morning, the coupon was removed from the Erlenmeyer flask and placed in a 4 oz jar with 35 ml of deionized water. The jar was placed in a preheated oil bath at 70° C. and left to sit for 24 hours. This soaking period was followed by washing 3×10 minutes in deionized water on the shaker. After drying for several minutes, a water drop placed on the surface of the rubber quickly spread across a very large area. The zwitterionic modified coupon was tested according to the procedure for determining % $CFU/cm^2$ reduction and showed a 82% reduction in *P. aeruginosa* compared to a control.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of" as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other Thus, embodiments of ZWITTERIONIC MONOMERS, POLYZWITTERIONIC POLYMERS FORMED THEREFROM, SURFACE FUNCTIONALIZATION AND SURFACE MODIFICATION are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

The invention claimed is:

1. An article comprising:
   a surface comprising a thermoset elastomer; and
   residues of surface reagent(s) attached to the surface, wherein the surface reagent comprises at least two unsaturated bonds, wherein the surface reagent is selected from:

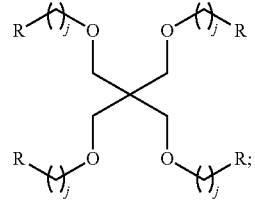
(Formula 17a)

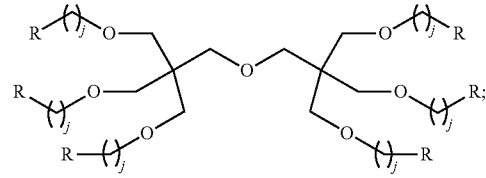
(Formula 17b)

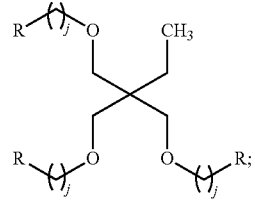
(Formula 17c)

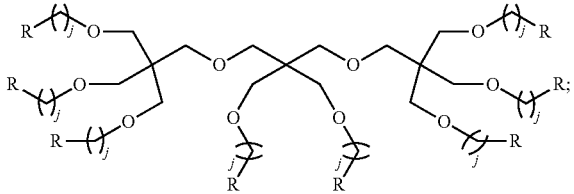
(Formula 17d)

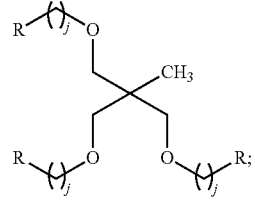
(Formula 17e)

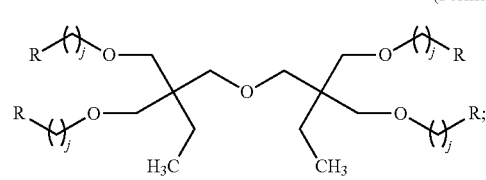
(Formula 17f)

and mixtures thereof, wherein each R is —CH=CH$_2$ or —C≡CH group; and each j is independently an integer from 1 to 18.

2. The article of claim 1, wherein the surface reagent comprises at least two double bonds.

3. The article of claim 1, wherein the surface reagent comprises at least two triple bonds.

4. The article of claim 1, wherein the surface reagent comprises at least two double bonds, three double bonds, at least two triple bonds, three triple bonds, at least one double bond and at least one triple bond, or any combination thereof.

5. The article of claim 1, wherein the surface reagent is selected from:

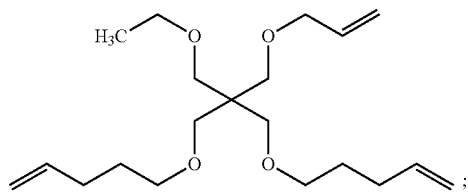

(Formula 17g)

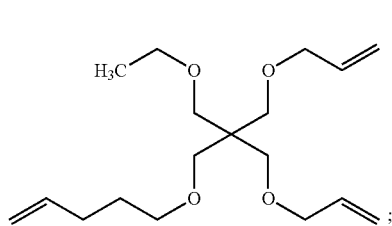

(Formula 17h)

and mixtures thereof.

6. The article of claim 1 further comprising modifier(s) attached to the residues of the surface reagent(s).

7. The article of claim 6, wherein the modifier comprises a polymeric modifier.

8. The article of claim 7, wherein the polymeric modifier comprises a polyzwitterionic polymer.

9. The article of claim 8, wherein the polyzwitterionic polymer is a polymer according to formula 12:

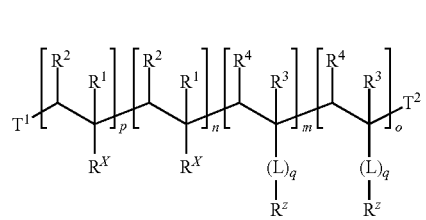

(Formula 12)

where $T^1$ and $T^2$ can independently be any group;
$R^X$ independently comprise at least one reactive group or non-zwitterionic non-reactive group;
$R^Z$ comprises at least a zwitterionic portion;
$R^1$ and $R^3$ are independently hydrogen, substituted or unsubstituted alkyl, or halogen;
$R^2$ and $R^4$ are independently hydrogen, substituted or unsubstituted alkyl, substituted or unsubstituted alkoxy, or halogen;
q can independently be 0 or 1 and when an independent q is 1, the associated L can be a linker group;
m can be an integer from 1 to 10,000;
n can be an integer from 0 to 10,000;
o can be an integer from 0 to 10,000; and
p can be an integer from 0 to 10,000.

10. The article of claim 1, wherein the resulting article is hydrophilic.

11. The article of claim 1, wherein the resulting article is resistant to biofouling.

12. The article of claim 1 further comprising reacting the residues of the surface reagent(s).

13. The article of claim 12, wherein the residues of the surface reagent(s) are subjected to electrophilic addition, epoxidation, ozonolysis, oxidative cleavage, dihydroxylation, hydroboration-oxidation, carbene addition, click reactions, olefin metathesis, dimerization, and polymerization, or any combination thereof.

14. The article of claim 1, wherein the surface reagent is attached to the surface via at least one double bond or at least one triple bond.

15. The article according to claim 1, wherein the article is a thermoset elastomer in finished part form.

* * * * *